(12) United States Patent  (10) Patent No.: US 9,292,387 B2
Itasaki et al.                  (45) Date of Patent:    Mar. 22, 2016

(54) MEDIUM, CONTROL METHOD, AND INFORMATION PROCESSING APPARATUS

(71) Applicant: FUJITSU LIMITED, Kawasaki-shi, Kanagawa (JP)

(72) Inventors: Akira Itasaki, Yokohama (JP); Tatsuro Matsumoto, Yokohama (JP); Isamu Yamada, Kawasaki (JP); Hiroyasu Sugano, Koto (JP); Koichi Yasaki, Kawasaki (JP); Hideki Tanaka, Kawasaki (JP); Koichi Yokota, Yokohama (JP); Zhaogong Guo, Koto (JP); Daisuke Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 197 days.

(21) Appl. No.: 14/025,411

(22) Filed: Sep. 12, 2013

(65) Prior Publication Data

US 2014/0081920 A1   Mar. 20, 2014

(30) Foreign Application Priority Data

Sep. 19, 2012  (JP) ................................. 2012-206319

(51) Int. Cl.
G06F 17/30    (2006.01)
G06F 11/14    (2006.01)

(52) U.S. Cl.
CPC ........ G06F 11/1451 (2013.01); G06F 11/1458 (2013.01); G06F 17/30174 (2013.01); G06F 17/30315 (2013.01); G06F 17/30339 (2013.01); G06F 17/30584 (2013.01)

(58) Field of Classification Search
CPC .................... G06F 17/30011; G06F 17/30073; G06F 17/30194; G06F 17/30091; G06F 17/30174; G06F 17/30315; G06F 17/30339; G06F 17/30584

USPC ......... 707/645, 650, 652, 609, 640, 821–822, 707/825–827, 648; 715/739; 711/118, 112
See application file for complete search history.

(56) References Cited

U.S. PATENT DOCUMENTS

| | | | | |
|---|---|---|---|---|
| 5,829,023 | A * | 10/1998 | Bishop | 711/118 |
| 5,926,180 | A * | 7/1999 | Shimamura | 715/739 |
| 8,352,429 | B1 * | 1/2013 | Mamidi | G06F 17/30339 707/640 |
| 8,473,956 | B2 * | 6/2013 | Kindel | G06F 9/4843 718/102 |
| 9,002,801 | B2 * | 4/2015 | Meehan | G06F 17/30286 707/661 |
| 2005/0177767 | A1 | 8/2005 | Furuya | |
| 2007/0042737 | A1 * | 2/2007 | Peusens | H03D 7/12 455/234.1 |
| 2007/0265994 | A1 | 11/2007 | Ueda | |
| 2009/0164741 | A1 | 6/2009 | Takaki | |
| 2014/0032833 | A1 * | 1/2014 | Cudak et al. | 711/112 |

FOREIGN PATENT DOCUMENTS

| | | | | |
|---|---|---|---|---|
| EP | 1077413 A3 * | 2/2001 | | G06F 17/30 |
| JP | 7-175916 | 7/1995 | | |
| JP | 2005-190139 | 7/2005 | | |
| JP | 2007-304719 | 11/2007 | | |
| JP | 2009-159081 | 7/2009 | | |
| JP | 2010-49729 | 3/2010 | | |
| WO | WO 2007053354 A1 * | 5/2007 | | G06F 17/30 |

* cited by examiner

Primary Examiner — Frantz Coby
(74) Attorney, Agent, or Firm — Staas & Halsey LLP

(57) ABSTRACT

A medium stores a control program for an information processing apparatus. The control program causes the information processing apparatus to execute a procedure. The procedure includes obtaining history information on a type of an operation performed to each of a plurality of files, calculating a priority for a file among the files based on the type of the operation in the history information, and selecting a file among the files based on the priority.

14 Claims, 20 Drawing Sheets

| TIME AND DATE | USE TIME | LOG TYPE | UNIQUE VALUE |
|---|---|---|---|
| 8:20 ON MARCH 6, 2012 | - | CREATION | 65615163 |
| 8:21 ON MARCH 6, 2012 | - | TRANSMISSION TO PC | 65615163 |
| 8:23 ON MARCH 6, 2012 | 0:30 | ACCESS | 65615163 |
| 8:25 ON MARCH 6, 2012 | - | COPY TO ../favorite/ | 65615163 |

501

| DEVICE ID | FILE ID | FILE NAME | PATH |
|---|---|---|---|
| mobile-001 | 150 | test.txt | /mnt/doc |
| mobile-001 | 13 | 2013.jpg | /mnt/pict/20120306/ |
| ⋮ | ⋮ | ⋮ | ⋮ |
| mobile-001 | 210 | 2013.jpg | /mnt/pict/favorite/ |
| ⋮ | ⋮ | ⋮ | ⋮ |

502b

| TIME AND DATE | USE TIME | LOG TYPE | UNIQUE VALUE |
|---|---|---|---|
| 8:25 ON MARCH 6, 2012 | - | COPY FROM ../20120306 | 65615163 |
| 8:30 ON MARCH 6, 2012 | 0:45 | EDITING | 16153321 |
| 9:31 ON MARCH 7, 2012 | 1:00 | ADD TO COMMENT | 97488475 |
| 10:45 ON MARCH 7, 2012 | - | SUBMIT TO WEB SERVICE | 97488475 |

503

| PARENT DEVICE ID | PARENT FILE ID | CHILD DEVICE ID | CHILD FILE ID |
|---|---|---|---|
| mobile-001 | 13 | PC-002 | 83 |
| mobile-001 | 13 | mobile-001 | 210 |
| ⋮ | ⋮ | ⋮ | ⋮ |

| TIME AND DATE | USE TIME | LOG TYPE | UNIQUE VALUE |
|---|---|---|---|
| 8:21 ON MARCH 6, 2012 | – | RECEIVE FROM SMART PHONE | 65615163 |
| 20:15 ON MARCH 6, 2012 | 1:20 | EDITING | 12345678 |
| 21:37 ON MARCH 6, 2012 | – | RENAME TO snow_0306.jpg | 87654321 |

511

| DEVICE ID | FILE ID | FILE NAME | PATH |
|---|---|---|---|
| PC-002 | 351 | test.txt | D:¥doc¥ |
| PC-002 | 83 | snow_0306.jpg | D:¥temp¥ |
| ⋮ | ⋮ | ⋮ | ⋮ |
| mobile-001 | 210 | 2013.jpg | /mnt/pict/favorite/ |
| ⋮ | ⋮ | ⋮ | ⋮ |

512b

| TIME AND DATE | USE TIME | LOG TYPE | UNIQUE VALUE |
|---|---|---|---|
| 8:25 ON MARCH 6, 2012 | – | COPY FROM ../20120306 | 65615163 |
| 8:30 ON MARCH 6, 2012 | 0:45 | EDITING | 16153321 |
| 9:31 ON MARCH 7, 2012 | 1:00 | ADD TO COMMENT | 97488475 |
| 10:45 ON MARCH 7, 2012 | – | SUBMIT TO WEB SERVICE | 97488475 |

513

| PARENT DEVICE ID | PARENT FILE ID | CHILD DEVICE ID | CHILD FILE ID |
|---|---|---|---|
| mobile-001 | 13 | PC-002 | 83 |
| mobile-001 | 13 | mobile-001 | 210 |
| ⋮ | ⋮ | ⋮ | ⋮ |

| TIME AND DATE | USE TIME | LOG TYPE | UNIQUE VALUE |
|---|---|---|---|
| 8:21 ON MARCH 6, 2012 | - | RECEIVE FROM SMART PHONE | 65615163 |
| 20:15 ON MARCH 6, 2012 | 1:20 | EDITING | 12345678 |
| 21:37 ON MARCH 6, 2012 | - | RENAME TO snow_0306.jpg | 87654321 |

531

| DEVICE ID | FILE ID | FILE NAME | PATH |
|---|---|---|---|
| PC-002 | 351 | test.txt | D:¥doc¥ |
| PC-002 | 83 | snow_0306.jpg | D:¥temp¥ |
| ⋮ | ⋮ | ⋮ | ⋮ |
| mobile-001 | 210 | 2013.jpg | /mnt/pict/favorite/ |
| ⋮ | ⋮ | ⋮ | ⋮ |

532b

| TIME AND DATE | USE TIME | LOG TYPE | UNIQUE VALUE |
|---|---|---|---|
| 8:25 ON MARCH 6, 2012 | - | COPY FROM ../20120306 | 65615163 |
| 8:30 ON MARCH 6, 2012 | 0:45 | EDITING | 16153321 |
| 9:31 ON MARCH 7, 2012 | 1:00 | ADD TO COMMENT | 97488475 |
| 10:45 ON MARCH 7, 2012 | - | SUBMIT TO WEB SERVICE | 97488475 |

533

| PARENT DEVICE ID | PARENT FILE ID | CHILD DEVICE ID | CHILD FILE ID |
|---|---|---|---|
| mobile-001 | 13 | PC-002 | 83 |
| mobile-001 | 130 | mobile-001 | 210 |
| ⋮ | ⋮ | ⋮ | ⋮ |

MEDIUM, CONTROL METHOD, AND INFORMATION PROCESSING APPARATUS

CROSS-REFERENCE TO RELATED APPLICATION

This application is based upon and claims the benefit of priority of the prior Japanese Patent Application No. 2012-206319 filed on Sep. 19, 2012, the entire contents of which are incorporated herein by reference.

FIELD

The embodiments discussed herein are related to backup of files.

BACKGROUND

Technology configured to manage electronic files has been studied from various viewpoints. One viewpoint is utilization of histories by a user operating files.

For example, even when it is difficult to identify an electronic document including information of interest, in order to narrow down users who have performed operations involved in this information, the following document utilization tracking system has been proposed.

With this document utilization tracking system, a utilization history record that indicates operations performed by each user on each page within each document provided from a document storage unit is accumulated in a utilization history storage unit. Also, an analyzing unit calculates a page score that indicates how well each page matches search conditions that a user has input.

The analyzing unit further obtains access time of each user corresponding to each page from a utilization history record. Next, the analyzing unit calculates an access score regarding the utilization history record based on the page score and access time. The utilization history records are sorted and displayed in descending order of access scores.

Also, another viewpoint regarding management of files is backup of files. Regarding backup technology as well, various studies have been performed from various viewpoints.

For example, in order to shorten time length used for restoration of an object to be backed up as short as possible, the following method has been proposed with it as a purpose to record an object to be backed up in a tape recording medium. With this method, there is used a table according to priority where multiple group restoration priorities corresponding to multiple element groups respectively are recorded.

Specifically, based on the table according to priority, all of elements to be backed up belonging to a first element group are backed up in a first continuous region which is a continuous recording region in a tape recording medium. Next, all of elements to be backed up belonging to a second element group having lower group restoration priority than that of the first element group are backed up in a second continuous region which exists at the very end of the tape of the first continuous region.

Also, with regard to backup, various proposals have also been performed from a viewpoint of storage capacity other than a viewpoint of time taken for restoration of backed up data.

For example, it is difficult to back up all of contents to a storage medium having smaller capacity than a total capacity of multiple contents from a hard disk drive (HDD) in which multiple contents are stored. Therefore, manual content selection may be performed on a huge amount of contents stored in the HDD.

On the other hand, in recent years, recording capacity of an HDD has increased, and the number of data to be selected is huge. Therefore, manual decision to adopt or reject of contents is very complicated.

The following information processing apparatus has been proposed in the light of such a situation. Specifically, this information processing apparatus gives attribute information to contents saved in an HDD, and manages the attribute information. In the event that HDD failure has been predicted, the information processing apparatus preferentially backs up contents having high priority. The priority order may be determined according to applied attribute information.

Also, there has been proposed an information processing apparatus which discriminates erasable data even without complicated operations from a user, and enables the discriminated erasable data to be an object to be erased. This information processing apparatus determines whether to satisfy a predetermined condition for each image file at the time of back processing. In the event that a predetermined condition is satisfied, the information processing apparatus backs up the image file, and decreases holding priority of this image file based on a condition set by the user.

The holding priority is an index that indicates priority for holding this image file in a storage unit. The higher holding priority an image file has, the more it is difficult to erase this image file. The value of the holding priority changes primarily according to the existence and number of times of backup.

Note that, countermeasure to restriction of storage capacity has been proposed in various fields as well as backup of files. For example, with a field of image reading/forming devices, there has been proposed a method such that a space area is memory is temporarily expanded by evacuating a file under management of an unused function into an external storage device. However, it is difficult to apply such a technique regarding a space area in memory to backup of files.

Japanese Laid-open Patent Publication Nos. 2007-304719, 2005-190139, 2010-49729, 2009-159081, and 7-175916 are examples of the related art of the present disclosure.

SUMMARY

According to an aspect of the invention, a medium stores a control program for an information processing apparatus. The control program causes the information processing apparatus to execute a procedure. The procedure includes obtaining history information on a type of an operation performed to each of a plurality of files, calculating a priority for a file among the files based on the type of the operation in the history information, and selecting a file among the files based on the priority.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 6 is a diagram illustrating an example of a database to be stored in a certain terminal in the second embodiment;

FIG. 7 is a diagram illustrating an example of a database to be stored in another terminal in the second embodiment;

FIG. 9 is a diagram illustrating details of an example of a database to be stored in a server in the second embodiment;

DESCRIPTION OF EMBODIMENT

In recent years, the volume of files which one user uses has increased. Moreover, in recent years, there have been many users who use multiple terminals.

On the other hand, of a great number of files stored in multiple terminals, there may be files having low importance, and several files may be overlapped between multiple terminals. Accordingly, it leads to waste of time and storage capacity to back up all of a great number of files stored in multiple terminals.

Figure 1:
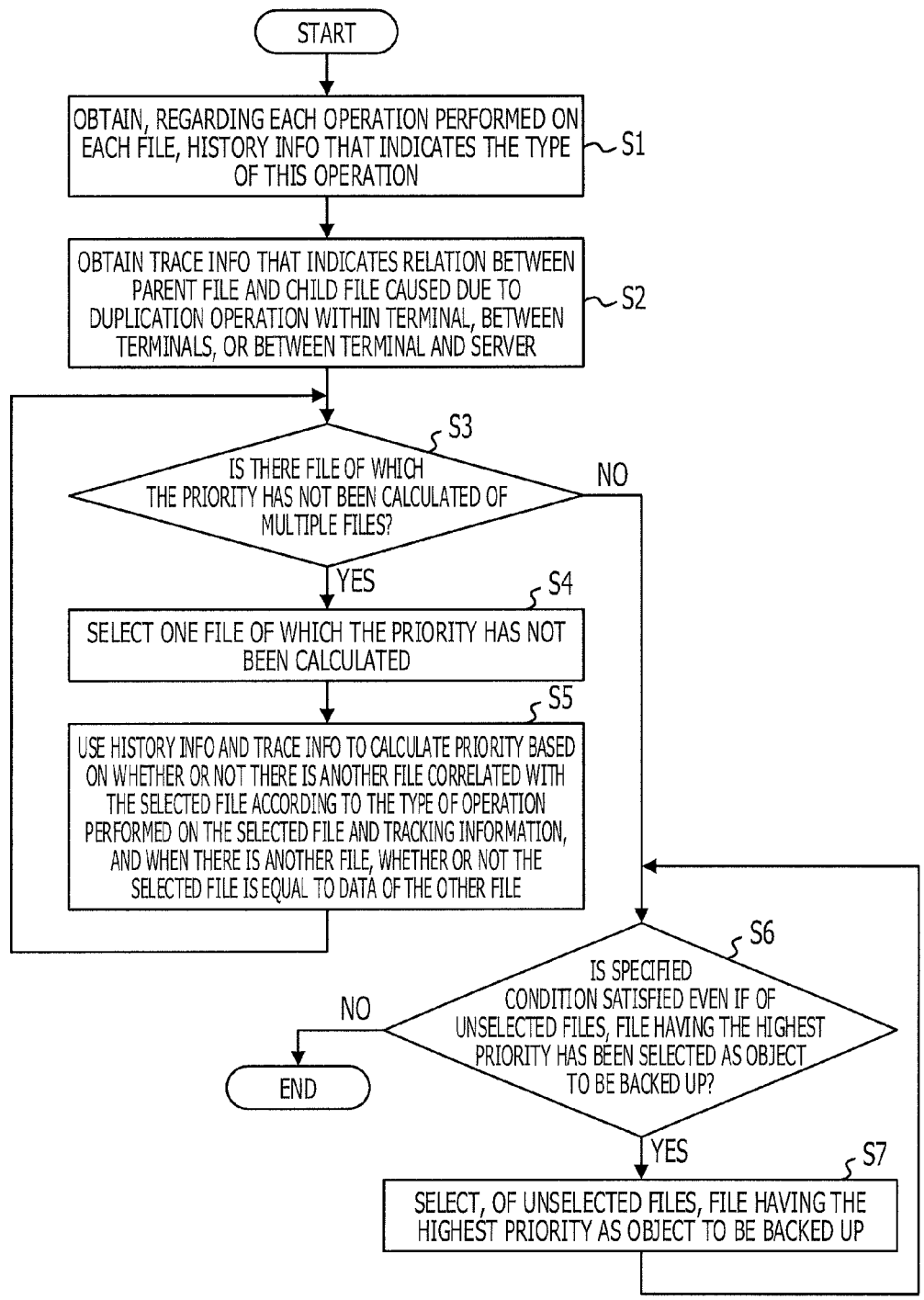
FIG. 1 is a flowchart of a backup control method according to a first embodiment.
Figure 2:
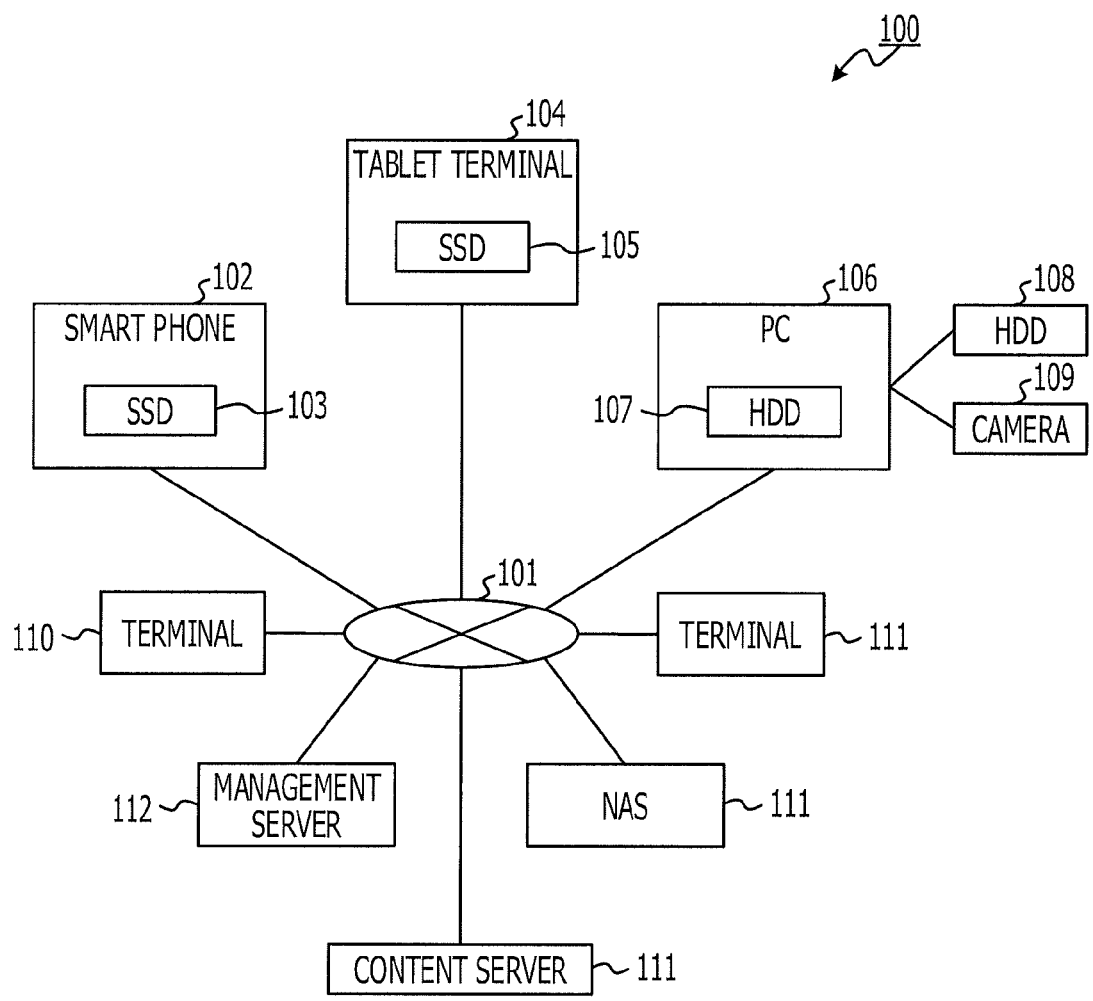
FIG. 2 is a diagram illustrating a system configuration example.
Figure 3:
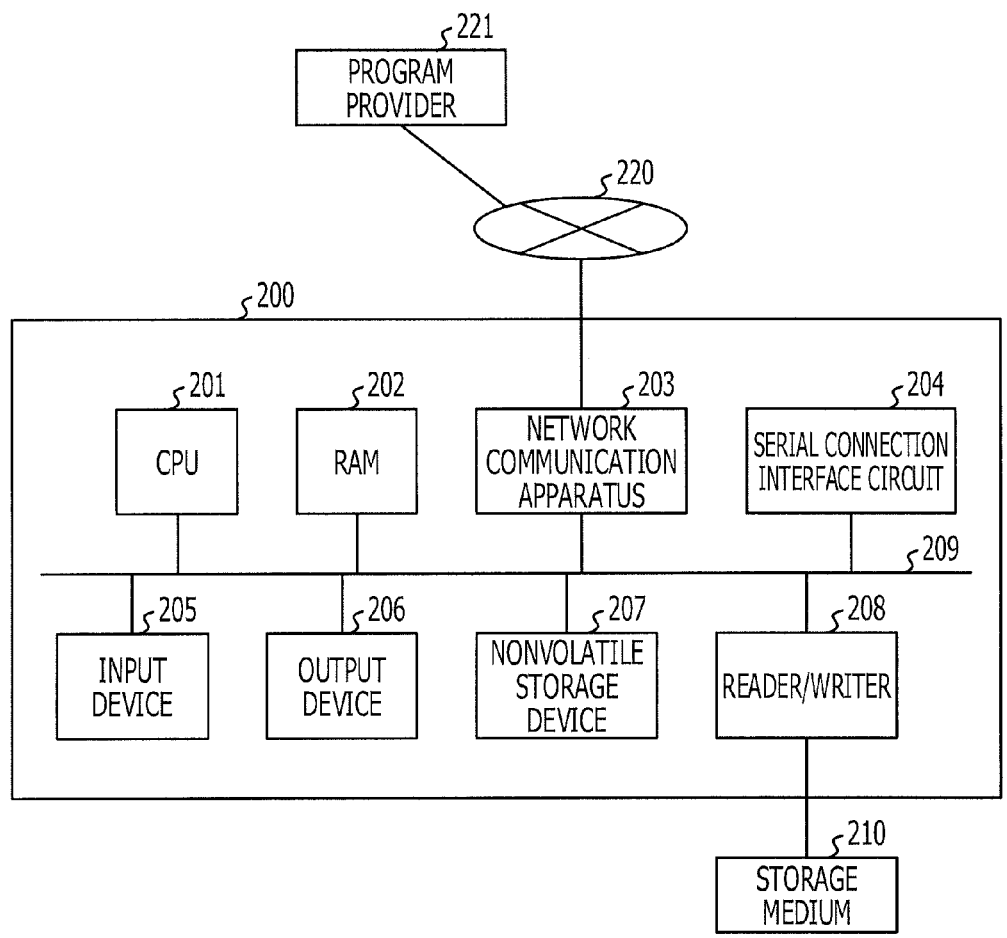
FIG. 3 is a hardware configuration diagram of an information processing apparatus.

Hereinafter, embodiments will be described in detail with reference to the appended diagrams. First, a first embodiment will be described with reference to FIGS. 1 to 3. FIGS. 1 to 3 are also diagrams to be applied to later-described second and third embodiments. Next, a second embodiment will be described with reference to FIGS. 4 to 15, and a third embodiment will be described with reference to FIGS. 16 to 20. Finally, other modifications will also be described.

Now, FIG. 1 is a flowchart of a backup control method according to the first embodiment. An information processing apparatus which executes processing in FIG. 1 may be one of multiple terminals which a user uses. The information processing apparatus which executes the processing in FIG. 1 may be a computer (e.g., server) configured to perform communication with at least one or more of the multiple terminals via a network.

There are various available types of terminals. For example, the terminals may be any of a desktop personal computer (PC), a laptop PC, a tablet terminal, a smart phone, a cellular phone, a personal digital assistant (PDA), a portable media player, or a digital camera.

The information processing apparatus selects one or more files to be backed up out of multiple files stored the multiple terminals (or multiple terminals and the computer) in a distributed manner by executing the processing in FIG. 1. The details are, as will be described later, that the information processing apparatus assigns high priority to a file which is desirable to be backed up, and selects a file in accordance with priority. Backup of files is made efficient by automatic selection by the information processing apparatus. Specifically, it is as follows.

In the event that a user uses multiple terminals, backup of all files stored in the multiple terminals (or the multiple terminals and the computer) leads to waste of time and storage capacity.

For example, there may a case where a large number of files are stored on multiple terminals in a distributed manner, there may be a file having low importance of the large number of files, and several files may be overlapped between multiple terminals. The user may intend to use a storage region for backup of a file having low importance. Also, a file overlapped between multiple terminals is practically backed up, and accordingly, there is low necessity to further back up this file. Accordingly, backup of all files leads to waste of time and storage capacity.

On the other hand, it is very troublesome for the user to manually suitably select a file to be backed up out of a great number of files, and accordingly, this is difficult in practice.

With the first embodiment, a part of files are automatically selected out of multiple files stored on the multiple terminals (or multiple terminals and the computer) by the information processing apparatus, and the selected files are backed up. Accordingly, with the first embodiment, there is obtained an advantage to save time and storage regions used for backup. Further, automatic selection by the information processing apparatus allows the user to be released from trouble for manually selecting a file to be backed up.

Also, the more backup of a file is preferred, the higher priority to be calculated regarding each file is defined by the information processing apparatus. A definition of an expression for the information processing apparatus calculating priority may be variable. For example, a definition for calculating priority (e.g., a value of a parameter within an expression) may be determined as appropriate according to what kind of file the user considers desirable to be backed up. That is to say, priority may be calculated in accordance with an expression customized according to the user's thought. It goes without saying that the information processing apparatus may calculate priority in accordance with a default expression.

In either case, according to the first embodiment, the more backup of a file is preferred, the higher the priority is, and accordingly, this file is preferentially selected and backed up. As a result thereof, waste of time and storage regions is reduced. Also, the user does not have to take time on selection of a part of files to be backed up out of a great number of files, and accordingly, the user's load is small.

Backup efficiency as described above is specifically realized by the processing in FIG. 1. Hereinafter, the processing in FIG. 1 will be described in detail.

In step S1, the information processing apparatus obtains, regarding each operation performed on each of multiple files stored on the multiple terminals (or multiple terminals and the computer) in a distributed manner, history information that indicates the type of this operation. Examples of the type of an operation include creation, editing, access, copy, renaming, movement between directories, transmission, and reception. The editing operation is, in other words, an modification operation. The history information may further indicate a point in time when this operation was performed, and length of time taken for this operation.

Next, in step S2, the information processing apparatus obtains tracking information. The tracking information indicates relationship between a parent file and a child file caused due to a duplication operation. More particularly, "duplication operation" may be any of the following.

An example of the duplication operation is a duplication operation to be performed within one terminal of the multiple terminals. An example of this is an operation wherein a file is copied within a terminal.

Another example of the duplication operation is a duplication operation to be performed between two terminals of the multiple terminals. For example, in the event that a first terminal transmits a file stored in the first terminal to a second terminal, and the second terminal stores the received file in the second terminal, the file is duplicated between the terminals as a result thereof.

As yet another example of the duplication operation, there is a duplication operation to be performed between one of the multiple terminals and a computer (e.g., server) configured to perform communication with multiple terminals via a network. For example, in the event that a first terminal transmits (i.e., uploads) a file stored in the first terminal to the server, and the server stores the received file in the server, the file is duplicated between the terminal and server as a result thereof. Also, in the event that a second terminal receives (i.e., downloads) a file on a server as well, the file is duplicated between the terminal and server.

Hereinafter, for convenience of description, in the event that a second file has been obtained by duplicating a first file, the first file will also be referred to as "parent file", and the second file will also be referred to as "child file". The parent file is, in other words, a duplication source file, and the child file is a file to be newly created by a duplication operation for the parent file. Also, with the following description, "root file", "descendent file", or the like will also be referred using terms such as "root", "leaf", "ancestor", "descendent" and so forth regarding a tree structure. According to tracking information, parent-child relationship between files may be tracked.

Note that execution order of steps S1 and S2 may be reversed, or steps S1 and S2 may be executed in parallel. Also, obtaining of history information in step S1 may be temporally distributed, and obtaining of tracking information in step S2 may also be temporally distributed.

For example, each time one operation is performed on one file, the information processing apparatus may obtain history information regarding this operation. Alternatively, the information processing apparatus may obtain at once history information regarding each of one or more operations performed on each of several files.

Similarly, each time of one duplication operation, the information processing apparatus may obtain tracking information that indicates parent-child relationship caused due to this duplication operation. Alternatively, the information processing apparatus may obtain tracking information regarding several duplication operations at once.

Also, history information regarding a certain operation for a certain file may be generated by the information processing apparatus itself. That is to say, the information processing apparatus may obtain history information by generating the history information by itself according to detection of an operation. On the other hand, the information processing apparatus may also receive history information regarding an operation on another file from another device. That is to say, the information processing apparatus may obtain history information by reception. The information processing apparatus may obtain part of history information by generation, and obtain the remaining history information by receiving from another device.

Similarly, tracking information regarding a certain duplication operation may also be generated by the information processing apparatus itself. That is to say, the information processing apparatus may obtain tracking information by generating the tracking information by itself according detection of a duplication operation. On the other hand, the information processing apparatus may also receive tracking information regarding another duplication operation from another device. That is to say, the information processing apparatus may obtain tracking information by reception. The information processing apparatus may obtain part of tracking information by generation, and obtain the remaining tracking information by receiving from another device.

For example, the information processing apparatus which executes the processing in FIG. 1 may be a first terminal of the multiple terminals. In this case, the information processing apparatus may detect an operation to be performed on the first terminal for one file stored in the first terminal of multiple files. Next, the information processing apparatus may generate history information that indicates the type of the detected operation.

Also, in the event that the information processing apparatus which executes the processing in FIG. 1 is the first terminal, the information processing apparatus may detect transmission from a particular terminal to the first terminal of one file stored in the particular terminal of the multiple terminals of multiple files. Next, the information processing apparatus may estimate information regarding the file transmitted from the particular terminal to the first terminal. For example, the information processing apparatus may estimate creation time and date of the file.

Also, the particular terminal may specifically be a terminal having no function to generate history information, or may be a terminal having no network communication function. The information processing apparatus may generate history information that indicates a type called "creation" (specifically, creation at the particular terminal) regarding the file instead of the particular terminal.

Also, in the event that the information processing apparatus which executes the processing in FIG. 1 is the first terminal, the information processing apparatus may detect a duplication operation wherein a first file stored in the first terminal is duplicated to a second file within the first terminal. Next, the information processing apparatus may generate tracking information that correlates the first file and the second file.

Conversely, the information processing apparatus which executes the processing in FIG. 1 may be a computer (e.g., server) configured to perform communication with at least one or more of the multiple terminals via a network. In this case, the information processing apparatus may receive history information that indicates the type of an operation to be performed on a first terminal for one file stored in the first terminal of the multiple terminals, from the first terminal. Also, in this case, the information processing apparatus may obtain part of tracking information by reception, and obtain the remaining tracking information by generation.

For example, of multiple files, in the event that a first terminal has duplicated a third file stored in the first terminal to a fourth file within the first terminal, the information processing apparatus may receive tracking information that correlates the third file and fourth file, from the first terminal. Also, of multiple files, in the event that the first terminal has transmitted a fifth file stored in the first terminal to a second terminal, and the second terminal has stored the transmitted fifth file in the second terminal as a sixth file, the information processing apparatus may generate tracking information. Specifically, the information processing apparatus may generate tracking information that correlates the fifth file and sixth file based on notification regarding the fifth file from the first terminal, and notification regarding the sixth file from the second terminal.

The notification regarding the fifth file from the first terminal may specifically be history information that indicates the type of an operation called "transmission" for the fifth file at the first terminal. Similarly, the notification regarding the sixth file from the second terminal may specifically be history information that indicates the type of an operation called "reception" for the sixth file at the second terminal. That is to say, the information processing apparatus may obtain tracking information by receiving history information transmitted from each of the two terminals and by generating tracking information based on the history information.

Also, in the event that the information processing apparatus which executes the processing in FIG. 1 is a computer (e.g., server) configured to perform communication with at least one or more of the multiple terminals via a network, the information processing apparatus may operate as follows regarding a duplication operation between the terminal and information processing apparatus. Of multiple files, the first terminal may transmit a seventh file stored in the first terminal to the information processing apparatus, and the information processing apparatus may store the transmitted seventh file in the information processing apparatus as an eighth file. In this case, the information processing apparatus may obtain tracking information by generating the tracking information that correlates the seventh file and eighth file.

As described above, a specific procedure for obtaining information in steps S1 to S2 may change according to embodiments.

Now, in subsequent steps S3 to S5, the information processing apparatus calculates priority regarding each file included in the multiple files using history information and tracking information. The priority is specifically based on the following situations.

The type of an operation performed on this individual files.
Whether or not there is another file correlated with this individual file by tracking information of the multiple files.
In the event that there is the other file, whether or not the data of this individual file is equal to the data of the other file.

Specifically, in step S3, the information processing apparatus determines whether or not there is a file of which the priority has not been calculated of the multiple files on multiple terminals (or multiple terminals and the computer). In the event that there is remained a file of which the priority has not been calculated, the processing in FIG. 1 proceeds to step S4. Conversely, In the event that priority has been calculated regarding all of the files, the processing in FIG. 1 proceeds to step S6.

In step S4, the information processing apparatus selects one file of which the priority has not been calculated. For convenience of description, hereinafter, the file selected in step S4 will be referred to as "selected file".

Next, in step S5, the information processing apparatus calculates priority of the selected file using history information and tracking information. What the priority is based on is as described above, but more detailed description is as follows.

The type of an operation performed on the selected files (e.g., in the event that some sort of operation has been performed regarding the selected file five times, the type of each of five operations). The type of an operation performed on the selected file is indicated with history information.
Whether or not there is another file (i.e., a parent file of the selected file or a child file of the selected file) correlated with the selected file by tracking information.
In the event that there is the other file correlated with the selected file by tracking information, whether or not the data of the selected file is equal to the data of the other file correlated with the selected file by tracking information.

After calculation of priority in step S5, the processing in FIG. 1 returns to step S3. Next, upon calculating priority regarding all of the files by repetition in steps S3 to S5, the next in steps S6 to S7, the information processing apparatus selects one or more files out of the multiple files in descending order of priority within a range that satisfies a certain condition.

Note that the "certain condition" is a condition specified regarding the amount of a file to be backed up. For example, a condition may be specified with a total size of a file such as "up to 15 Gigabytes (GB) in total". Also, a condition may be specified according to the number of files, such as "up to 1000 files".

Specifically, in step S6, the information processing apparatus determines whether or not the specified condition is satisfied even when selecting a file having the highest priority out of files unselected as an object to be backed up. If a file having the highest priority is selected out of files unselected as an object to be backed up, when the specified condition is still satisfied, the processing in FIG. 1 proceeds to step S7.

For example, as described above, let us say that a condition as "up to 15 GB in total" has been specified. In this case, if a file having the highest priority is selected out of files unselected as an object to be backed up, when a total size of a file selected as an object to be backed up is equal to or smaller than 15 GB, the processing in FIG. 1 proceeds to step S7.

Next, in step S7, the information processing apparatus selects, as an object to be backed up, a file having the highest priority out of files unselected as an object to be backed up. After selection in step S7, the processing in FIG. 1 returns to step S6.

Upon steps S6 to S7 being repeated as described above, files having higher priority are selected in order as an object to be backed up. Next, in step S6 after a certain number of files are selected, determination is made that upon a file having the highest priority being selected out of files unselected as an object to be backed up, the specified condition is not satisfied. Upon such determination being made in step S6, the processing in FIG. 1 is ended. Note that in the event that even after the information processing apparatus ended selection of all of files, when the specified condition is still satisfied (e.g., in the event that capacity greater than a total size of all files has been specified as a condition, or the like), the processing in FIG. 1 is also ended.

After selecting a file to be backed up by the processing in FIG. 1 as described above, the information processing apparatus performs appropriate processing in accordance with the selection result. For example, in the event that the information processing apparatus itself executes backup of a file, the information processing apparatus backs up the selected file.

Also, the information processing apparatus itself may not execute backup of a file. In this case, the information processing apparatus informs the selection result to a device which executes backup of a file (e.g., of multiple terminals, a terminal in which backup software has been installed). Thus, backup is performed according to the selection result in FIG. 1. Notification of the selection result specifically includes file identification information that indentifies each file that the information processing apparatus has selected as an object to be backed up. The file identification information includes, for example, information for identifying a terminal in which a file is stored, and information for identifying a file within a terminal (e.g., absolute path of a file).

Incidentally, as described above, an expression for the information processing apparatus calculating priority is determined so that the more backup of a file is preferred, the higher the priority is. Hereinafter, several specific examples regarding priority will be illustrated.

For example, let us say that in step S4 the information processing apparatus has selected a certain root file (i.e., of multiple files, a file not obtained by a duplication operation for another file). In this case, the processing wherein in step S5 the information processing apparatus calculates priority of the root file may include processing wherein the priority of the root file is raised according to each operation performed on each of one or more descendent files directly or indirectly obtained from the root file by one or more duplication operations.

For example, the user may take a picture using a terminal including a camera. As a result of shooting, an image file is stored in the terminal. The user may copy the original image file while leaving the original image file without change, and subject a new image file obtained by copy to retouch. The user may further copy the image file subjected to retouch, and further subject a new image file obtained by copy to retouch. In this manner, the user may create some image files having a different version.

In this case, the original image file serves as the root file. The image files derived directly or indirectly from the root file as described above serve as descendent files.

On the other hand, it is assumed that the user seldom performs many intentional operations on a file that the user considers unnecessary. In other words, in the event that some descendent files are created from the root file, there is a high probability that the user regards the root file as important.

Also, even if a descendent file were deleted, it is not impossible to recreate the same file as the deleted one by the user repeating the same operations as those in the past. However, in the event that the root file were deleted, it is difficult to reproduce the root file.

Therefore, it is desirable to raise the priority of the root file (i.e., to suppress deletion of the root file so as to preferentially back up the root file). Accordingly, as described above, when calculating the priority of the root file, the information processing apparatus may raise the priority of the root file according to each operation performed on each descendent file. It goes without saying that it is desirable for the information processing apparatus to raise the priority of the root file according to each operation performed on the root file itself.

Also, not only the root file but also a leaf file (of one or more descendent files derived from the root file, a file other than a duplication source file in any duplication operation) may be conceived to have relatively high importance. This is because an intermediate file which is nether the root file nor a leaf file indicates a state in the middle of an editing process, on the other hand, a leaf file is the latest version file on which the latest editing result has been reflected. Accordingly, in the event of selecting a leaf file in step S4, in step S5 the information processing apparatus may raise the priority of the selected leaf file according to the priority of the root file.

Incidentally, as described regarding step S5, the priority of the selected file is also based on whether or not the data of the selected file is equal to the data of another file correlated with the selected file by tracking information. Specifically, the priority of the selected file is higher in a case where the data of both files are not equal than in a case where the data of both files are equal.

For example, let us say that a second file has been obtained by a duplication operation for a first file of multiple files. After the duplication operation, the first file may be edited, or the first file may not be edited. Similarly, after the duplication operation, the second file may be edited, or the second file may not be edited. Accordingly, the data of the first file and the data of the second file are not necessarily equal.

In the event that the data of the first file and the data of the second file are equal, the second file may also be regarded as a backup copy of the first file, and the first file may also be regarded as a backup copy of the second file. That is to say, in the event that the data of the first file and the data of the second file are equal, the first file is not too high in necessity to be backed up, and the second file is not too high in necessity to be backed up.

Accordingly, in the event that the data of the first file and the data of the second file differ, necessity to back up the first and second files is higher in a case where the data of the first file and the data of the second file differ than in a case in the data of the first file and the data of the second file are equal. Therefore, priority may be defined as follows.

The priority of the first file is higher in a case where the data of the first file and the data of the second file are not equal as compared to a case where the data of the first file and the data of the second file are equal.

The priority of the second file is higher in a case where the data of the first file and the data of the second file are not equal as compared to a case where the data of the first file and the data of the second file are equal.

Incidentally, a file may be changed according to the user's instructions, or may automatically be changed. For example, data may be added to some sort of file by a daemon with a predetermined time interval. Importance for the user is assumed to be higher in a file changed by the user herself/himself than a file automatically updated regardless of the user's intention.

Now, for convenience of description, of operations for a file, an operation based on an instruction from the user will be referred to as "user-driven operation". Conversely, an operation to be automatically performed by a terminal which stores this file of multiple terminals executing a predetermined program will be referred to as "automatic operation".

The user-driven operation may influence priority so as to raise the priority higher than the priority of the automatic operation. That is to say, the information processing apparatus may calculate higher priority in a case where the user-driven operation has been performed than in a case where the automatic operation has been performed.

Incidentally, when comparing a file which the first terminal received from the second terminal or server, and a file existing in the first terminal alone, necessity to back up the former file is lower than necessity to back up the latter file. This is because backup copy of the former file is regarded as existing in the second terminal or server.

Therefore, a creation operation for creating a new file may influence priority so as to raise the priority higher than another operation (more specifically, for example, reception operation). That is to say, in the event that a creation operation has been performed, the information processing apparatus may calculate higher priority than in a case where another operation has been performed. As a rough tendency, for example, the priority of a file created by the first terminal and existing in the first terminal alone may be raised higher than the priority of a file which the first terminal received from the second terminal.

Incidentally, history information may further indicate a time point when an operation was performed. In this case, an arrangement may be made wherein, regarding each operation performed on each of multiple files, the newer a time point when this operation was performed, the higher the priority of this file is. This is because it may be conceived that importance for the user is higher in a file on which the user has lately performed some sort of operation (may be any kind of operation for example, such as access, editing, renaming, copy, or transmission) than a file on which the user has not performed any operation for a long period of time.

Also, history information may further indicate time taken for an operation. In this case, an arrangement may be made wherein, regarding each operation performed on each of multiple files, the longer time taken for this operation, the higher the priority of this file is. For example, importance of a file edited by the user having applied for a long period of time is conceived to be higher, and accordingly, priority may be determined according to time taken for an operation.

Next, a configuration example of a system to which the first embodiment may be applicable will be described with reference to FIG. 2. The description regarding FIG. 1 may be applicable to systems having various configurations. FIG. 2 illustrates an example of a system configuration.

A system 100 in FIG. 2 includes various devices connected to a network 101. The network 101 may be any of a local area network (LAN), a wide area network (WAN), the Internet, and a combination of these.

For example, a certain user uses four terminals of a smart phone 102, a tablet terminal 104, a PC 106, and a camera 109. The smart phone 102 includes an solid-state drive (SSD) 103, and is connectable with the network 101. The tablet terminal 104 also includes an SSD 105, and is connectable with the network 101.

Also, the PC 106 includes an HDD 107, and is connectable with the network 101. Further, an external HDD 108 may be connected to the PC 106. Also, the camera 109 may be connectable with the network 101 (e.g., digital camera having a wireless communication function), but may not have a communication function. For example, the camera 109 may be connectable with the PC 106 via a universal serial bus (USB) cable.

A terminal 110 and a terminal 111 which another user uses may further be connected to the network 101.

Also, a management server 112 is connected to the network 101. A content server 113 may further be connected to the network 101, or may be connected to a network-attached storage (NAS) 114 or file server.

"multiple terminals" described regarding FIG. 1 may specifically be the smart phone 102, tablet terminal 104, PC 106, and camera 109. Also, "at least of one or more of multiple terminals and a computer configured to perform communication via a network" described regarding FIG. 1 may specifically be the management sever 112. The management sever 112 may communicate with the smart phone 102, tablet terminal 104, and PC 105 via the network 101.

The "information processing apparatus" configured to execute the processing in FIG. 1 may specifically be the PC 106 or management 112, for example. For example, backup software may have been installed in the PC 106, and the PC 106 may back up a file selected by the processing in FIG. 1. Individual files to be backed up are stored in any of the following places, for example.

SSD 103 within the smart phone 102
SSD 105 within the tablet terminal 104
HDD 107 within the PC 106
Unillustrated nonvolatile storage region within the camera 109 (e.g., flash memory card)

Where the PC 106 backs up the selected file may be determined as appropriate in accordance with an instruction from the user, for example. For example, the PC 106 may back up a file selected by the processing in FIG. 1 to one of the following regions.

Region on the HDD 107 within the PC 106
Region on the HDD 108
Region on the NAS 114
Combination of the region on the SSD 103, the region on the SSD 105, and the region on the HDD 107

In the event that the "information processing apparatus" which executes the processing in FIG. 1 is the management server 112, the management server 112 may inform the selection result to the PC 106. Thus, the PC 106 backs up the selected file to one of the regions in accordance with the notification from the management server 112.

The content server 113 accepts upload of a file from a user terminal via the network 101. The uploaded file may be disclosed to the user himself/herself alone who is an owner of the file, or may be disclosed to only a group of particular some users, or may be disclosed to the public without limitation.

The management server 112 and content server 113 may be the same single computer. That is to say, the management server 112 may also serves as the content server 113. In the event that the management sever 112 also serves as the content server 113, the management server 112 may detect a duplication operation between the content server 113 and the terminal.

For example, in the event that a file on the tablet terminal 104 has been uploaded, the file on the tablet terminal 104 is a parent file, and a file saved on the content server 113 is a child file. The management server 112 may generate tracking information that correlates a parent file and a child file according to reception of a file from the tablet terminal 104.

As may be apparent from description regarding steps S1 to S2 in FIG. 1, some of history information or some of tracking information may be transmitted from the smart phone 102 to the management server 112. Also, some of history information or some of tracking information may be transmitted from the tablet terminal 104 to the management server 112. Similarly, some of history information or some of tracking information may be transmitted from the PC 106 to the management server 112.

Conversely, some of history information or some of tracking information may be transmitted from the management server 112 to the PC 106. Further, some of history information or some of tracking information may be transmitted from the management server 112 to the smart phone 102 or tablet terminal 104. A more specific procedure example regarding obtaining of history information and tracking information will be illustrated in later-described second and third embodiments.

Incidentally, the information processing apparatus which executes the processing in FIG. 1 may specifically be configured as FIG. 3. An information processing apparatus 200 in FIG. 3 includes a central processing unit (CPU) 201, random access memory (RAM) 202, a network communication apparatus 203, and a serial connection interface circuit 204. Hereinafter, "interface" may be abbreviated as "I/F". The information processing apparatus 200 further includes an input device 205, an output device 206, a nonvolatile storage device 207, and a reader/writer 208 of a storage medium 210. "reader/writer" means "reader and writer".

The components within the information processing apparatus 200 are mutually connected by a bus 209. Also, the information processing apparatus 200 is connected to a network 220 via the network communication apparatus 203. The network 220 may be any of a LAN, a WAN, the Internet, and a combination thereof. Also, the network 220 may be a cable network or wireless network or a combination of both.

The CPU 201 is a single core or multi core processor. The information processing apparatus 200 may include multiple processors. For example, the information processing apparatus 200 may include two or more CPUs 201. The CPU 201 loads a program to the RAM 202, and executes the program while also using the RAM 202 as a working area.

The network communication apparatus 203 is a cable LAN interface, a wireless LAN interface, or a combination thereof, for example. The network communication apparatus 203 specifically may be an external network interface card (NIC) or on-board network interface controller. For example, the network communication apparatus 203 may include a circuit called a "PHY chip" configured to perform processing of a physical layer, and a circuit called "MAC chip" configured to perform processing of a media access control (MAC) sub layer.

The serial connection I/F circuit 204 may include a USB controller and a USB port for USB connection, for example. Alternatively, the serial connection I/F circuit 204 may be a circuit for serial connection other than USB. The information processing apparatus 200 may include a parallel connection I/F circuit instead of the serial connection I/F circuit 204 (or in addition to the serial connection I/F circuit 204).

For example, in the event that the PC 106 is the information processing apparatus 200, the serial connection I/F circuit 204 may include two or more USB ports. In this case, the information processing apparatus 200 and HDD 108 may be connected via one of the USB ports, and the information processing apparatus 200 and camera 109 may be connected via the other USB port.

The input device 205 is a keyboard, pointing device, microphone, camera, or a combination thereof, for example. The pointing device may be a mouse or touch pad or touch screen, for example. The output device 206 is a display, speaker, or a combination thereof. The display may be a touch screen.

The nonvolatile storage device 207 is an HDD, SSD, or a combination thereof, for example. Further, read-only memory (ROM) may be employed as the nonvolatile storage device 207.

Examples of the storage medium 210 include an optical disc such as compact disc (CD) or digital versatile disk (DVD) or the like, a magneto-optical disk, a magnetic disk, and a semiconductor memory card such as flash memory or the like. The reader/writer 208 may specifically be an optical disk driving device, magneto-optical disk driving device, or a magnetic disk driving device, or may be a reader/writer for memory cards.

A program which the CPU 201 executes may be installed into the nonvolatile storage device 207 beforehand. Or, an arrangement may be made wherein the program is provided in a manner stored in the storage medium 210, read from the storage medium 210 by the reader/writer 208, copied to the nonvolatile storage device 207, and then loaded to the RAM 202.

Or, the program may be downloaded from a program provider 221 on the network 220 to the information processing apparatus 200 via the network 220 and network communication apparatus 203, and installed. The program provider 221 is specifically an information processing apparatus different from the information processing apparatus 200.

Note that the RAM 202, nonvolatile storage device 207, and storage medium 210 are all examples of a tangible storage medium. These tangible storage media are not transitory media such as signal carriers.

As described above, the information processing apparatus which executes the processing in FIG. 1 may be the PC 106 in FIG. 2, or may be the management sever 112, for example. That is to say, the PC 106 may be the information processing apparatus 200 in FIG. 3, or the management server 112 may be the information processing apparatus 200.

Also, the information processing apparatus which executes the processing in FIG. 1 may specifically include a first storage unit which stores obtained history information, a second storage unit in which stores tracking information, a priority calculating unit configured to calculate priority, and a selecting unit configured to select one or more files in accordance with priority. The first storage unit and second storage unit may be realized by the nonvolatile storage device 207 in FIG. 2. Also, the priority calculating unit and selecting unit may be realized by the CPU 201 which executes a program.

Incidentally, other devices in FIG. 2 may also be configured as with FIG. 3. For example, in the event that the smart phone 102 is the information processing apparatus 200, the network communication apparatus 203 may specifically include a communication circuit conforming to the long term evolution (LTE) standard, and a wireless LAN interface circuit. Similarly, in the event that the tablet terminal 104 is the information processing apparatus 200 as well, the network communication apparatus 203 may include a communication circuit conforming to the LTE standard, and a wireless LAN interface circuit.

In the event that the camera 109 is the information processing apparatus 200, the network communication apparatus 203 may be omitted. Also, the input device 205 may be an imaging unit including a lens, a photoelectric conversion circuit, and so forth.

Each of the terminals 110 and 111, management server 112, and content server 113 may be configured as with the information processing apparatus 200.

Figure 4:
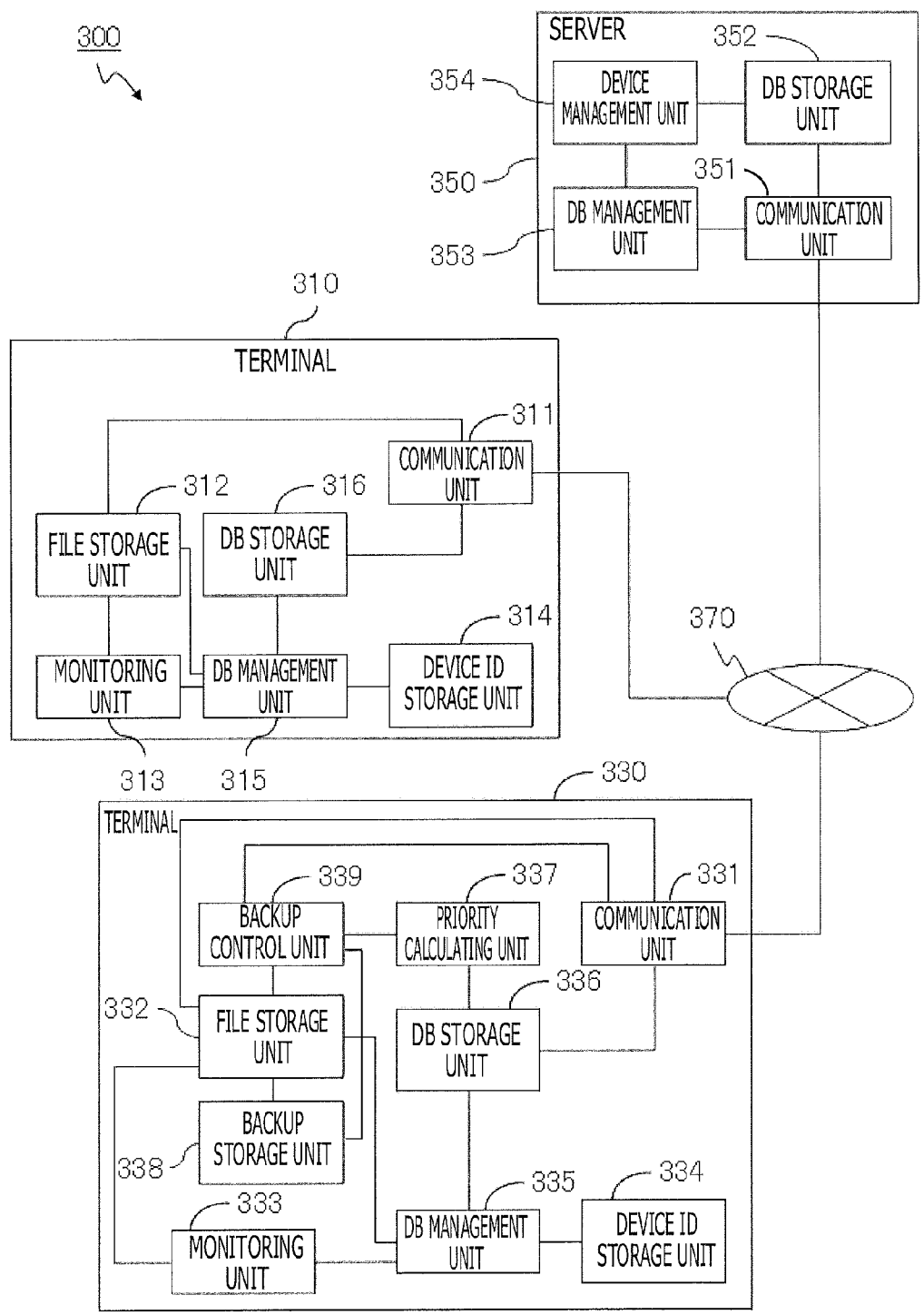
FIG. 4 is a system configuration diagram of a second embodiment.

Next, a second embodiment will be described with reference to FIGS. 4 to 15. FIG. 4 is a system configuration diagram according to the second embodiment. A system 300 in FIG. 4 includes two terminals 310 and 330 which a certain user uses, and further includes a server 350. The terminals 310 and 330, and server 350 are each connectable with a network 370. The type of the network 370 is optional.

For example, the terminal 310 may be the smart phone 102 or tablet terminal 104 in FIG. 2. The terminal 330 may be the PC in FIG. 2. The server 350 may be the management server 112 in FIG. 2. The network 370 may be the network 101 in FIG. 2.

More specifically, the terminal 310 includes a communication unit 311, a file storage unit 312, a monitoring unit 313, a device identification (ID) storage unit 314, a database (DB) management unit 315, and a DB storage unit 316.

The communication unit 311 communicates with the terminal 330 and server 350 via the network 370. The file storage unit 312 stores various files.

The monitoring unit 313 monitors operations for a file stored in the file storage unit 312. When detecting some sort of operation, the monitoring unit 313 outputs the monitoring result to the DB management unit 315.

For example, the monitoring unit 313 monitors the user-driven operation according to input to be provided via the input device 205 of the terminal 310 from the user. Further, the monitoring unit 313 may monitor the automatic operation to be automatically performed by the terminal 310 executing a predetermined program such as a daemon or the like, for example.

The monitoring unit 313 may hook calling of an application programming interface (API) function regarding file operations, or may hook a system call regarding file operations, for example. Also, in order to realize the monitoring unit 313, an add-on configured to hook menu selection on an application may be incrementally employed.

The monitoring unit 313 may detect operations for a file by hooking calling of the API function, system call, menu selection on an application, or the like. Further, the monitoring unit 313 may recognize a process of a caller of a system call hooked by the monitoring unit 313. Next, the monitoring unit 313 may determine whether the user-driven operation has been performed on a file, or the automatic operation has been performed thereon, according to the recognized process of the caller.

In the event of an add-on is employed for realizing the monitoring unit 313, an application-inherent operation (e.g., operation such as "addition of comment") is detectable. Also, in order to monitor transmission and reception of a file, the monitoring unit 313 may further monitor the communication unit 311. For example, the monitoring unit 313 may perform packet capturing for monitoring transmission and reception of a file.

Also, a particular application for supporting synchronization between terminals (e.g., some sort of photo management application, media player application, or the like) may be installed to both of the terminals 310 and 330. In this case, in order to realize the monitoring unit 313, an add-on of this particular application may be employed. Thus, the monitoring unit 313 may detect transmission and reception of a file by a synchronization function.

The monitoring unit 313 may monitor operation of a mailer. Specifically, the monitoring unit 313 may monitor saving of a file appended to an E-mail received by the terminal 310 to the file storage unit 312.

The device ID storage unit 314 stores a device ID for identifying the terminal 310. The DB management unit 315 creates information to be added to the DB storage unit 316 from the device ID stored in the device ID storage unit 314 and the monitoring result by the monitoring unit 313, and writes the created information in the DB storage unit 316. The DB storage unit 316 stores a DB including history information and tracking information described regarding FIG. 1.

Though a specific example of a DB will be described later along with FIG. 6, information included in a DB is a kind of metadata regarding a file stored in the file storage unit 312. Accordingly, hereinafter, information included in a DB will also be referred to as metadata. Evidently, tracking information is an example of metadata, and history information is also an example of metadata.

Note that, an arrangement may be made wherein the communication unit 311 receives metadata, and outputs the received metadata to the DB storage unit 316 or outputs metadata within the DB storage unit 316. Also, an arrangement may be made wherein the communication unit 311 receives a file, and outputs the received file to the file storage unit 312 or outputs a file stored in the file storage unit 312.

Now, the terminal 330 also includes, in the same way as with the terminal 310, a communication unit 331, a file storage unit 332, a monitoring unit 333, a device ID storage unit 334, a DB management unit 335, and a DB storage unit 336. The details of the communication unit 331, file storage unit 332, monitoring unit 333, device ID storage unit 334, DB management unit 335, and DB storage unit 336 are the same as with the terminal 310, and accordingly, description will be omitted. Note that a specific example of a DB which the DB storage unit 336 stores will be described later along with FIG. 7.

Also, with the second embodiment, the terminal 330 controls backup, and accordingly, the terminal 330 further includes a priority calculating unit 337, a back storage unit 338, and a backup control unit 339.

The priority calculating unit 337 calculates priority of each file by the same method as steps S3 to S5 in FIG. 1 using a DB stored in the DB storage unit 336 (specifically, DB including obtained history information and tracking information). In the event that the user uses two terminals of the terminals 310 and 330, files of which the priorities are calculated by the priority calculating unit 337 specifically include the following files.

Multiple files stored in the file storage unit 312 of the terminal 310
    Multiple files stored in the file storage unit 332 of the terminal 330

The backup control unit 339 uses the priority calculated by the priority calculating unit 337 to select a file to be backed up in the same way as with steps S6 to S7 in FIG. 1. Next, the back control unit 339 backs up the selected individual file to the backup storage unit 338. The backup control unit 339 is an example of a selecting unit configured to select one or more files to be backed up according to priority.

For example, for convenience of description, let us say that the backup control unit 339 has determined to back up 500 files of files stored in the file storage unit 312, and 1000 files of files stored in the file storage unit 332. In this case, the backup control unit 339 requests the terminal 310 to transmit the 500 files via the communication unit 331 and network 370, and receives the 500 files via the network 370 and communication unit 331. Next, the backup control unit 339 backs up the received 500 files to the backup storage unit 338. Further, the backup control unit 339 backs up the 1000 files from the file storage unit 332 to the backup storage unit 338. It goes without saying that what kind of sequence the backup control unit 339 uses to back up the 1500 files in total may optionally be changed according to embodiments.

The server 350 includes a communication unit 351, a DB storage unit 352, a device management unit 353, and a DB management unit 354.

The communication unit 351 communicates with the terminals 310 and 330 via a network 370. Specifically, the communication unit 351 may receive metadata from the terminal 310, or may transmit metadata to the terminal 310, or may receive metadata from the terminal 330, or may transmit metadata to the terminal 330.

The DB storage unit 352 stores a DB including metadata (i.e., DB including history information and tracking information). A specific example of a DB will be described later along with FIGS. 8 to 9, but with the second embodiment, The DB storage unit 352 stores a DB according to users.

The device management unit 353 manages correlation between a user and a device. That is to say, the device management unit 353 manages correlation between a user ID and a terminal device ID. Accordingly, the device management unit 353 may obtain from a device ID a user ID corresponding to this device ID. The DB management unit 354 determines whether to operate a DB for which user on the DB storage unit 352 according to the user ID obtained by the device management unit 353.

Incidentally, each of the terminals 310 and 330 and server 350 may be configured as with the information processing apparatus 200 in FIG. 3.

For example, the communication unit 311 may be realized by the network communication apparatus 203. The file storage unit 312, device ID storage unit 314, and DB storage unit 316 may be realized by the nonvolatile storage device 207. The monitoring unit 313 and DB management unit 315 may be realized by the CPU 201 which executes a program.

Also, the communication unit 331 may be realized by the network communication apparatus 203. The file storage unit 332, device ID storage unit 334, and DB storage unit 336 may be realized by the nonvolatile storage device 207. The monitoring unit 333, DB management unit 335, priority calculating unit 337, and backup control unit 339 may be realized by the CPU 201 which executes a program.

The backup storage unit 338 may be realized by the nonvolatile storage device 207 (e.g., in the event that the terminal 330 is the PC 106 in FIG. 2, the backup storage unit 338 may be the HDD 107). Alternatively, the backup storage unit 338 may be realized by an external storage device (e.g., HDD 108 in FIG. 2) connected thereto via the serial connection I/F circuit 204 in FIG. 3.

Also, the communication unit 351 may be realized by the network communication apparatus 203, and the DB storage unit 352 may be realized by the nonvolatile storage device 207. The device management unit 353 may be realized by the nonvolatile storage device 207 which stores a later-described device management table 520, and the CPU 201 which executes processing using the device management table 520. The DB management unit 354 may be realized by the CPU 201 which executes a program.

Next, description will be made regarding outline of operation of the terminals 310 and 330 and server 350 according to the second embodiment, with reference to FIGS. 1 to 5. As described regarding FIG. 1, the information processing apparatus which executes the processing in FIG. 1 may be one of multiple terminals, or a computer (e.g., server 350) which performs communication via at least one or more networks of multiple terminals. With the second embodiment, the information processing apparatus which executes the processing in FIG. 1 is specifically the terminal 330.

Also, as described regarding steps S1 and S2 in FIG. 1, a specific procedure for obtaining history information and tracking information varies according to embodiments.

With the second embodiment, the terminal 330 may obtain history information by generating history information, or may obtain tracking information by generating tracking information. Also, the terminal 330 may obtain history information by receiving history information from the server 350, or may obtain tracking information by receiving tracking information from the server 350.

Also, history information that the server 350 transmits to the terminal 330 may be history information obtained by the server 350 receiving from the terminal 310. Also, the server 350 may also generate tracking information based on the notification of history information from the terminal 310 and the notification of history information from the terminal 330. The server 350 may transmit tracking information thus generated to the terminal 330, and as a result thereof, the terminal 330 may obtain the tracking information.

Figure 5:
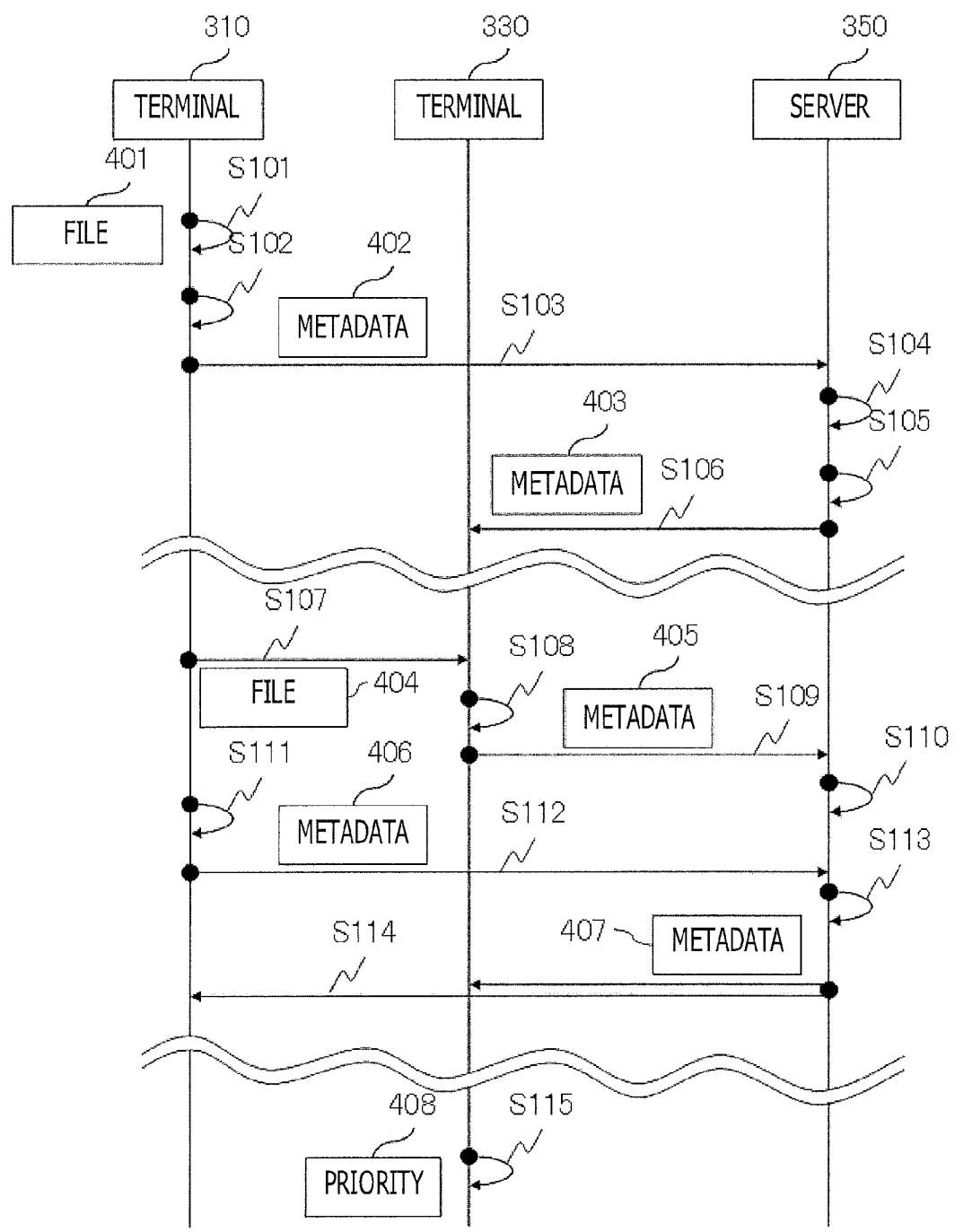
FIG. 5 is a diagram illustrating an example of an operation sequence of the second embodiment.

Hereinafter, description will be made regarding a specific example of exchange of metadata including history information and tracking information, with reference to FIG. 5. FIG. 5 is a diagram illustrating an example of an operation sequence according to the second embodiment.

In step S101, the terminal 310 creates a file 401. For example, in the event that the terminal 310 includes a camera as the input device 205, an image file is newly created by the user taking a picture. The file 401 may be an image file thus created. It goes without saying that the file 401 may be another type of file such as a text file, a spreadsheet file, or the like. The created file 401 is stored in the file storage unit 312.

Also, the monitoring unit 313 detects creation of the file 401. According to detection, in step S102, the DB management unit 315 generates metadata 402 including history information regarding creation of the file 401. The DB management unit 315 stores the generated metadata 402 in the DB storage unit 316.

Further, in step S103, the communication unit 311 transmits the metadata 402 to the server 305. The metadata 402 is received at the communication unit 351 of the server 350.

Next, in step S104, the device management unit 353 obtains a user ID for identifying the user of the terminal 310 from the device ID of the terminal 310 which is a transmission source of the metadata 402.

Next, in step S105, in accordance with the obtained user ID, the received metadata 402 is written in an appropriate DB within the DB storage unit 352. Updating of the DB in step S105 is controlled by the DB management unit 354.

Further, in step S106, metadata 403 is transmitted from the communication unit 351 to the terminal 330, received at the communication unit 331 of the terminal 330, and added to the DB storage unit 336. The file 401 is a file newly created by a creation operation, and accordingly, there is no parent-child relationship with another file. Accordingly, the metadata 403 includes no tracking information, and substantially, the metadata 402 is the same as the metadata 403.

As described above, the terminal 330 may obtain the metadata 403 including history information regarding creation of the file 401. Also, there may be performed operations such as editing, movement, renaming, and so forth regarding the file 401 on the terminal 310. Upon some sort of operation being performed on the file 401 at the terminal 310, metadata including history information regarding the performed operation may be obtained by a sequence similar to the sequence in steps S102 to S106.

Note that the file 401 may be copied within the terminal 310. A copy operation is a kind of a duplication operation. In this case, the terminal 330 obtains history information regarding a copy operation, and metadata including tracking information that indicates relationship between the file 401 (i.e., parent file) and a child file by a sequence similar to the sequence in steps S102 to S106.

Incidentally, the user of the terminals 310 and 330 may duplicate a file between the terminals. For example, an existing file 404 stored in the file storage unit 312 of the terminal 310 is transmitted from the communication unit 311 in step S107. The file 404 is received at the communication unit 331 of the terminal 330, and saved in the file storage unit 332.

Now, the monitoring unit 333 detects reception and saving of the file 404. According to the detection, in step S108 the DB management unit 335 generates metadata 405 including history information regarding reception and saving of the file 404. The DB management unit 335 stores the generated metadata 405 in the DB storage unit 336.

Further, in step S109, the communication unit 331 transmits the metadata 405 to the server 350. The metadata 405 is received at the communication unit 351 of the server 350.

Now, in step S110, the device management unit 353 obtains a user ID for identifying the user of the terminal 310 from the device ID of the terminal 310 which is a transmission source of the metadata 405. Also, in accordance with the obtained user ID, the received metadata 405 is written in an appropriate DB within the DB storage unit 352.

On the other hand, the terminal 310 executes, in the same way as with execution in steps S102 and S103 after the creation operation in step S101, steps S111 and S112 after the transmission operation in step S107. Specifically, this is performed as follows.

The monitoring unit 313 detects transmission of the file 404 in step S107. Now, according to the detection, in step S111 the DB management unit 315 generates metadata 406 including history information regarding transmission of the file 404. The DB management unit 315 stores the generated metadata 406 in the DB storage unit 316.

Further, in step S112, the communication unit 311 transmits the metadata 406 to the sever 350. The metadata 406 is received at the communication unit 351 of the server 350.

Now, in step S113, the device management unit 353 obtains a user ID for identifying the user of the terminal 310 from the device ID of the terminal 310 which is a transmission source of the metadata 406. Next, in accordance with the obtained user ID, the received metadata 406 is written in an appropriate DB within the DB storage unit 352. Updating of the DB at this time is also controlled by the DB management unit 354.

Further, the DB management unit 354 recognizes that the file 404 has been duplicated from the terminal 310 to the terminal 330 based on the metadata 405 that indicates reception at the terminal 330 of the file 404, and the metadata 406 that indicates transmission from the terminal 310 of the file 404. Accordingly, in step S113, the DB management unit 354 further generates metadata 407 including tracking information corresponding to a duplication operation between the terminals 310 and 330. The DB management unit 354 adds the generated metadata 407 to the DB storage unit 352.

Next, in step S114, the metadata 407 including tracking information as described above is transmitted from the communication unit 351 to both of the terminals 310 and 330. The metadata 407 is received at the communication unit 311 and stored in the DB storage unit 316, and also received at the communication unit 331 and stored in the DB storage unit 336.

Note that, in FIG. 5, for convenience of drawing, steps S108 to S110 are drawn prior to steps S111 to S113. However, in some instances, the server 350 may receive the metadata 406 prior to the metadata 405.

In either case, after receiving both of the metadata 405 and metadata 406, the server 350 generates metadata 407 including tracking information. The metadata 407 is then transmitted to the terminals 310 and 330. The terminal 330 which executes the processing in FIG. 1 may obtain tracking information regarding a duplication operation to be performed between the terminals 310 and 330 as described above.

Note that a file stored in the file storage unit 332 may be transmitted from the terminal 330 to the terminal 310. That is to say, a file may be duplicated from the terminal 330 to the terminal 310. In this case as well, the server 350 may generate metadata including tracking information based on the notification from the terminal 330 (specifically, metadata including history information regarding transmission) and the notification from the terminal 310 (specifically, metadata including history information regarding reception). Accordingly, the terminal 330 may obtain metadata including tracking information from the server 350.

Now, in step S115, a trigger event for backup of a file occurs. For example, backup start may explicitly be instructed from the user via the input device 205 of the terminal 330. Also, in the event that a backup schedule has been determined beforehand, the trigger event is specifically an event of "date determined by a backup schedule has come".

According to occurrence of the trigger event, the priority calculating unit 337 calculates priority 408 regarding the files stored in the file storage unit 312 of the terminal 310, and the files stored in the file storage unit 332 of the terminal 330. That is to say, the priority calculating unit 337 executes the same processing as with steps S3 to S5 in FIG. 1.

Next, the backup control unit 339 selects, according to the calculated priority 408, a file to be backed up, and backs up the selected each file to the backup storage unit 338.

Next, description will be made regarding a specific example of several types of information to be used for the second embodiment, with reference to FIGS. 6 to 9.

FIG. 6 is a diagram illustrating an example of a DB to be stored in the DB storage unit 316 in the second embodiment. A DB 500 in FIG. 6 includes an ID table 501, a history table corresponding to each entry within the ID table 501, and a tracking table 503. In FIG. 6, of the history table, only history tables 502a and 502b are exemplified.

Each entry of the ID table 501 corresponds to one file within one terminal. Each entry of the ID table 501 includes a device ID, a file ID, a file name, and a path.

For example, with the example in FIG. 6, the device ID of the terminal 310 is "mobile-001". A file ID regarding a file within the file storage unit 312 may specifically be a sequence number to be issued by the DB management unit 315 each time the monitoring unit 313 detects that a new file has been stored on the file storage unit 312. The ID table 501 in FIG. 6 indicates the following.

In the file storage unit 312, a file ID of "150" is assigned to a file of which the file name is "test.txt" within a directory identified by a path of "/mnt/doc/".

In the file storage unit 312, a file ID of "13" is assigned to a file of which the file name is "2013.jpg" within a directory identified by a path of "/mnt/pict/20120306/".

In the file storage unit 312, a file ID of "210" is assigned to a file of which the file name is "2013.jpg" within a directory identified by a path of "/mnt/pict/favorite/".

Now, the history table 502a corresponds to a file of which the file ID is "13". That is to say, each entry of the history table 502a is history information corresponding to one operation performed on the file of which the file ID is "13". Each entry of the history table 502a includes time and date, use time, a log type, and a unique value.

The unique value is a value uniquely determined for a file (i.e., a value inherent in a file), and is a (digest) value that digests the contents of a file. In this manner, history information not only simply indicates the type of an operation (i.e., log type), but also may further include a time point when an operation was performed, time taken for an operation, and a value uniquely determined for a file to be operated. Note that the value of use time may be omitted depending on log types.

Note that the unique value may specifically a hash value of a file. For example, the unique value may be a value to be calculated by a hash function such as message digest algorithm 5 (MD5) or the like. Also, with calculation of a unique value, only the data of a file itself may be used, or a file name, a path, or both thereof may further be used. Hereinafter, for simplification of description, let us say that collision between unique values may be allowed to be ignored.

The history table 502a specifically indicates the following.
A file of which the file ID is "13" was created on the terminal 310 at 8:20 on Mar. 6, 2012.
A unique value calculated from this file is "65615163".
This file was transmitted to a PC (specifically, terminal 330) at 8:21 on Mar. 6, 2012.
This file was accessed on the terminal 310 for 30 minutes from 8:23 on Mar. 6, 2012.
This file was copied on the terminal 310 at 8:25 on Mar. 6, 2012 in the middle of access. Specifically, this file was copied to a directory identified with a relative path of " . . . /favorite/".
The file is not changed due to transmission, access, or copy, and accordingly, the unique value is still "65615163".

Note that, in FIG. 6, for convenience, a relative path is exemplified, but an absolute path may be employed.

Now, a file obtained by the copy operation for a file of which the file ID is "13" is a file of which the file ID is "210". FIG. 6 also indicates the history table 502b corresponding to a file of which the file ID is "210". The format of the history table 502b is the same as with the history table 502a. The history table 502b specifically illustrates the following.
A file of which the file ID is "210" was obtained by copying another file at 8:25 on Mar. 6, 2012. Specifically, the file of which the file ID is "210" was obtained by copying a file in a directory identified by a relative path of " . . . /20120306".
A unique value of the file of which the file ID is "210" is the same "65615163" as with the duplication source file.
The file of which the file ID is "210" was edited on the terminal 310 for 45 minutes from 8:30 on Mar. 6, 2012.
The data of the file was changed due to editing, and accordingly, the unique value was also changed to "16153321".
Comment was added to this file on the terminal 310 for one hour from 9:31 on Mar. 7, 2012. For example, the user may add comment to this file using an application having a function for adding comment.
The data of the file was changed due to adding of comment, and accordingly, the unique value was also changed to "97488475".
This file was submitted to a web service at 10:45 on Mar. 7, 2012. Specifically, this file was uploaded to a server of some sort of web service such as blog serve, social networking service, file sharing service, or the like.
The file is not changed due to submission to a web service, and accordingly, the unique value is still "97488475".

Now, each entry of the tracking table 503 is equivalent to tracking information that indicates relationship between one parent file and one child file. In FIG. 6, two entries within the tracking table 503 are exemplified. Each entry of the tracking table 503 includes a parent device ID, a parent file ID, a child device ID, and a child ID.

The parent device ID is a device ID of a terminal in which a parent file is stored. The parent file ID is a file ID which a terminal in which a parent file is stored assigned to a parent file. A parent file is identified with a combination of a parent device ID and a parent file ID.

On the other hand, the child device ID is a device ID of a terminal in which a child file is stored. The child file ID is a file ID which a terminal in which a child file is stored assigned to a child file. A child file is identified with a combination of a child device ID and a child file ID.

Accordingly, with an entry that indicates parent-child relationship caused due to a duplication operation within one terminal, the parent device ID and child device ID are equal. Conversely, with an entry that indicates parent-child relationship caused due to a duplication operation between terminals or between a terminal and a server, the parent device ID and child device ID differ. However, for convenience of description, with the second embodiment, let us say that a duplication operation between a terminal and a server is not performed. A specific example of a duplication operation between a terminal and a server will be described later along with a third embodiment.

Specifically, the tracking table 503 indicates the following.
With a terminal of which the device ID is "mobile-001" (specifically, terminal 310), a file having a file ID of "13" was duplicated to a terminal of which the device ID is "PC-002" (specifically, terminal 330). Next, according to a duplication operation (specifically, transmission from the terminal 310, and duplication according to reception and saving at the terminal 330), a file ID of "83" was assigned to a file created on the terminal 330.
Specifically, a file identified by a pair of a device ID of "mobile-001" and a file ID of "13" is a parent file identified by a pair of a device ID of "PC-002" and a file ID of "83".
A file having a file ID of "13" was duplicated (specifically, copied within the terminal 310) within a terminal having a device ID of "mobile-001" (specifically, terminal 310). Next, an ID of "210" was assigned to a new file created on the terminal 310 as a result of the copy operation.
Specifically, a file identified by a pair of a device ID of "mobile-001" and a file ID of "13" is a parent file identified by a pair of a device ID of "mobile-001" and a file ID of "210".

Now, FIG. 7 is a diagram illustrating an example of a DB to be stored in the DB storage unit 336 of the terminal 330 in the second embodiment. A DB 510 in FIG. 7 includes an ID table 511, a history table corresponding to each entry within the ID table 511, and a tracking table 513. In FIG. 7, of the history tables, only history tables 512a and 512b are exemplified.

The format of the ID table 511 is the same as with the ID table 501 in FIG. 6. In FIG. 7, two entries regarding two files stored in the file storage unit 332, and one entry regarding one file stored in the file storage unit 312 (also exemplified in FIG. 6) are exemplified. Though omitted in FIG. 7, the same entry as with the remaining two entries exemplified in the ID table 501 in FIG. 6 is also included in the ID table 511.

As described above, "mobile-001" is the device ID of the terminal 310, and "PC-002" is the device ID of the terminal 330. Accordingly, the ID table 511 indicates the following.
A file ID of "351" is assigned to a file having a file name of "test.txt" in a directory identified by a path of "D:/doc/" in the file storage unit 332 of the terminal 330.
A file ID of "83" is assigned to a file having a file name of "snow_0306.jpg" in a directory identified by a path of "D:/temp/" in the file storage unit 332 of the terminal 330.
A file ID of "210" is assigned to a file having a file name of "2013.jpg" in a directory identified by a path of "/mnt/pict/favorite/" in the file storage unit 312 of the terminal 310.

Now, the history table 512a corresponds to a file identified by a file ID of "83" within the terminal 330. Each entry of the history table 512a is history information corresponding to one operation performed on this file. The history table 512a specifically indicates the following.
A file was received form a smart phone (specifically, terminal 310) at 8:21 on Mar. 6, 2012, the received file was stored in the file storage unit 332, and a file ID of "83" was assigned to the stored file.

A unique value of this file is, as may also be understood from the history table 502a in FIG. 6, "65615163".

This file thus stored in the file storage unit 332 was edited on the terminal 330 over one hour twenty minutes from 20:15 on Mar. 6, 2012.

The data of the file was changed due to editing, and accordingly, the unique value is also changed to "12345678".

After editing, this file was renamed as a file name of "snow_0306.jpg" at 21:37 on Mar. 6, 2012. The new file name after renaming is recorded in the ID table 511.

With the example in FIG. 7, let us say that a unique value depends on a file name. Accordingly, when renaming a file, the unique value thereof is also changed. Specifically, after a result of renaming at 21:37 on Mar. 6, 2012, the unique value was changed to "87654321".

Now, in FIG. 7, the history table 512b and tracking table 513 are exemplified. The history table 512b is the same as the history table 502b in FIG. 6, and the tracking table 513 is the same as the tracking table 503 in FIG. 6, and accordingly, detailed description will be omitted.

Note that, though omitted in FIG. 6, first and second entries within the ID table 511 exemplified in FIG. 7 are also included in the ID table 501 in FIG. 6. Accordingly, the terminal 310 also includes the same table as the history table 512a in FIG. 7. Similarly, the terminal 330 also includes the same table as the history table 502a in FIG. 6.

Figure 8:
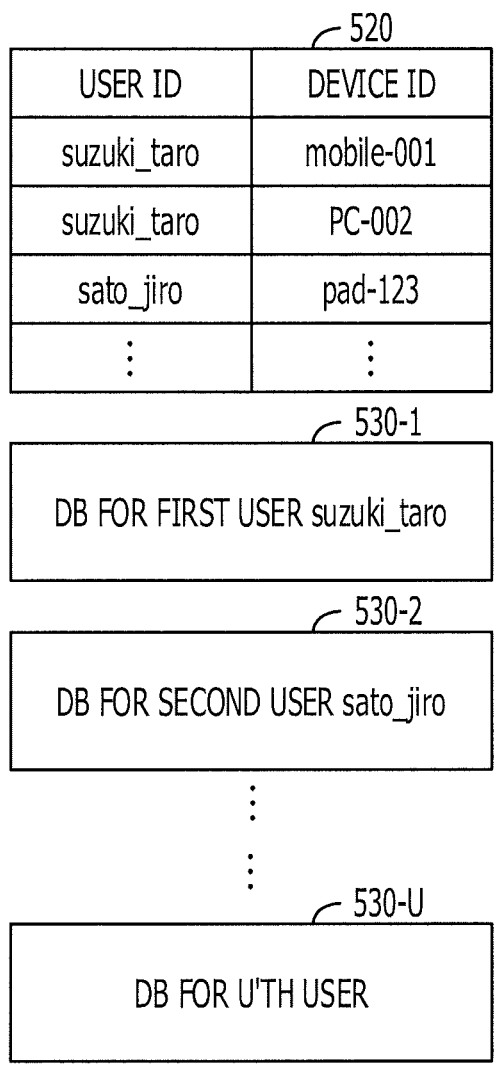
FIG. 8 is a diagram exemplifying outline of information to be stored in a server in the second embodiment.

FIG. 8 is a diagram exemplifying outline of information stored in the server 350 in the second embodiment. In FIG. 8, there are exemplified a device management table 520 which the device management unit 353 manages, and DBs 530-1 to 530-U according to users stored in the DB storage unit 352. Note that U is an integer equal to or greater than 1.

Each entry of the device management table 520 corresponds to one terminal. Each entry of the device management table 520 includes a user ID and a device ID. The device management table 520 indicates the following.

A user having a user ID of "suzuki_taro" uses a terminal having a device ID of "mobile-001".

This user also uses a terminal having a device ID of "PC-002".

That is to say, this user uses the terminals 310 and 330.

A user having a user ID of "sato_jiro" uses a terminal having a device ID of "pad-123".

For example, a user who desires automatic selection of a file to be backed up may first perform operations for registering the terminals which the user uses in the server 350. Next, the device management unit 353 may newly generate, at the time of registration, a unique device ID within the system 300 to assign the generated device ID to a terminal. Alternatively, existing information (e.g., identifier indicated with a combination of manufacturing vender, device name, and manufacturing serial number of a terminal, etc.) may be employed as a device ID. In either case, the device ID of the terminal 310 is stored in the device ID storage unit 314, and the device ID of the terminal 330 is stored in the device ID storage unit 334.

The device management table 520 may further include another field in addition to a user ID and a device ID. For example, the following field may be included in the first entry corresponding to the terminal 310. This is also applied to other entries.

A field that represents an E-mail address to be used at the terminal 310.

In the event that a particular application for supporting synchronization between the terminals 310 and 330 has been installed in the terminal 310, a field to be used for identifying the terminal 310 in this application.

The DB 530-1 is a DB for a first user (specifically, a user having a user ID of "suzuki_taro"). The details of the DB 530-1 will be exemplified in FIG. 9. The DB 530-2 is a DB for a second user (specifically, a user having a user ID of "sato_jiro"). The DB 530-U is a DB for the U'th user.

FIG. 9 is a diagram illustrating details of an example of the DB 530-1 stored in the server 350 in the second embodiment. As illustrated in FIG. 9, the DB 530-1 includes an ID table 531, a history table corresponding to each entry within the ID table 531, and a tracking table 533. In FIG. 9, of the history tables, only history tables 532a and 532b are exemplified.

The format of the ID table 531 is the same as the ID table 501 in FIG. 6. In FIG. 9, only the same three entries as the three entries exemplified in the ID table 511 in FIG. 7 are exemplified regarding the ID table 531. Though omitted in FIG. 9, the same entries as the first and second entries exemplified in the ID table 501 in FIG. 6 are also included in the ID table 531.

The history table 532a corresponds to a file identified by a file ID of "83" within the terminal 330 having a device ID of "PC-002". The history table 532a is the same as the history table 512a in FIG. 7.

The history table 532b corresponds to a file identified by a file ID of "210" within the terminal 310 having a device ID of "mobile-001". The history table 532b is the same as the history table 502b in FIG. 6.

Also, the tracking table 533 is the same as the tracking table 503 in FIG. 6.

As described above with reference to FIGS. 6 to 9, with the second embodiment, the DB storage units 316, 336, and 352 redundantly hold a similar DB. However, DBs may not necessarily have a redundant configuration. A modification will be described later wherein DBs have a non-redundant configuration.

Next, description will be made in detail regarding processing that the terminals 310 and 330 and server 350 perform in the second embodiment, with reference to FIGS. 10 to 15.

Figure 10:
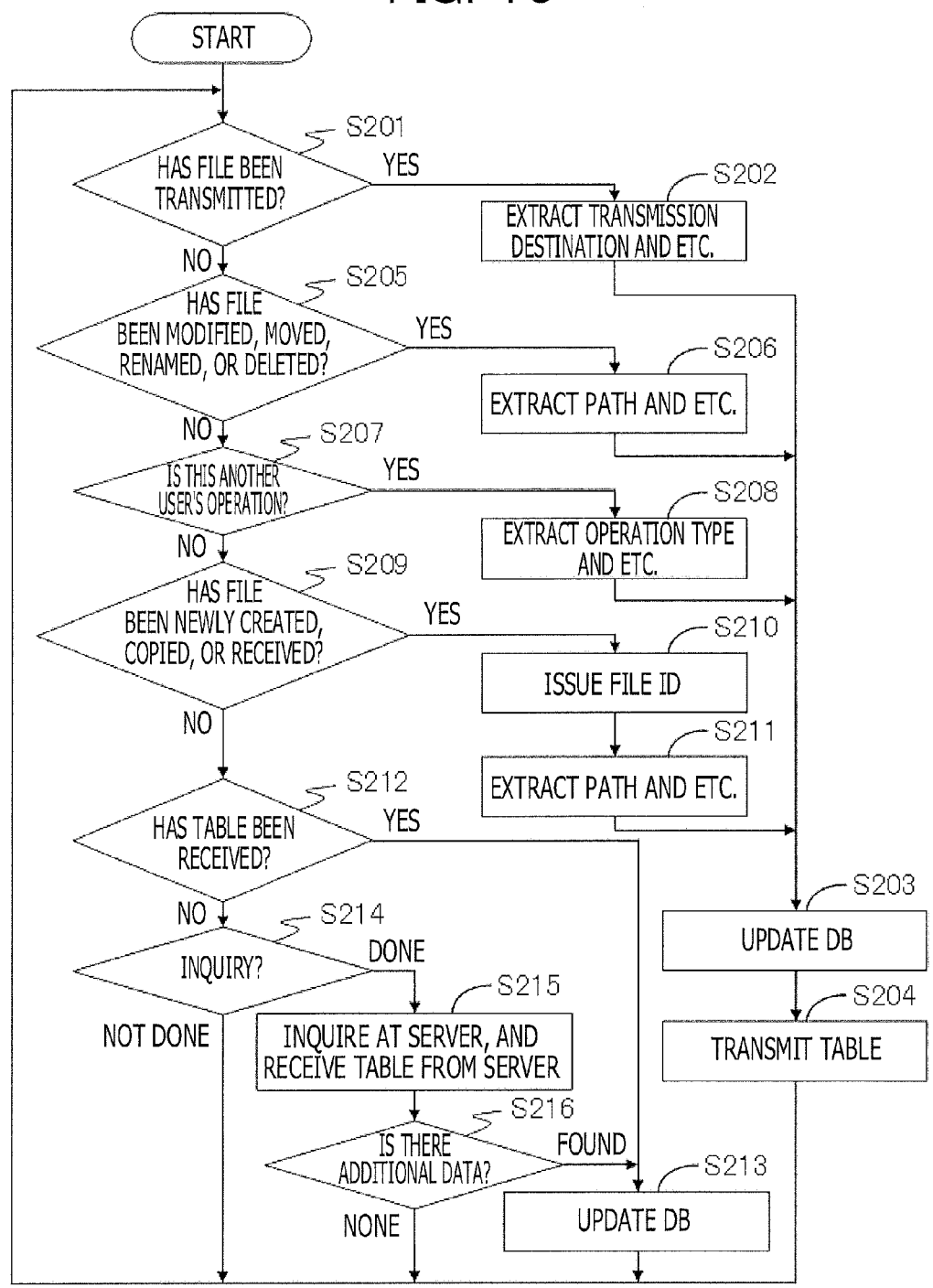
FIG. 10 is a flowchart of processing to be performed by a terminal in the second embodiment.

FIG. 10 is a flowchart of processing that the terminal 310 performs in the second embodiment. According to a certain viewpoint, the processing in FIG. 10 is processing for allowing the terminal 330 (i.e., information processing apparatus which performs calculation of priority) to obtain history information and tracking information. Upon the power of the terminal 310 being turned on, the terminal 310 starts the processing in FIG. 10.

In step S201, the DB management unit 315 determines whether or not an event that a file stored in the file storage unit 312 has been transmitted from the communication unit 311 has been detected by the monitoring unit 313. In the event that such an event has been detected (i.e., in the event that monitoring results that indicate detection of such an event have been output from the monitoring unit 313 to the DB management unit 315), the processing in FIG. 10 proceeds to step S202. Conversely, in the event that such an event has not been detected, the processing in FIG. 10 proceeds to step S205.

In step S202, the DB management unit 315 extracts information such as a file transmission destination and so forth from the monitoring results output from the monitoring unit 313 to the DB management unit 315. For example, the monitoring unit 313 may output monitoring results including the following items.

Information that indicates that a file has been transmitted (e.g., code that indicates "transmission" or the like).

Time and date when a transmission operation was performed.

A path of a directory in which the transmitted file is located, and the file name of this file.

Transmission destination information that indicates a transmission destination terminal (e.g., the name of a terminal, device ID, an E-mail address to be used for a transmission destination terminal, etc.).

The DB management unit 315 extracts time and date, and transmission destination information from the monitoring results. Also, the DB management unit 315 references the ID table 501 using a device ID, the path of a directory, and a file name stored in the device ID storage unit 314 as a search key to obtain a file ID. Also, the DB management unit 315 calculates, from a file identified by the path and file name, a unique value of this file.

In the next step S203, the DB management unit 315 updates the DB 500 using the extracted information. Further, in the next step S204, according to updating in step S203, a part or all of the one or more tables are transmitted from the communication unit 311 to the server 350 via the network 370. Note that, as illustrated in FIG. 10, step S203 is executed after step S202, S206, S208 or S211. Accordingly, which table is updated in step S203, and (a part or all of) which table is transmitted in step S204 depend on cases.

For example, in the event that step S203 is executed after step S202, in step S203 the DB management unit 315 adds a new entry to a history table corresponding to the transmitted file. For example, the second entry of the history table 502*a* in FIG. 6 is an example of an entry to be added in step S203 by the DB management unit 315 based on the information extracted in step S202.

Also, in the event that step S203 is executed after step S202, in step S204 an entry added to the history table in step S203, and a file ID corresponding to this history table may be transmitted. Alternatively, in step S204, the entirety of this history table may be transmitted along with a file ID corresponding to this history table. Step S112 in FIG. 5 is an example of step S204 to be executed after step S202.

After transmission in step S204, the processing in FIG. 10 returns to step S201.

Now, in step S205, the DB management unit 315 determines whether or not an event that a file stored in the file storage unit 312 has been modified, moved, renamed, or deleted has been detected by the monitoring unit 313. In the event that such an event has detected (i.e., in the event that the monitoring results that indicate detection of such an event have been output from the monitoring unit 313 to the DB management unit 315), the processing in FIG. 10 proceeds to step S206. Conversely, in the event that such an event has not been detected, the processing in FIG. 10 proceeds to step S207.

In step S206, the DB management unit 315 extracts information such a path and so forth regarding a file on which an operation has been performed from the monitoring results output from the monitoring unit 313 to the DB management unit 315.

For example, in the event that a certain file has been modified (e.g., in the event that the user has edited a file or added comment to a file using an application), the monitoring unit 313 may output monitoring results including the following items.

Information that indicates that a file has been modified (e.g., such as code that indicates "modification", or more segmentalized code that indicates a type such as "editing" or "addition of comment" or the like).

The path of a directory where the modified file is located.

The file name of the modified file.

In the event that the monitoring unit 313 may also detect time taken for modification of the file, time and data when modification of the file was started, and time taken for modification of the file.

In the event that the monitoring unit 313 has not detected time taken for modification of the file, time and date when the modified file was saved.

Also, in the event that a certain file has been moved from a certain directory to another directory, the monitoring unit 313 may output monitoring results including the following items.

Information that indicates that a file has been moved (e.g., code that indicates "movement", or the like).

The path of a directory where the file had been located before the file was moved.

The path of the directory of a destination where the file has been moved.

The file name of the moved file.

Time and date when a movement operation was performed.

Also, in the event that a certain file has been renamed, the monitoring unit 313 may output monitoring results including the following items.

Information that indicates that a file has been renamed (e.g., code that indicates "renaming", or the like).

The file name before the file was renamed.

The file name after renaming.

Time and date when a modification operation was performed.

Note that movement and renaming of a file may be performed at the same time by execution of some sort of command. In this case as well, the monitoring unit 313 outputs an appropriate monitoring result.

Also, in the event that a certain file has been deleted, the monitoring unit 313 may output monitoring results including the following items.

Information that indicates that a file has been deleted (e.g., code that indicates "deletion", or the like).

The path of a directory where the deleted file has been located so far.

The file name of the deleted file.

As exemplified above, the monitoring unit 313 outputs an appropriate monitoring result according to the type of an operation such as modification, movement, renaming, or deletion. Accordingly, in step S206 the DB management unit 315 may extract appropriate information such as a path or the like from the output monitoring result.

Also, the DB management unit 315 may extract a file ID by referencing the ID table 510 using a device ID stored in the device ID storage unit 314, a path and a file name obtained from the monitoring results as a search key. Further, the DB management unit 315 calculates a unique value from a file which has been modified, moved, or renamed. Thereafter, the processing in FIG. 10 proceeds to step S203.

In the event that step S203 is executed after step S206 as described above, in steps S203 and S204 the following processing is specifically performed.

For example, in the event that a certain file has modified, instep S203 the DB management unit 315 adds a new entry to a history table corresponding to the modified file. For example, the second and third entries in the history table 502*b* in FIG. 6 are examples of an entry to be added in step S203 after step S206. Next, in step S204, the entry added to the history table in step S203 (or the entirety of this history table), and a file ID corresponding to this history table are transmitted.

Also, in the event that a certain file has been moved, in step S203 the DB management unit 315 updates an entry corresponding to this moved file in the ID table 501. Specifically, the DB management unit 315 rewrites the path of this entry. Further, in step S203, the DB management unit 315 adds a new entry to a history table corresponding to the moved file. Next, in step S204, the rewritten entry within the ID table 501, and the entry added to a history table corresponding to that entry (or the entirety of this history table) are transmitted.

Also, in the even that a certain file has been renamed, in step S203 the DB management unit 315 updates an entry corresponding to this renamed file in the ID table 501. Specifically, the DB management unit 315 rewrites the file name of this entry. Further, in step S203, the DB management unit 315 adds a new entry to a history table corresponding to the renamed file. Next, in step S204, the rewritten entry within the ID table 501, and the entry added to a history table corresponding to that entry (or the entirety of this history table) are transmitted.

Also, in the even that a certain file has been deleted, in step S203 the DB management unit 315 deletes a history table corresponding to the deleted file from the DB 500. Next, in step S204, an entry within the ID table 501 corresponding to the deleted file is transmitted along with information that indicates deletion of the file.

Now, in step S207, the DB management unit 315 determines whether or not an event that another operation other than modification, movement, renaming, deletion, and copy has been performed on an existing file stored in the file storage unit 312 has been detected by the monitoring unit 313. In the event that such an event has been detected (i.e., in the event that the monitoring results that indicate detection of such an event have been output from the monitoring unit 313 to the DB management unit 315), the processing in FIG. 10 proceeds to step S208. Conversely, in the event that such an event has not been detected, the processing in FIG. 10 proceeds to step S209. Specifically, for example, in the event that an access operation of a file has been detected, the processing in FIG. 10 proceeds from step S207 to step S208.

For example, the monitoring unit 313 may monitor a system call for opening a file, a system call for writing data in a file, and a system call for closing a file. In the event that after a file was opened, the file was closed without writing anything, the monitoring unit 313 may detect an access operation. Conversely, in the event that after a file was opened, some sort of data was written in the file, and then the file was closed, the monitoring unit 313 may detect a modification operation (e.g., editing operation).

Now, in step S208, the DB management unit 315 extracts information such as an operation type or the like from the monitoring results output from the monitoring unit 313 to the DB management unit 315.

For example, in the event that the monitoring unit 313 has detected that a certain file has been accessed as described above, the monitoring unit 313 may output monitoring results including the following items.

Information that indicates that a file has been accessed (e.g., code that indicates "access", or the like).
  The path of a directory where the accessed file is located.
  The file name of the accessed file.
  Time taken for access of the file (i.e., time from the file was opened until the file was closed).
  Time and date when an access operation was started (i.e., time and date when the file was opened).

Thus, the DB management unit 315 may extract a type of "access", time taken for access, and time and date when the access operation was started from the monitoring results. Also, the DB management unit 315 may extract a file ID by referencing the ID table 501 using a device ID stored in the device ID storage unit 314, a path and file name obtained from the monitoring results, and a search key. Also, the DB management unit 315 calculates a unique value from the accessed file. Thereafter, the processing in FIG. 10 proceeds to step S203.

In the event that a step S203 is executed after step S208 as described, in steps S203 and S204, the following processing is specifically performed.

For example, in the event that a certain file has been accessed, in step S203 the DB management unit 315 adds a new entry to a history table corresponding to the accessed file. For example, the third entry in the history table 502*a* in FIG. 6 is an example of an entry to be added in step S203 after step S208. Next, in step S204, the entry added to the history table in step S203 (or the entirety of this history table), and a file ID corresponding to this history table are transmitted.

Now, in step S209, the DB management unit 315 determines whether or not an event that a new file is increased in the file storage unit 312 has been detected by the monitoring unit 313. More specifically, the DB management unit 315 determines whether or not one of the following three types of events has been detected.

Event of "a file has newly been created within the terminal 310".
  Event of "an existing file within the file storage unit 312 has been copied".
  Event of "a file has been received via the communication unit 311, and stored in the file storage unit 312".

In the event that one of the three types of events has been detected (i.e., in the event that the monitoring results that indicate detection of such an event have been output from the monitoring unit 313 to the DB management unit 315), the processing in FIG. 10 proceeds to step S210. Conversely, in the event that none of the three types of events has been detected, the processing in FIG. 10 proceeds to step S212.

In step S210, the DB management unit 315 issues a new file ID. For example, in the event that a sequence number is employed as a file ID, the DB management unit 315 may obtain a new file ID by incrementing a counter. Next, the DB management unit 315 may assign the obtained new file ID to a new file.

Next, in step S211, the DB management unit 315 extracts information such as a path or the like regarding the new file from the monitoring results output from the monitoring unit 313 to the DB management unit 315.

For example, in the event that a file has newly been created within the terminal 310, the monitoring unit 313 may output monitoring results including the following items.

Information that indicates that a file has been created (e.g., code that indicates "creation", or the like).
  The path of a directory where the created new file has been saved.
  The file name of the created new file.
  Time and date when the file was created on the file storage unit 312.

Also, in the event that an existing file within the file storage unit 312 has been copied, the monitoring unit 313 may output monitoring results including the following items.

Information that indicates that a file has been copied (e.g., code that indicates "copy", or the like).
  The path of a directory where an existing file on which a copy operation has been performed is located.
  The file name of this existing file.
  The path of a directory where a file newly created by the copy operation has been saved.
  The file name of this new file.
  Time and date when the copy operation was performed.

Also, in the event that a file has been received via the communication unit 311 and stored in the file storage unit 312, the monitoring unit 313 may output monitoring results including the following items.

- Information that indicates that a file has been received (e.g., code that indicates "reception", or the like).
- The path of a directory where the received file has been saved.
- The file name of the file received and newly saved.
- Time and date when the received file was saved on the file storage unit 312.
- Transmission source information that indicates a file transmission source (e.g., terminal name, device ID, E-mail address to be used at a transmission source terminal, etc.)

As exemplified above, the monitoring unit 313 outputs an appropriate monitoring result according to the type of an operation. Accordingly, in step S211, the DB management unit 315 may extract appropriate information such as a path or the like from the output monitoring result. Further, the DB management unit 315 calculates a unique value from a new file. Thereafter, the processing in FIG. 10 proceeds to step S203.

In the event that a step S203 is executed after step S211 as described, in steps S203 and S204, the following processing is specifically performed.

With a case where any of a creation operation, a copy operation, and a reception operation has been detected as well, in step S203 the DB management unit 315 adds a new entry to the ID table 501. Specifically, the following values are set to the fields of a new entry.

- The device ID of the terminal 310 read from the device ID storage unit 314.
- The new file ID issued in step S210.
- The path extracted in step S211.
- The file name extracted in step S211.

Further, in step S203, the DB management unit 315 creates a new history table corresponding to the new entry added to the ID table 501. The DB management unit 315 then adds the new entry to the created new history table. With the new entry, the information extracted in step S211 is set.

For example, the history table 502a in FIG. 6 is a table created in step S203 after a file was newly created within the terminal 310, a file ID of "13" was assigned to this file in step S210. The first entry in the history table 502a is an entry added in step S203 when the history table 502a was created.

Also, the history table 502b is a table created in step S203 after a file having a file ID of "13" was copied, and a file ID of "210" was assigned in step S210 to a new file created by a copy operation. The first entry in the history table 502b is an entry added in step S203 when the history table 502b was created.

Further, in the event that the detected operation is a copy operation, in step S203 the DB management unit 315 also adds a new entry to a history table corresponding to a copy source file. With the new entry, the information extracted in step S211 is set. In this case, in step S203 the DB management unit 315 further adds an entry that indicates parent-child relationship between files caused by the copy operation, to the tracking table 503.

For example, the fourth entry in the history table 502a in FIG. 6 is an entry added in the same step S203 as with the history table 502b being created. Also, the second entry in the tracking table 503 in FIG. 6 is an entry added in the same step S203 as with the history table 502b being created.

In the event that step S203 is executed after step S211, in step S204 at least the entry added to the ID table 501, and the newly created history table are transmitted. In the event that a copy operation has been performed, in step S204 further an entry within the ID table 501 corresponding to a copy source file, an entry added to a history table corresponding to the copy source file, and a new entry added to the tracking table 503 are also transmitted.

Now, in step S212, the DB management unit 315 determines whether or not an event that the communication unit 311 has received a part or the entirety of a table to be added to the DB 500 from the sever 350 has been detected by the monitoring unit 313. In the event that such an event has been detected (i.e., in the event that the monitoring results that indicate detection of such an event have been output from the monitoring unit 313 to the DB management unit 315), the processing in FIG. 10 proceeds to step S213. Conversely, in the event that such an event has not been detected, the processing in FIG. 10 proceeds to step S214.

For example, in the event that a part or the entirety of a table to be added to the DB 500 is received at a particular transmission control protocol (TCP) port, the monitoring unit 313 may monitor reception at the particular TCP port. Thus, the monitoring unit 313 may detect events as described above.

Note that "a part or the entirety of a table to be added to the DB 500" is specifically one or more combinations in the following.

- The entire ID table for replacing the entirety of the ID table 501.
- One or more new entries to be added to the ID table 501.
- Updated one or more entries for replacing one or more existing entries within the ID table 501.
- A new history table to be added to the DB 500.
- The entire history table for replacing the entirety of any one existing history table within the DB 500.
- One or more new entries to be added to any one existing history table within the DB 500.
- The entire tracking table for replacing the entirety of the tracking table 503.
- One or more new entries to be added to the tracking table 503.

For example, reception of the metadata 407 at the terminal 310 in step S114 in FIG. 5 is an example of reception in step S212. For example, the metadata 407 includes a new entry to be added to the tracking table 503.

Now, in step S213, the DB 500 is updated according to the contents received in step S212. Updating of the DB 500 in step S213 is controlled by the DB management unit 315.

For example, in the event that the entire ID table has been received, the DB management unit 315 may replace the existing ID table 501 with the received ID table. Alternatively, in the event that the entire ID table has been received, the DB management unit 315 may search an updated entry and an added new entry. Next, the DB management unit 315 replaces the existing entry within the ID table 501 with the updated entry, and add a new entry included in the received ID table to the ID table 501 within the DB 500.

With regard to history tables and tracking tables as well, the DB management unit 315 performs replacement of the entire table, updating of an entry, and/or addition of an entry using a similar method. Note that, in the event that a new history table has been received, the DB management unit 315 adds the received new history table to the DB 500.

For example, after updating of the DB 500 as described above, the processing in FIG. 10 returns to step S201.

Now, in step S214, the DB management unit 315 determines whether to perform inquiry to the server 350. "inquiry to the server 350" mentioned here is an inquiry regarding whether or not new data not included in the DB 500 within the terminal 310 is stored in the DB 530-1 of the server 350 (i.e., a DB for a user who uses the terminals 310 and 330).

For example, a user may explicitly instruct the terminal 310 to perform inquiry to the server 350 via the input device 205 of the terminal 310. In this case, the DB management unit 315 may detect input from the user. In the event of having detected input from the user, the DB management unit 315 determines to perform inquiry to the server 350.

Alternatively, in the event that time equal to or longer than predetermined time has already elapsed since the terminal 310 finally received metadata (i.e., a part or the entirety of the table) from the server 350, the DB management unit 315 may determine to perform inquiry to the server 350. Determination in step S214 may be realized by a flag or timer, for example.

Upon the DB management unit 315 determining to perform inquiry to the server 350, the processing in FIG. 10 proceeds to step S215. Conversely, upon the DB management unit 315 determining not to perform inquiry to the server 350, the processing in FIG. 10 returns to step S201.

In step S215, the communication unit 311 transmits an inquiry to the server 350. The inquiry is generated by the DB management unit 315. The inquiry may include time and date when the terminal 310 finally received metadata from the server 350. Also, the inquiry may include the number of entries in the ID table 501, the number of entries in the tracking table 503, and so forth.

A response is returned from the server 350 for the inquiry. The response returned from the server 350 is specifically a response including appropriate metadata (i.e., a part or the entirety of the table) or a response that indicates that no new data is stored. The communication unit 311 receives the response from the server 350 in step S215.

Next, in step S216, the DB management unit 315 determines whether or not there is additional data based on the received response (or based on comparison between metadata included in the received response, and the DB 500 within the terminal 310). That is to say, the DB management unit 315 determines whether or not there is new data not included in the DB 500 within the terminal 310.

In the event that there is additional data, the processing in FIG. 10 proceeds to step S213, and in step S213, the additional data is added to the DB 500. Conversely, in the event that there is no additional data, the processing in FIG. 10 returns to step S201.

Figure 11:
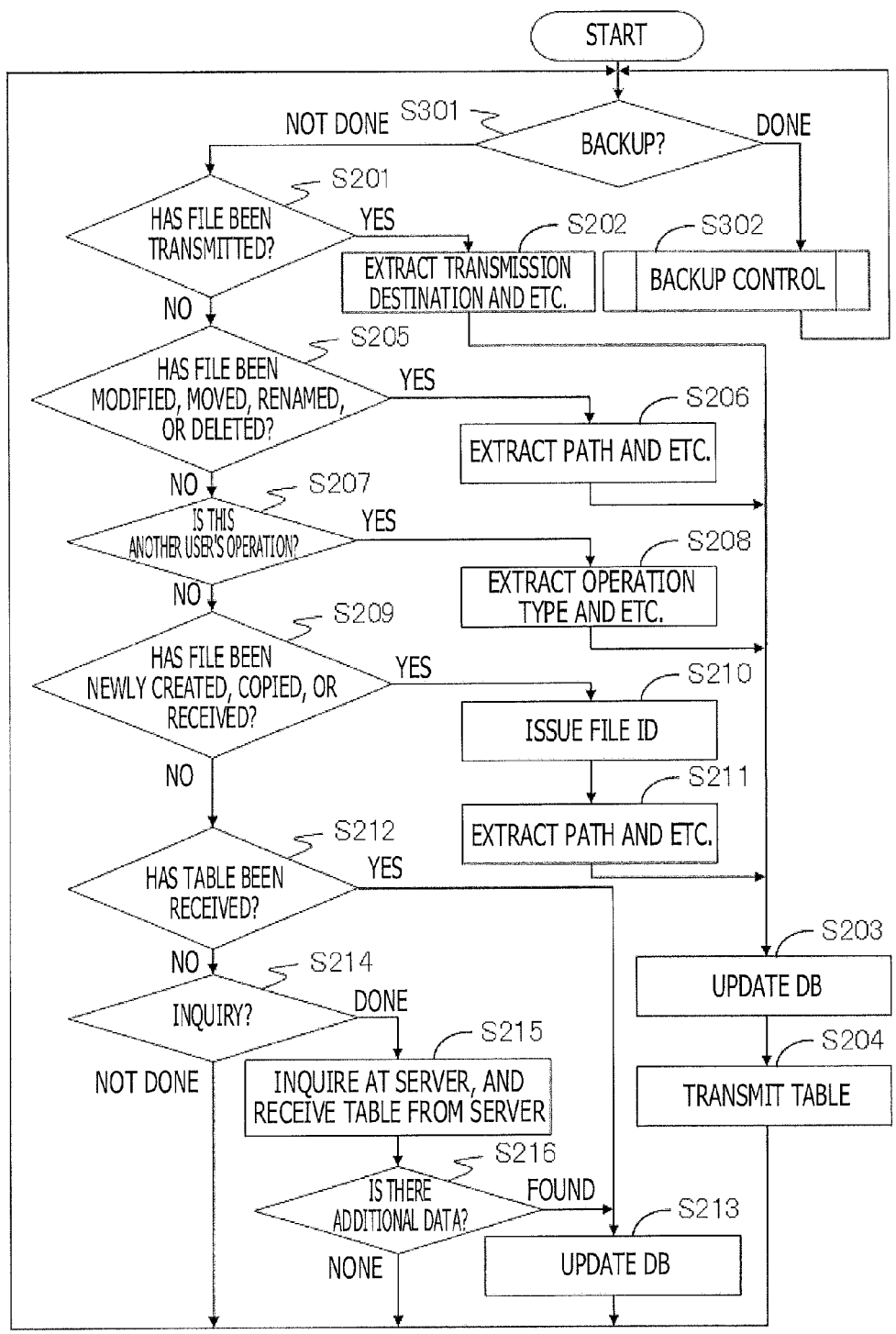
FIG. 11 is a flowchart of processing to be performed by another terminal in the second embodiment.

Now, FIG. 11 is a flowchart of processing to be performed by the terminal 330 in the second embodiment. Upon the power of the terminal 330 being turned on, the terminal 330 starts the processing in FIG. 11.

Difference between FIG. 11 and FIG. 10 is in that steps S301 and S302 are added in FIG. 11. Steps S201 to S216 are common between FIG. 10 and FIG. 11, and accordingly, detailed description will be omitted. Note that, in FIG. 10 there may be a case where processing returns from steps S204, S213, S214, and S216 to step S201, but in FIG. 11, the processing returns to step S301 instead of step S201.

Specifically, upon the terminal 330 starting the processing in FIG. 11, first, in step S301 the backup control unit 339 determines whether to perform backup of a file.

For example, backup start may also explicitly be instructed from the user via the input device 205 of the terminal 330. The backup control unit 339 may detect input from the user. In the event of having detected input from the user, the backup control unit 339 determines to perform backup of a file.

Also, a backup schedule may be determined beforehand. In the event that time and date determined by the backup schedule has come, the backup control unit 339 may determine to perform backup of a file.

Figure 14:
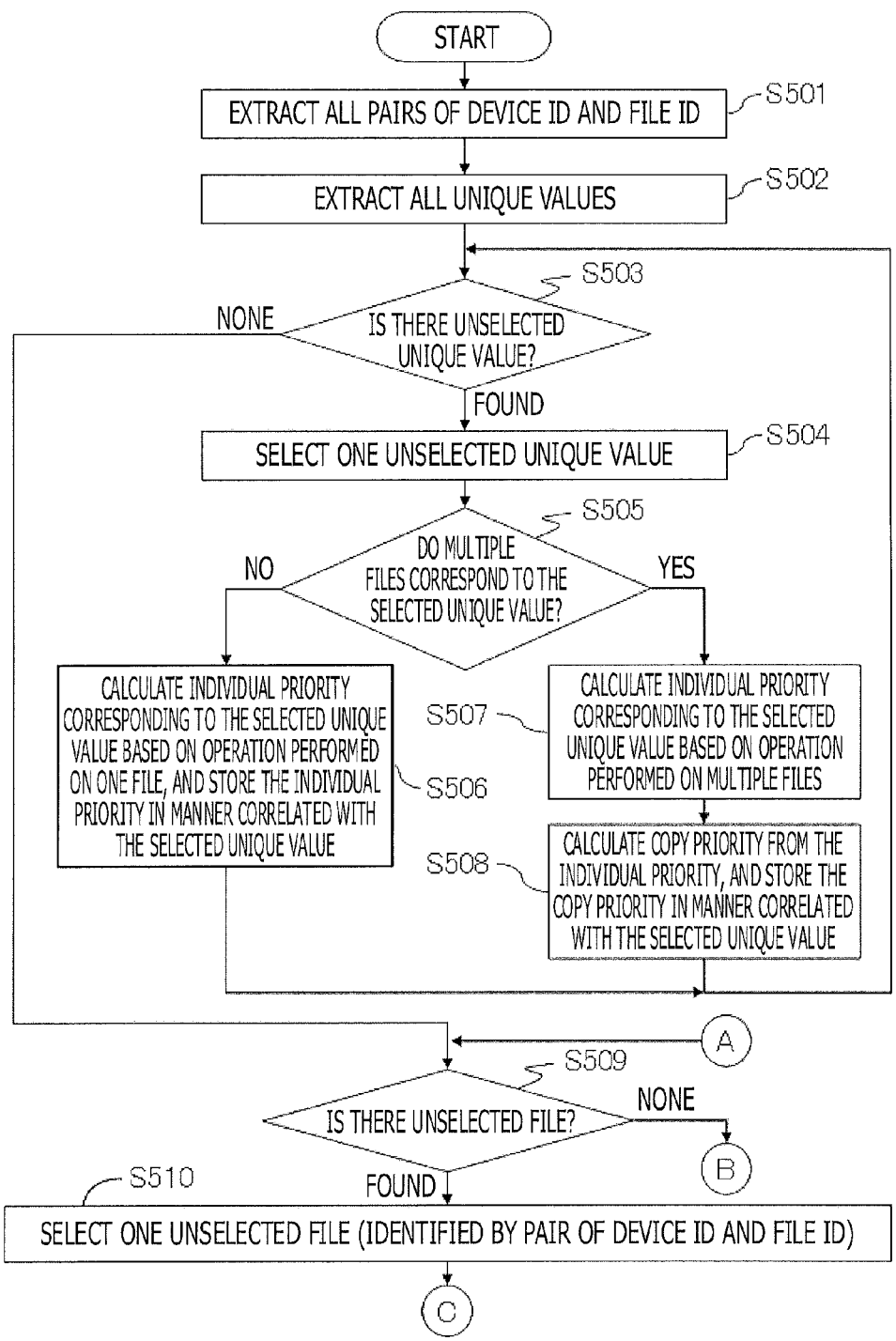
FIG. 14 is a first part of a flowchart of backup control processing according to the second embodiment.
Figure 15:
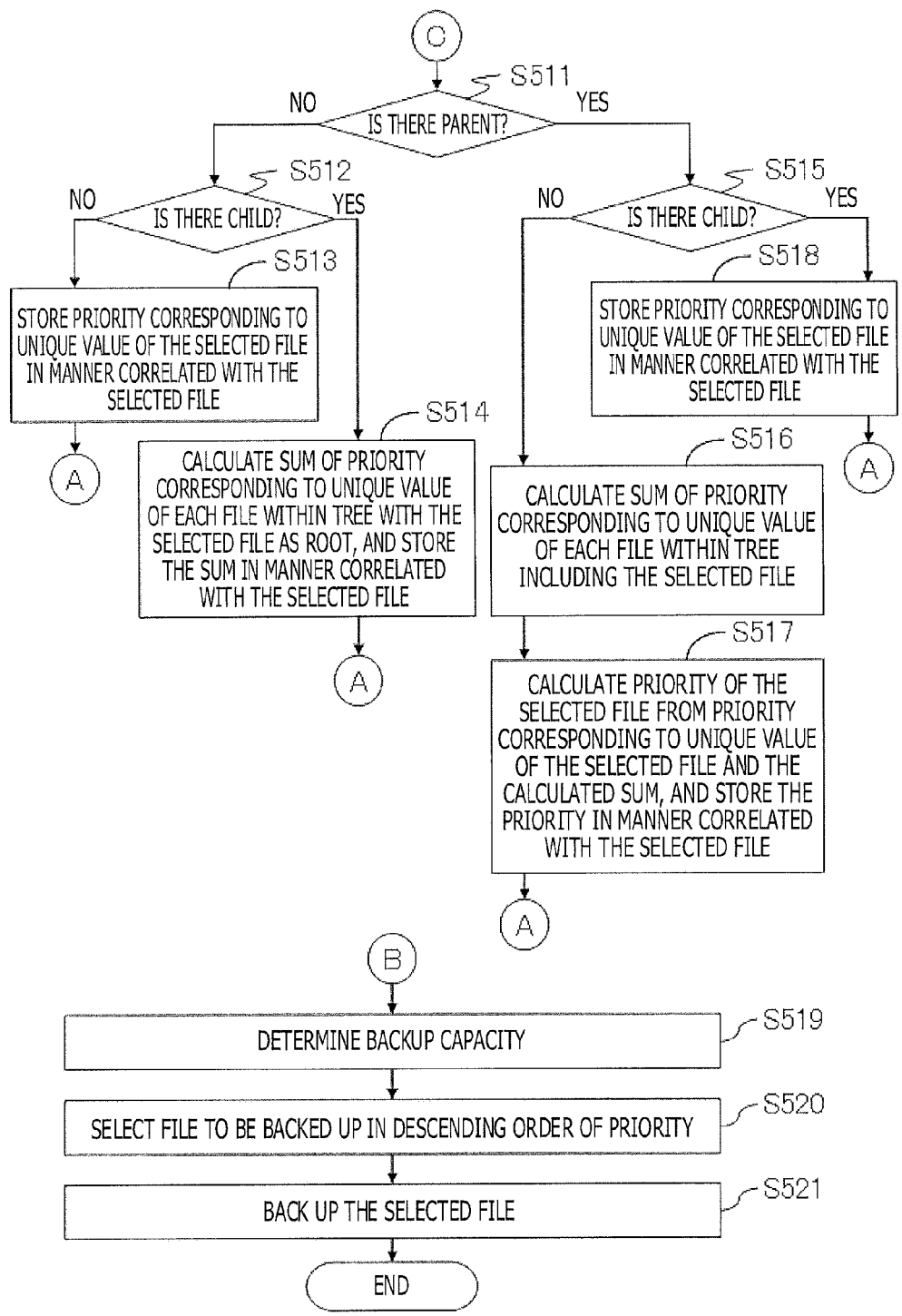
FIG. 15 is a second part of the flowchart of backup control processing according to the second embodiment.

Upon the backup control unit 339 determining to perform backup of a file, the processing in FIG. 11 then proceeds to step S302. In step S302, backup control processing which will be described later along with FIGS. 14 to 15 is performed. After execution of the backup control processing, the processing in FIG. 11 returns to step S301.

Conversely, in the event of the backup control unit 339 having determined not to perform backup of a file in step S301, the processing in FIG. 11 proceeds to step S201. In steps S201 to S206, the communication unit 331, monitoring unit 333, and DB management unit 335 within the terminal 330 operate in the same way as with the communication unit 311, monitoring unit 313, and DB management unit 315 within the terminal 310.

Also, as described regarding FIG. 10, with the terminal 310, operations as to a file within the file storage unit 312 is monitored, a device ID stored in the device ID storage unit 314 is used, and the DB 500 on the DB storage unit 316 is managed. Similarly, with the processing in FIG. 11, with the terminal 330, operations as to a file within the file storage unit 332 is monitored, a device ID stored in the device ID storage unit 334 is used, and the DB 510 on the DB storage unit 336 is managed.

According to a certain viewpoint, the processing in steps S201 to S216 in FIG. 11 is processing for the terminal 330 (i.e., information processing apparatus which performs calculation of priority) obtaining history information and tracking information, and corresponds to steps S1 to S2 in FIG. 1. On the other hand, the backup control processing in step S302 in FIG. 11 includes several steps corresponding to steps S3 to S7 in FIG. 1.

Also, the reception of the metadata 403 in step S106 in FIG. 5 corresponds to the reception in step S212 in FIG. 11. Similarly, the reception of the metadata 407 in step S114 also corresponds to the reception in step S212.

The reception of the file 404 in step S107 in FIG. 5 corresponds to the reception to be detected in step S209 in FIG. 11. Generation and recording of the metadata 405 in step S108 in FIG. 5 correspond to steps S210, S211, and S203 in FIG. 11, and the transmission of the metadata 405 in step S109 in FIG. 5 corresponds to the transmission in step S204 in FIG. 11.

The calculation of the priority 408 in step S115 in FIG. 5 is included in the backup control processing in step S302 in FIG. 11.

Incidentally, the inquiry in step S214 provides an advantage primarily to the terminal 330. This is because it is desirable for the terminal 330 which performs calculation of priority to suitably manage the DB 510 to be used for calculation of priority, and inquiry is useful for suitable management of the DB 510.

For example, the terminal 330 is not necessarily turned on all the time. Also, even if the terminal 330 were turned on all the time, the terminal 330 is not necessarily connected to the network 370 all the time. For example, in the event that the terminal 330 is driven by a battery, the communication function may be turned off for power saving. Also, even when the communication function is on, the terminal 330 may be incommunicable depending on wireless communication environments or the like.

Thus, there may be a period when the terminal 330 is incommunicable with the server 350 via the network 370. On the other hand, during such a period, some sort of operation may be performed on a file at the terminal 310, and as a result thereof, new metadata may be generated.

The inquiry in step S214 allows the terminal 330 to obtain metadata newly generated during a period when the terminal 330 was incommunicable, later. That is to say, the inquiry in step S214 is useful for maintaining the DB 510 on the DB storage unit 336 of the terminal 330 in a suitable state.

Also, the processing in FIGS. 10 and 11 may be deformed as follows taking it into consideration that the terminals 310 and 330 are not necessarily in a communicable state via the network 370 all the time. For convenience of description, deformation of the processing in FIG. 10 will be exemplified below, but the processing in FIG. 11 may also be deformed in the same way.

The terminal 310 may return to step S201 without executing step S204 after execution in step S203 depending on remaining battery levels or communication environments. In the event of omitting the transmission in step S204 immediately after step S203 in this manner, the terminal 310 records which entry in which table has been updated or added in step S203 instead. For example, a field for a flag that indicates whether or not this entry is transmitted to the server 350 later may be provided in each entry of each table within the DB 500.

In the event of omitting step S204, in step S203 the terminal 310 turns on the flag of each entry updated or added. The terminal 310 may transmit an entry of which the flag is on to the server 350 at an appropriate time point after going into a communicable state. After transmission, the terminal 310 turns off the flag of each transmitted entry.

The same deformation as the deformation of the processing in FIG. 10 as described above may also be applied to the processing in FIG. 11 that the terminal 330 executes, as described above.

Now, for convenience of description, before describing details of the backup control processing in step S302, processing that the server 350 performs will previously be described here. The server 350 responds to the inquiry in step S214, and also further executes processing in FIG. 12. According to a certain viewpoint, the process for responding to the inquiry in step S214, and the process in FIG. 12 are processes for allowing the terminal 330 (i.e., information processing apparatus which performs calculation of priority) to obtain history information and tracking information.

Figure 12:
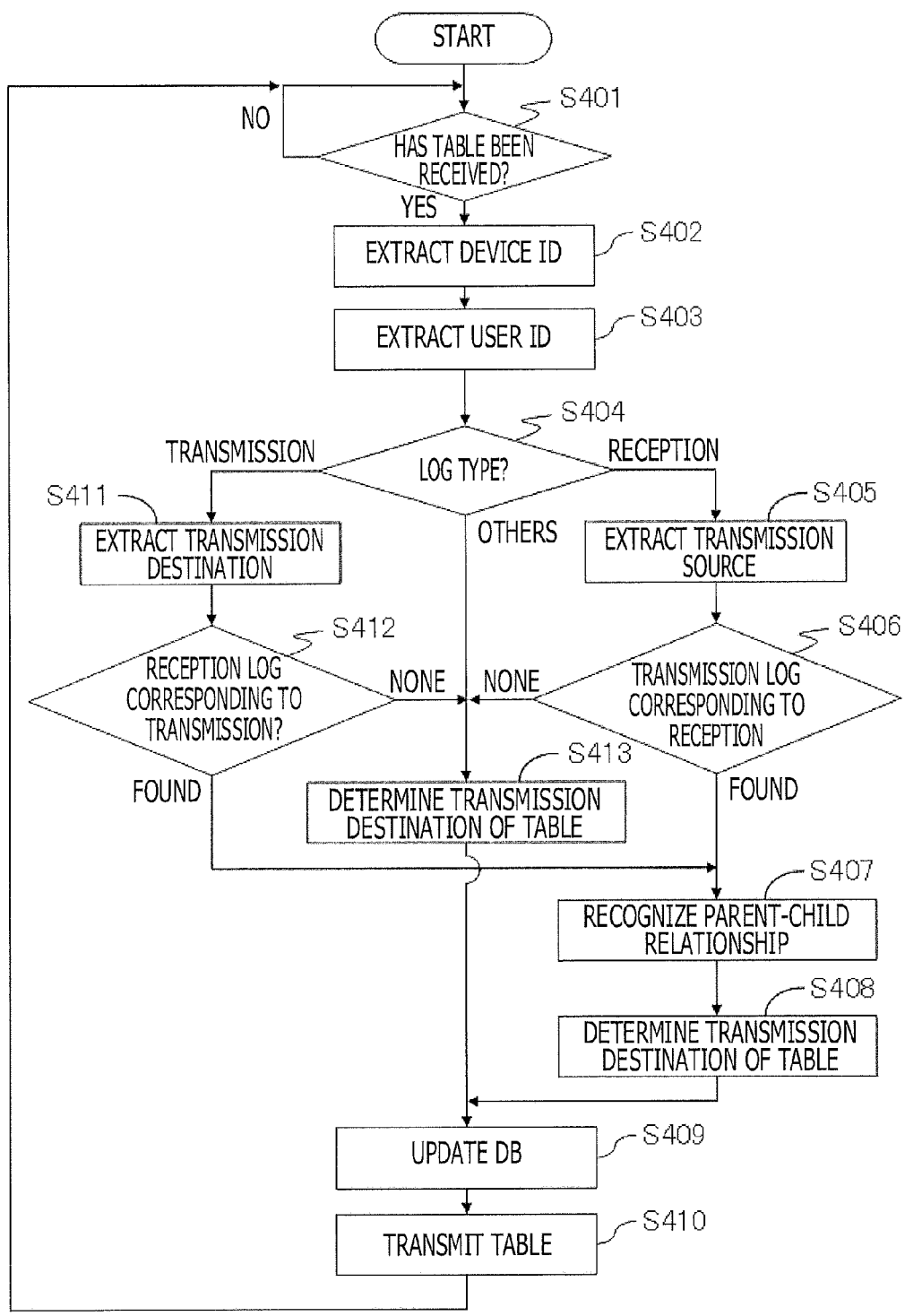
FIG. 12 is a flowchart of processing to be performed by a server in the second embodiment.

Upon the power of the server 350 being turned on, the server 350 starts the processing in FIG. 12. The server 350 waits in step S401 until the communication unit 351 receives a part or the entirety (i.e., some sort of metadata) of one of the tables from one of the terminals. Upon the communication unit 351 receiving some sort of metadata, the processing in FIG. 12 proceeds to step S402.

In step S402, the device management unit 353 extracts the device ID of a transmission source terminal of the metadata. Also, in step S403, the device management unit 353 extracts the user ID of a user who uses the transmission source terminal of the metadata.

A specific technique for extraction in steps S402 and S403 may appropriately be determined according to embodiments.

For example, in step S204, each of the terminals 310 and 330 may transmit a device ID to the server 350 along with the table and/or entry updated or added in step S203. Thus, the device management unit 353 may extract the device ID in step S402 out of information received by the communication unit 351. Also, in step S403, the device management unit 353 may also extract a user ID by referencing the device management table 520 using the extracted device ID as a search key.

Or, the transmission in step S204 may include an authentication phase for establishing connection between the terminal and the server 350, and an information transmission phase on the established connection. Each of the terminals 310 and 330 may transmit a device ID to the server 350 in the authentication phase. In this case, the device management unit 353 may obtain the device ID transmitted in the authentication phase.

It goes without saying that each of the terminals 310 and 330 may further store not only a device ID but also a user ID. In this case, each of the terminals 310 and 330 may further transmit not only the device ID but also the user ID to the server 350.

In either specific method, upon extracting the device ID and user ID, the device management unit 353 outputs the device ID and user ID to the DB management unit 354. The processing in FIG. 12 then proceeds to step S404.

Note that, with regard to FIG. 12, for simplification of description, let us say that metadata to be transmitted from a terminal at once corresponds to one operation. In the event that metadata corresponding to two or more operations is transmitted at once, the processing in FIG. 12 is deformed so as to repeat steps S404 to S408/S411 to S413 an appropriate number of times.

Now, in step S404, the DB management unit 354 determines whether the log type of metadata received by the communication unit 351 is "reception", "transmission", or other than these. In the event that the log type is "reception", the processing in FIG. 12 proceeds to step S405. In the event that the log type is "transmission", the processing in FIG. 12 proceeds to step S411. In the event that the log type is neither "reception" nor "transmission", the processing in FIG. 12 proceeds to step S413.

For example, in the event that a certain file has been transmitted from one terminal to another terminal, the file ID of this file corresponding to the transmitted file, and one entry within a history table corresponding to this file ID are received in step S401. In this case, the log type is "transmission". It goes without saying that one entry within the ID table may be employed instead of a simple file ID.

For example, in the event that the second entry in the history table 502a in FIG. 6 has been received in step S401, the log type is "transmission". Accordingly, in this case, the processing in FIG. 12 proceeds to step S411.

In the event that a certain file has been modified within the terminal, the file ID of the modified file, and one entry within a history table corresponding to this file ID are received in step S401. In this case, the log type is neither "reception" nor "transmission". It goes without saying that one entry within the ID table may be employed instead of a simple file ID.

For example, in the event that the second or third entry in the history table 502b in FIG. 6 has been received in step S401, the processing in FIG. 12 proceeds to step S413. Similarly, in the event that the second entry in the history table 512a in FIG. 7 has been received in step S401, the processing in FIG. 12 proceeds to step S413.

In the event that a certain file has been moved or renamed within the terminal, one entry in the ID table (entry corresponding to the moved or renamed file), and one entry within a history table corresponding to this file are received in step S401. In this case, the log type is neither "reception" nor "transmission".

For example, in the event that the second entry in the ID table 511 in FIG. 7 and the third entry in the history table 512a have been received in step S401, the processing in FIG. 12 proceeds to step S413.

In the event that a certain file has been deleted, one entry in the ID table (i.e., entry corresponding to the deleted file) is received in step S401 along with information that indicates deletion. In this case, the log type is neither "reception" nor "transmission". Accordingly, the processing in FIG. 12 proceeds to step S413.

In the event that a certain file has newly been created within the terminal, one entry in the ID table (i.e., entry corresponding to the created file) and an entry first created in a new history table corresponding to this file are received in step S401. In this case, the log type is neither "reception" nor "transmission".

For example, in the event that the second entry in the ID table 501 in FIG. 6 and the first entry in the history table 502a have been received in step S401, the processing in FIG. 12 proceeds to step S413.

In the event that a certain file has been copied within the terminal, two entries in the ID table (i.e., a copy source file, and a file newly created by a copy operation), and each entry in history tables corresponding to both files are received in step S401. Further, in this case, one entry in the tracking table is also received in step S401.

For example, in the event that the following entries have been received in step S401, the processing in FIG. 12 proceeds to step S413.
- The entry corresponding to the history table 502a in the ID table 501 in FIG. 6.
- The entry corresponding to the history table 502b in the ID table 501.
- The fourth entry in the history table 502a.
- The first entry in the history table 502b.
- The second entry in the tracking table 503.

In the event that a certain file has been received and newly saved at a certain terminal, one entry in the ID table (i.e., received and saved entry), and an entry first created in a new history table corresponding to this file are received in step S401. In this case, the log type is "reception".

For example, in the event that the second entry in the ID table 511 in FIG. 7 (where the file is in a state before renaming), and the first entry in the history table 512a have been received in step S401, the processing in FIG. 12 proceeds to step S405.

In the event that a certain file has been accessed, the file ID of the accessed file, and one entry in a history table corresponding to this file ID are received in step S401. In this case, the log type is neither "reception" nor "transmission". It goes without saying that one entry in the ID table may be employed instead of a simple file ID.

For example, in the event that the third entry in the history table 502a in FIG. 6 has been received in step S401, the processing in FIG. 12 proceeds to step S413.

Now, in the event that the log type is "reception", in step S405 the DB management unit 354 extracts information regarding a transmission source.

For example, with the first entry in the history table 512a in FIG. 7, exemplification is made as "reception from a smart phone". Accordingly, in the event that the first entry in the history table 512a has been received, in step S405 the DB management unit 354 recognizes that a smart phone is a transmission source.

For example, though only the fields of a user ID and a device ID are exemplified in the device management table 520 in FIG. 8, there may be a field that indicates the type of a terminal (e.g., "PC" or "smart phone" or the like). Thus, the device management unit 353 may also recognize the device ID of a smart phone by referencing the device management table 520. Accordingly, the DB management unit 354 may obtain the device ID of a smart phone via the inquiry to the device management unit 353.

Depending on circumstances, with a history table, the log type may be expressed using a device ID as with "reception from mobile-001". In this case, the DB management unit 354 may directly extract a device ID of "mobile-001" from the history table as information regarding a transmission source.

Note that the expression format of a log type in a history table may appropriately be determined according to an embodiment. For example, a sub type of "reception from a smart phone" may be determined to be included in the type of "reception" beforehand. Alternatively, though "reception from a smart phone" is exemplified in one field of "log type" in FIG. 6, a field that indicates a rough type such as "reception", an a filed that indicates a parameter according to the type may be included in a history table. For example, in the event of the type of "reception", a parameter such as "smart phone" or "mobile-001" or the like may be included in the latter field.

Now, in the next step S406, the DB management unit 354 determines whether or not there is a transmission log corresponding to reception. Note that "reception" that history information received in this step S401 indicates is "reception" for a transmission destination terminal to which the file is transmitted. Accordingly, in step S406 the DB management unit 354 specifically determines whether or not there is history information that indicates "transmission" for a transmission source terminal in the DB storage unit 352.

For example, let us say that the first entry in the history table 512a in FIG. 7 has been received from the terminal 330 in step S401. In this case, a device ID to be extracted in step S402 is "PC-002", and a user ID to be extracted in step S403 is "suzuki_taro". In step S405, only a type of "smart phone" may be extracted as information that indicates a transmission source, or a device ID of "mobile-001" may be extracted.

In the event that a user ID of "suzuki_taro" has been extracted in this way, the DB management unit 354 searches for a transmission log corresponding to reception with reference to a DB for user having a user ID of "suzuki_taro" (i.e., DB 530-1 in FIGS. 8 and 9). For example, let us say that a device ID of "mobile-001" has been extracted as information that indicates a transmission source. In this case, the DB management unit 354 searches for an entry that satisfies the following three conditions out of all of the history tables corresponding to entries having a device ID of "mobile-001" in the ID table 531.
- The log type is "transmission".
- The unique value is equal to a unique value in history information that indicates "reception" (in this example, "65615163" in the first entry in the history table 512a).
- The time and date is equal to time and date in history information that indicates "reception" (in this example, "8:21 on Mar. 6, 2012" in the first entry in the history table 512a) within a certain error range.

An entry that satisfies the three conditions is the "transmission log corresponding to reception". For example, with the above example, in the event that the server 350 has already received the second entry in the history table 502a in FIG. 6, "transmission log corresponding to reception" exists within the DB 530-1.

As is clear from the above description, in step S405, there is no problem even when information that indicates a transmission source is not extracted. That is to say, step S405 is omissible. This is because the DB management unit 354 has to search for an entry that satisfies the above three conditions out of all of the history tables within the DB 530-1. However, search is made more efficient as long as information that indicates a transmission source is extractable, and accordingly, step S405 is exemplified in FIG. 12.

In the event that a transmission log corresponding to reception has been found in step S406, the processing in FIG. 12 proceeds to step S407. Conversely, in the event that a transmission log corresponding to reception has not been found, the processing in FIG. 12 proceeds to step S413. For example, in step S110 in FIG. 5, a transmission log corresponding to reception has not been found.

Now, in step S407, the DB management unit 354 recognizes, based on history information that indicates transmission, and history information that indicates reception, parent-child relationship between files by a duplication operation between the terminals. The DB management unit 354 then generates tracking information that indicates the parent-child relationship.

For example, let us say that the second entry in the history table 502a in FIG. 6 has already been received at the server 350 as history information that indicates transmission, and also the first entry in the history table 512a in FIG. 7 has already been received at the server 350 as history information that indicates reception. In this case, the history information that indicates transmission, and the history information that indicates reception are included in the DB 530-1 in the DB storage unit 352. Specifically, the following two history tables are included in the DB 530-1.

The history table corresponding to a pair of a device ID of "mobile-001" and a file ID of "13".

The history table corresponding to a pair of a device ID of "PC-002" and a file ID of "83".

In steps up to step S407, the DB management unit 354 has already recognized the two device IDs and the two file IDs.

For example, history information that indicates reception of a file is received by the server 350 along with an entry in the ID table, and accordingly, the DB management unit 354 may recognize a file ID in a file transmission destination terminal (i.e., terminal which has received a file). Also, in the event that history information that indicates reception of a file has been received in step S401, the device ID of a file transmission destination terminal (i.e., a transmission source terminal of history information) has been extracted in step S402.

The device ID of the terminal which has transmitted a file is extracted in step S405 or recognized by the DB management unit 354 as a search result in step S406. Also, the file ID in a transmission source terminal which has transmitted a file is recognized by the DB management unit 354 as a search result in step S406.

Accordingly, in step S407, the DB management unit 354 may recognize, based on history information that indicates transmission, and history information that indicates reception, a parent device ID, a parent file ID, a child device ID, and a child file ID. The DB management unit 354 generates tracking information represented with these four IDs.

Next, in step S408, the DB management unit 354 determines a table transmission destination. More specifically, the DB management unit 354 determines to transmit the following entries to all of terminals used by the same user as with a transmission source terminal of metadata received in step S401.

Entry in a tracking table (tracking information generated in step S407, the same tracking information as with an entry to be added to the tracking table 533 within the DB 530-1 in the next step S409).

Entry in a history table (the same history information as with an entry received in step S401, the same history information as with an entry to be added to one of the history tables within the DB 530-1 in the next step S409).

In the event an entry in the ID table has been received in step S401, the entry in this ID table (the same as with an entry to be added to the ID table 511 within the DB 530-1 in the next step S409).

As is clear from the above description, in the event that a certain user uses M terminals, all of the M terminals are determined to be a transmission destination in step S408. The processing in FIG. 12 then proceeds to step S409.

In step S409, the DB management unit 354 updates a DB on the DB storage unit 352. That is to say, the DB management unit 354 performs addition of a table, addition of an entry, and for updating of an entry based on the metadata received in step S401 as appropriate. Also, in the event that step S409 is executed after step S407, the DB management unit 354 further adds tracking information generated in step S407 to the DB.

In the next step S410, each entry updated or added in step S409 is transmitted from the communication unit 351. The transmission destinations are the M terminals determined in step S408 or the (M−1) terminals determined in step S413 as will be described later. After transmission, the processing in FIG. 12 returns to step S401.

Now, in the event that the log type is "transmission", in step S411 the DB management unit 354 extracts information regarding a transmission destination. In the next step S412, the DB management unit 354 determines whether or not there is a reception log corresponding to transmission. Details of steps S411 and S412 are similar to those in steps S405 and S406 except that "reception" and "transmission" are switched in positions. Accordingly, detailed description will be omitted. Step S411 is omissible in the same way as with step S405 being omissible.

In the event that a reception log corresponding to transmission has been found in step S412, the processing in FIG. 12 proceeds to step S407. Conversely, in the event that a reception log corresponding to transmission has not been found, the processing in FIG. 12 proceeds to step S413.

For example, upon the metadata 406 in step S112 in FIG. 5 being received in step S401 in FIG. 12, a reception log corresponding to transmission is found in step S412. This is because the metadata 405 has already been received in step S109 in FIG. 5. Accordingly, in this case, the processing in FIG. 12 proceeds to step S407. As a result thereof, metadata 407 including tracking information that indicates parent-child relationship recognized in step S407 is transmitted in step S410. The transmission in this step S410 corresponds to step S114 in FIG. 5.

Now, in step S413, the DB management unit 354 determines a transmission destination of the table as will be described below. Specifically, the DB management unit 354 determines to transmit the following entries to all of the terminals other than a transmission source terminal of metadata received in step S401 (restricted to a terminal which is being used by the same user as with the transmission source terminal).

Entry in a history table (the same history information as with an entry received in step S401, the same history information as with an entry to be added to one of the history tables within the DB 530-1 in the next step S409).

In the event an entry in the ID table has been received in step S401, the entry in this ID table (the same as with an entry to be added to the ID table 511 within the DB 530-1 in the next step S409).

As is clear from the above description, in the event that a certain user uses M terminals, the (M−1) terminals are determined to be transmission destinations in step S413. The processing in FIG. 12 then proceeds to step S409.

For example, with the examples in FIGS. 4 and 5, the M is 2 (M=2), and step S106 in FIG. 5 indicates that the metadata 403 is transmitted to the one (=M−1) terminal 330 in step S410.

As described above with reference to FIG. 12, with the second embodiment, tracking information regarding parent-child relationship caused due to a duplication operation between the terminals is generated by the server 350. The terminal 330 (i.e., information processing apparatus which calculates priority) may obtain tracking information by the server 350 transmitting the tracking information.

Next, description will be made regarding details of the backup control processing in step S302 in FIG. 11, with reference to FIGS. 13 to 15. The backup control processing includes calculation of priority, and parent-child relationship between files is taken into consideration in calculation of priority.

Figure 13:
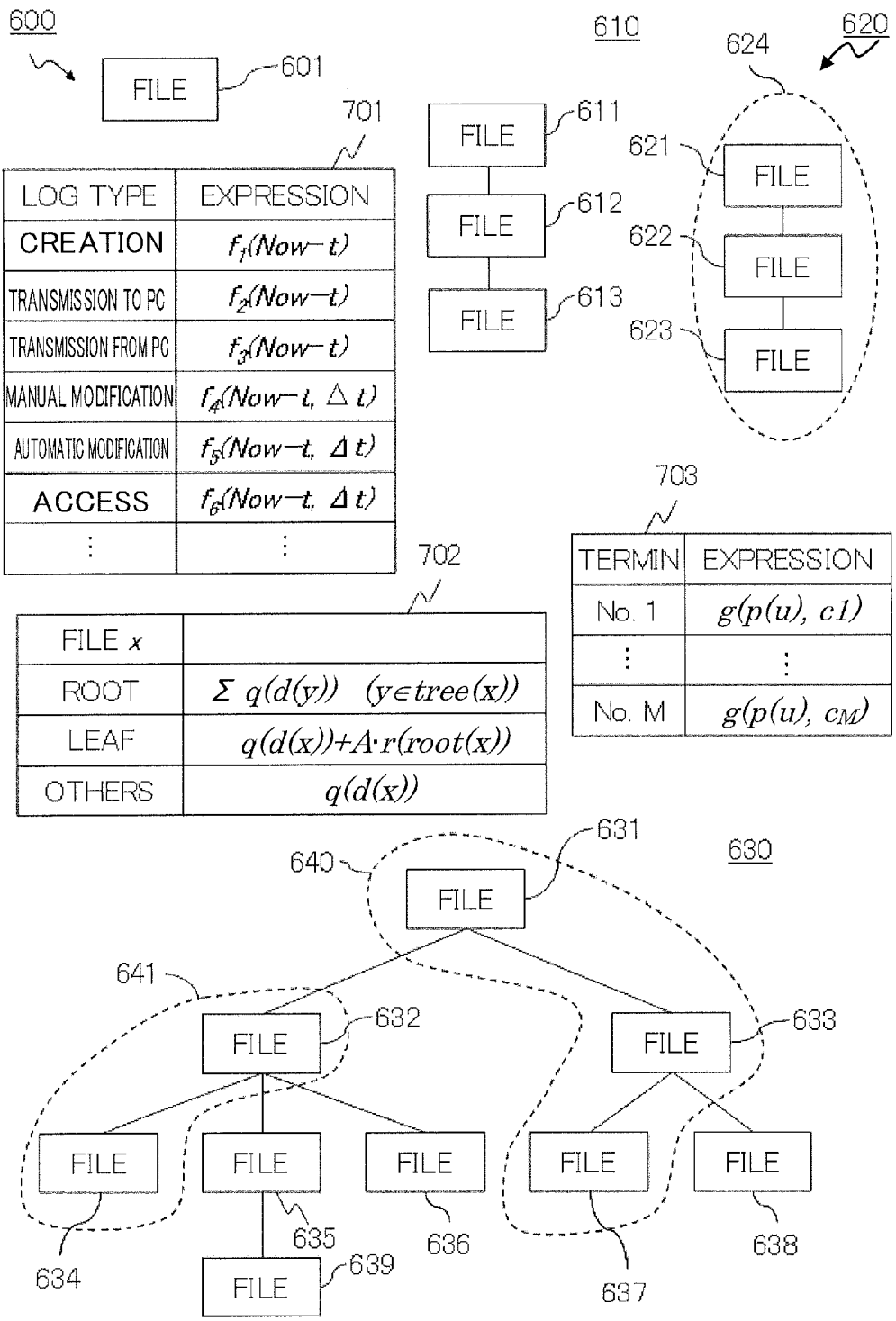
FIG. 13 is a diagram for describing a parent-child relationship and priority between files.

FIG. 13 is a diagram for describing parent-child relationship and priority between files. A file may be duplicated by a copy operation within the terminal, or may be duplicated between the terminals by transmission from a certain terminal to another terminal. Also, with a later-described third embodiment, a file may be duplicated by transmission from a terminal to the server, or may be duplicated by transmission from the server to a terminal. Duplication is not restricted to being performed only once. Also, after duplication, a parent file may be modified, or a child file may be modified. That is to say, the data of a parent file may be equal to the data of a child file, or these may mutually differ.

In FIG. 13, parent-child relationship between files is illustrated with a tree structure. Hereinafter, for convenience of description, a tree including one or more files as "file tree". Also, of files included in one file tree, a group of one or more files having the same data will be referred to as "same data group". Further, a file which is neither the root file nor a leaf file will be referred to as "intermediate file".

A file tree 600 includes only a file 601. The file 601 is the root file and also a leaf file. That is to say, a duplication operation as to the file 601 has not ever been performed. The priority of the file 601 is calculated according to each operation that has been performed on the file 601.

For example, let us say that some sort of operation has been performed so far on the file 601 three times. In this case, the priority calculating unit 337 may calculate sum of values according to the types of the three operations as the priority of the file 601. For example, the priority calculating unit 337 may calculate the priority of the file 601 by calculating values corresponding to the three operations respectively in accordance with an expression determined according to the log type as with a definition 701, and adding the calculated three values.

With expressions exemplified in the definition 701, "Now" denotes the current point-in-time (i.e., a time point when the priority calculating unit 337 calculates priority), "t" denotes time and date when an operation was performed, and "Δt" denotes the length of time taken for the operation. As exemplified in the definition 701, an expression for calculating a value according to the type of an operation may be a function of (Now−t), or may be a function between (Now−t) and Δt.

It is desirable for each function $f_a$ (1≤a) to monotonically decrease as to (Now−t). That is to say, the newer a time point when an operation was performed, the higher the priority calculating unit 337 may raise the priority of a file by employing the function thus defined.

Also, in the event that the function $f_a$ takes Δt as an argument, it is desirable for the function $f_a$ to monotonically increase as to Δt. That is to say, the longer time taken for an operation, the higher the priority calculating unit 337 may raise the priority of a file by employing the function thus defined.

The details of each function $f_a$ may be determined according to an embodiment as appropriate. For example, definitions as with the following Expressions (1) and (2) may be employed (with Expressions (1) and (2), let us say that the units of (New−t) and Δt are seconds).

$$f_1(\text{Now} - t) = 100 + \frac{10^4}{\text{Now} - t} \quad (1)$$

$$f_6(\text{Now} - t, \Delta t) = 0.01 \cdot \Delta t + \frac{10^4}{\text{Now} - t} \quad (2)$$

For example, specific values such as "100" and so forth in Expressions (1) and (2) are each just an example for convenience of description, but importance according to the type of an operation may be reflected on priority by adjusting these values.

For example, it is desirable that a creation operation influences on priority so as to raise priority higher than that of another operation (e.g., reception operation). Therefore, a function corresponding to the type of "reception" may be a function where the value of "100" in Expression (1) has been replaced with a value of "20". Thus, in accordance with such value difference, the priority calculating unit 337 may put more importance on creation than reception in calculation of priority.

Similarly, in order to reflect difference between a user-driven operation and an automatic operation on priority, definition may be made so that the values of parameters in the functions $f_5$ and $f_6$ differ.

Also, the capacity of the SSD 103 of the smart phone 102 is frequently smaller than the capacity of the HDD 107 of the PC 106. Accordingly, the following consideration is obtained.

It is conceived that a user often transmits even a file which the user does not regard as so important from the smart phone 102 to the PC 106. This is because the capacity of the HDD 107 of the PC 106 is great.

However, it is conceived that a file which the user transmits from the PC 106 to the smart phone 102 has higher importance to some extent for the user. This is because the capacity of the SSD 103 of the smart phone 102 is small.

Based on the above consideration, the type of "transmission" may be sub-categorized into a type of "transmission to a PC", and a type of "transmission to a smart phone". Mutually different expressions may be employed according to the type of "transmission to a PC" and the type of "transmission to a smart phone". Similarly, mutually different expressions may be employed according to a type of "reception from a PC" and a type of "reception from a smart phone". That is to say, the priority calculating unit 337 may employ an expression according to a log type such as "reception" or "transmission" sub-categorized according to the type of a terminal in this manner.

Thus, a transmission operation to the smart phone 102 (in other words, a reception operation from the PC 106) more influences on priority than a transmission operation to the PC 106 (in other words, a reception operation from the smart phone 102) so as to further raise the priority.

Now, the file tree 610 includes three files 611 to 613. The file 611 is the root file, and the file 612 is a child file of the file 611. The file 613 is a child file of the file 612, and also a leaf file. Also, the data of the files 611 to 613 mutually differ.

For example, there may be a case where the user creates the file 611, copies the file 611 to create the file 612, edits the file 612, copies the file 612 after editing to create the file 613, and edits the file 613. The file tree 610 corresponds to such a case.

The priority calculating unit 337 may raise the priority of the root file according to each operation performed on each of one or more descendent files directly or indirectly obtained from the root file by one or more duplication operations. That is to say, the priority calculating unit 337 may further take operation history as to the files 612 and 613 into consideration in addition to operation history as to the file 611 at the time of calculating the priority of the file 611. Specifically, the priority calculating unit 337 may raise the priority of the file 611 according to the operation history as to the files 612 and 613.

This is because it is assumed that if many operations have been performed on the files 612 and 613, the file 611 which is the root file serving as the source of the files 612 and 613 has high importance.

Also, when comparing the files 612 and 613, there is a high probability that the file 613 is the latest version, and there is a high probability that the file 612 is a file saved in a state in the middle of an editing process. Accordingly, it is desirable for the priority calculating unit 337 to evaluate the priority of a leaf file higher than the priority of an intermediate file of files belonging to one file tree.

For example, the priority calculating unit 337 may raise the priority of the file 613 according to the priority of the file 611 (e.g., priority raised according to each operation on each descendent file as described above). The priority calculating unit 337 may evaluate the priority of the leaf file 613 higher than the priority of the intermediate file 612 in this manner.

Alternatively, with regard to each file other than the root file, the priority calculating unit 337 may calculate priority according to each operation for each file on a path from the root file to this file. For example, the priority calculating unit 337 may calculate the priority of the file 612 according to each operation as to the files 611 and 612, or may calculate the priority of the file 613 according to each operation as to the files 611, 612, and 613.

Thus, the priority calculating unit 337 may evaluate the priority of a descendent file thereof higher than the priority of a certain ancestral file (other than the root file). As a result thereof, the priority calculating unit 337 may evaluate the priority of a leaf file higher than the priority of an intermediate file.

As described above, in order to evaluate the priorities of the root file and a leaf file higher than the priority of an intermediate file, the priority calculating unit 337 may calculate the priority of each file using an expression as exemplified in a definition 702. Note that the details of the expressions within the definition 702 will be described later.

Now, a file tree 620 includes three files 621 to 623. The file 621 is the root file, and the file 622 is a child file of the file 621. The file 623 is a child file of the file 622, and also a leaf file. Also, the data of the files 621 to 623 are mutually equal. Accordingly, the files 621 to 623 belong to a same data group 624.

As is clear from comparison between the file trees 610 and 620, if the importance of the file 611 and the importance of the file 621 are the same, damage caused due to loss of the file 611 is greater than damage caused due to loss of the file 621. This is because even if the file 621 were lost, the files 622 and 623 are available as a backup copy of the file 621.

Accordingly, in the event that two or more files are included in the same data group, it is desirable for the priority calculating unit 337 to lower the priority of each file within the same data group. For example, the priority calculating unit 337 may employ a function that monotonically decreases as to the number of files included in the same data group. The priority calculating unit 337 may perform, in order to lower the priority, multiplication wherein the priority is multiplied by an appropriate integer less than 1.

Incidentally, multiple files belonging to the single same data group may be stored all in one terminal, or may be distributed to two or more terminals. Obviously, the more many terminals to which multiple files belonging to the same single data group are distributed, the lower necessity to back up the files is.

Therefore, it is desirable for the priority calculating unit 337 to adjust the priority according to how many terminals multiple files belonging to the same single data group are distributed to. For example, the priority calculating unit 337 may use a function configured to monotonically decrease as to the number of terminals where one and more files belonging to the same single data group are stored.

As described above, in order to calculate priority by taking the same data group into consideration, the priority calculating unit 337 may calculate the priority of each file, for example, using an expression exemplified in a definition 703. Note that details of each expression within the definition 703 will be described later.

Now, of file trees, there may be a complicated tree such as a file tree 630. The file tree 630 includes, as illustrated in FIG. 12, files 631 to 639. As illustrated in the file tree 630, there may be a case where multiple child files are derived from one parent file (e.g., the number of child files of the file 632 is three). Also, within the file tree 630, the files 631, 633, and 637 belong to the same single data group 640, and the files 632 and 634 also belong to the same single data group 641. However, the data of other files mutually differ.

For example, it is desirable that processing wherein the priority calculating unit 337 calculates the priority of the root file 631 includes the following two processes.

Process to raise the priority by taking each operation performed on the descendent files 632 to 639 into consideration.

Process to lower the priority by considering that the three files are included in the same data group 640.

Now, FIGS. 14 to 15 are flowcharts of the backup control processing illustrated in step S302 in FIG. 11. This backup control processing includes adjustment of priority as described regarding FIG. 13.

First, in step S501, the priority calculating unit 337 extracts all pairs of a device ID and a file ID with reference to the ID table 511. More accurately, the priority calculating unit 337 extracts all pairs having the corresponding history table of pairs of a device ID and a file ID recorded in the ID table 511. That is to say, the priority calculating unit 337 extracts a device ID and a file ID for identifying each file which has not been deleted yet.

Also, in step S502, the priority calculating unit 337 extracts all unique values with reference to all of history tables within the DB 510. Specifically, the priority calculating unit 337 extracts a unique value in an entry of which the time and date is the latest in each history table. Of multiple unique values thus obtained, there may be mutually equal unique values. For example, the unique values of the files 621 to 623 are equal.

Accordingly, the priority calculating unit 337 excludes duplicated unique values. Note that, as described above, for simplification of description, let us say that collision of unique values may be ignored.

Subsequent steps S503 to S508 form a repetition loop for each unique value.

In step S503, the priority calculating unit 337 determines whether or not there are unselected unique values of the unique values extracted in step S502. In the event that there are unselected unique values, in the next step S504 the priority calculating unit 337 selects one unselected unique value. Conversely, in the event that all extracted unique values have been selected, the backup control processing proceeds to step S509.

Now, the unique value selected in step S504 will hereinafter be referred to as "selected unique value". Following the selection in step S504, in step S505 the priority calculating unit 337 determines whether or not multiple files correspond to the selected unique value.

A case where multiple files correspond to the selected unique value is a case where the multiple files included in the same data group. Specifically, in the event that the DB 510 includes two or more history tables where the selected unique value is recorded in the field of "unique value" of an entry of which the time and date is the latest, multiple files correspond to the selected unique value.

In the event that one file alone corresponds to the selected unique value, the backup control processing proceeds to step S506. Conversely, in the event that multiple files correspond to the selected unique value, the backup control processing proceeds to step S507.

In step S506, the priority calculating unit 337 calculates "individual priority" corresponding to the selected unique value based on an operation performed on one file corresponding to the selected unique value. Hereinafter, let us say that individual priority corresponding to a certain unique value "u" will be referred to as "p(u)".

The individual priority p(u) is a value based on each operation as to each of one or more files corresponding to the unique value u. In step S506, the number of files corresponding to the selected unique value is one, and accordingly, the individual priority p(u) to be calculated in step S506 is a value based on each operation as to one file corresponding to the unique value u.

The individual priority p(u) may be defined by Expression (3), for example.

$$p(u) = \sum_{h=1}^{H(u)} f(h) \quad (3)$$

"H(u)" in Expression (3) is the number of entries of history information regarding the unique value u. For example, in the event that the number of files corresponding to the unique value u is one, and a history table corresponding to this file includes four entries, H(u)=4 holds.

"f(h)" in Expression (3) is one of the function $f_a$ within the definition 701 in FIG. 13 (where 1≤a). For example, in the event that the log type of the h'th entry of the H(u) entries is "creation", f(h)=$f_1$. (Now−t) holds. Note that, as described above, "Now" denotes the current point-in-time. Also, "t" denotes time and date in the h'th entry of the H(u) entries, and "Δt" denotes use time in the h'th entry of the H(u) entries.

In step S506, the priority calculating unit 337 calculates individual priority corresponding to the selected unique value, for example, in accordance with the above Expression (3). Note that step S506 is executed in the event that one file alone corresponds to the selected unique value. Accordingly, the priority calculating unit 337 specifically calculates individual priority based on an operation performed on this one file (i.e., based on a history table corresponding to this one file).

The priority calculating unit 337 stores the calculated individual priority correlated with the selected unique value. For example, the priority calculating unit 337 stores a pair of the selected unique value and the individual priority on the RAM 202. The backup control processing then returns to step S503.

Now, in the event that multiple files correspond to the selected unique value, in step S507 the priority calculating unit 337 calculates individual priorities corresponding to the selected unique value based on operations performed on these multiple files. In step S507, the priority calculating unit 337 also employs the above Expression (3), for example.

For example, in the event that there are three files corresponding to the selected unique value, and the number of entries within history tables corresponding to the files are two, five, and one, H(u)=8 holds in Expression (3). In this case, in step S507 the priority calculating unit 337 calculates individual priorities using Expression (3) based on the eight entries in total within the three history tables.

In the next step S508, the priority calculating unit 337 calculates "copy priority" corresponding to the selected unique value from the individual priorities calculated in step S507. Hereinafter, copy priority corresponding to a certain unique value "u" will be referred to as "q(u)".

The copy priority q(u) indicates a value adjusted from the individual priority p(u) according to how files corresponding to the unique value u are stored in a distributed manner. For example, the copy priority may be defined by Expression (4), or a function g within Expression (4) may be defined as Expression (5).

$$q(u) = \sum_{m=1}^{M} \frac{g(p(u), c_m)}{(n(u))^2} \quad (4)$$

$$g(p(u), c_m) = \begin{cases} p(u)/c_m & (c_m > 0) \\ 0 & (c_m = 0) \end{cases} \quad (5)$$

"M" in Expression (4) is the number of terminals which the user uses (1 M). "$c_m$" in Expressions (4) and (5) denotes the number of files of the unique value u within the m'th (1≤m≤M) terminal (where 0≤$c_m$).

"n(u)" in Expression (4) is the number of terminals where at least one of the files of the unique value u is stored of the M terminals. Note that any of the unique values to be extracted in step S502 is a unique value of a file presently actually stored in one of the M terminals. Accordingly, 0<n(u) holds.

For example, let us say that a unique value common to the files 631, 633, and 637 belonging to the same data group 640 in FIG. 13 is u, and the user is using the two terminals 310 and 330.

For example, if the file 631 is stored in the terminal 310, and the files 633 and 637 are stored in the terminal 330, $c_1$=1 and also $c_2$=2 and also n(u)=2 hold. As another example, if all of the files 631, 633, and 637 are stored in the terminal 330, $c_1$=0 and also $c_2$=3 and also n(u)=1 hold.

As is clear from Expressions (4) and (5), if multiple files having the unique value u are stored in many terminals in a distributed manner, the copy priority is low. Also, in the event that there are many files having the unique value u within one terminal as well, the copy priority is low.

After calculating the copy priority as described above, the priority calculating unit 337 stores the calculated copy priority in a manner correlated with the selected unique value. For example, the priority calculating unit 337 stores a pair of the selected unique value and copy priority on the RAM 202. The backup control processing then returns to step S503.

Incidentally, in the event that there is only one file corresponding to the unique value u within the M terminals, according to Expressions (4) and (5), q(u)=p(u) holds. This is because, in this case, according to the definition of Expressions (4) and (5), n(u)=1 holds, there is one m that satisfying $c_m>0$, specifically, $c_m=1$ holds regarding such m, and accordingly, q(u)=g(p(u), 1)=p(u) holds.

That is to say, Expressions (4) and (5) are defined so as to satisfy q(u)=p(u) in the event that there is one file corresponding to the unique value u. Depending on embodiments, another expression defined so as to satisfy q(u)=p(u) in the event that there is only one file corresponding to the unique value u may be employed instead of Expressions (4) and (5).

For example, division by $(n(u))^2$ in Expression (4) may be replaced with division by $(n(u))^\alpha$ ($\alpha$ is a constant greater than 1). In Expression (4), it is taken into consideration that the order of M and the order of n(u) are a comparable level, in order to obtain an advantage wherein priority is lowered according to n(u), division by $(n(u))^2$ is employed instead of simple division by n(u). Based on similar consideration, it is desirable that $\alpha$ is greater than 1. Similarly, division by $c_m$ in Expression (5) may be replaced with division by $c_m^\beta$ ($\beta$ is a constant greater than 1).

Now, according to the above steps S503 to S508, at the time of execution in step S509, the individual priority or copy priority corresponding to each unique value extracted in step S502 is stored in, for example, the RAM 202. Also, in the event that there is only one file corresponding to the unique value u, q(u)=p(u) holds as described above, and accordingly, the individual priority may be regarded as the copy priority in this case. Accordingly, at the time of execution in step S509, copy priority q(u) corresponding to each unique value extracted in step S502 is stored in, for example, the RAM 202.

Subsequent steps S509 to S518 form a repetition loop as to each file (i.e., each file identified by each pair extracted in step S501). In steps S509 to S518, the priority calculating unit 337 calculates the priority of each file in accordance with Expression (6).

$$r(x) = \begin{cases} \sum_{y \in tree(x)} q(d(y)) & (x \text{ is not a leaf but the root}) \\ q(d(x)) + A \cdot r(\text{root}(x)) & (x \text{ is not the root but a leaf}) \\ q(d(x)) & (\text{others}) \end{cases} \quad (6)$$

In Expression (6), "x" and "y" denote a file, and "r(x)" denotes the priority of the file x. Also, "d(x)" denotes the unique value of the file x, and "A" is a positive constant. In order to obtain a suitable priority balance between the root file and leaf file, it is desirable that the constant A is less than 1.

Also, "tree(x)" denotes a group of files included in a file tree including the file x. For example, in the event that the file x is the file 631 in FIG. 13, the group tree(x) includes nine files 631 to 639 within the file tree 630. "root(x)" denotes the root file of the file tree including the file x. For example, in the event that the file x is the file 636 in FIG. 13, root(x) is the file 631.

Note that, for simplification of description, though not apparent in Expression (6) and FIG. 13, a situation may sometimes be caused wherein a part of files within a certain file tree have already been deleted. For example, there may be a case wherein, with the file tree 630 in FIG. 13, the files 632 and 636 have already been deleted, and the remaining seven files alone exist.

If the file 632 were deleted, it is not changed that the child file 634 of the file 632 belongs to the file tree 630. Accordingly, with the second embodiment, even when the file 632 was deleted, an entry corresponding to the file 632 within the ID table 511 is not deleted, and the entry regarding the file 632 within the tracking table 513 is not deleted. On the other hand, a history table corresponding to the file 632 does not have to be used, and accordingly deleted.

In the event that the file y has already been deleted, q(d(y)) is regarded as q(d(y))=0 in Expression (6). That is to say, with calculation of sum in later-described step S514 or S516, zero is employed as priority regarding a deleted file within the file tree.

Note that the DB management unit 335 may search for a file tree so that all files belong to this file tree have been deleted, at appropriate timing. If such a file tree has been found, the DB management unit 335 may delete all the entries relating to the found file tree from the ID table 511 and tracking table 513.

Now, hereinafter, details in steps S509 to S518 will be described.

In step S509, the priority calculating unit 337 determines whether or not there is remaining an unselected file (i.e., of pairs of a device ID and a file ID extracted in step S501, a file identified by an unselected pair). In the event that there is an unselected file, the backup control processing proceeds to step S510. Conversely, in the event that all of the files have been selected (i.e., in the event that priority has been calculated regarding all the files), the backup control processing proceeds to step S519 in FIG. 15.

In step S510, the priority calculating unit 337 selects one unselected file. Hereinafter, the file selected in step S510 will be referred to as "selected file".

In the next step S511, the priority calculating unit 337 determines whether or not there is a parent file of the selected file. Specifically, the priority calculating unit 337 searches for an entry where a device ID and a file ID for identifying the selected file are stored as a child device ID and a child file ID, within the tracking table 513.

In the event that such an entry has not been found, the selected file has no parent file. That is to say, the selected file is the root file. In this case, the backup control processing proceeds to step S512.

Conversely, in the event that an entry as described above has been found, there is a parent file of the selected file. That is to say, the selected file is an intermediate file or leaf file. In this case, the backup control processing proceeds to step S515.

In step S512, the priority calculating unit 337 determines whether or not there is a child file of the selected file. Specifically, the priority calculating unit 337 searches for an entry where a device ID and a file ID for identifying the selected file are stored as a parent device ID and a parent file ID, within the tracking table 513.

In the event that such an entry has not been found, the selected file has no child file. That is to say, the file tree to which the selected file belongs includes the selected file alone. In this case, the backup control processing proceeds to step S513.

Conversely, in the event that an entry as described above has been found, there is a child file of the selected file. That is to say, the file tree including the selected file as the root file further includes one or more descendent files. In this case, the backup control processing proceeds to step S514.

In step S513, the priority calculating unit 337 determines priority corresponding to the unique value of the selected file (i.e., the value of q(u) stored in a manner correlated with the unique value of the selected file) to be priority r(x) of the selected file. Step S513 is equivalent to the third case of the right side in Expression (6).

Next, the priority calculating unit 337 stores the determined priority r(x) in a manner correlated with the selected file (specifically, in a manner correlated with a pair of a device ID and a file ID for identifying the selected file) in, for example, the RAM 202. Thereafter, the backup control processing returns to step S509.

Now, in step S514, the priority calculating unit 337 calculates sum of priorities corresponding to the unique values of the files within the file tree where the selected file serves as the root.

Note that the priority calculating unit 337 may recognize all the files included in the file tree where the selected file serves as the root by referencing the tracking table 513. Specifically, the priority calculating unit 337 may recognize all the files included in the file tree where the selected file serves as the root by repeating processing for searching for a child file using the same method as with step S512.

Also, the unique value of each file is recorded in an entry of which the time and date is the latest within a history table corresponding to this file. As described above, as results of steps S503 to S508, q(u) is stored in a manner correlated with each unique value.

Accordingly, the priority calculating unit 337 may calculate sum as described above. The priority calculating unit 337 determines the calculated sum to be the priority r(x) of the selected file. Step S514 is equivalent to the first case in the right side in Expression (6).

Next, the priority calculating unit 337 stores the determined priority r(x) in, for example, the RAM 202 in a manner correlated with the selected file. Thereafter, the backup control processing returns to step S509.

Now, in step S515, the priority calculating unit 337 determines whether or not there is a child file of the selected file. The determination in step S515 is realized, in the same way as with step S512, by processing for searching for the tracking table 513.

In the event that the selected file has no child file (i.e., in the event that the selected file is a leaf file), the backup control processing proceeds to step S516. Conversely, In the event that the selected file has a child file (i.e., in the event that the selected file is an intermediate file), the backup control processing proceeds to step S518.

In step S516, the priority calculating unit 337 calculates sum of priorities corresponding to the unique values of the files within the file tree including the selected file.

Specifically, first, the priority calculating unit 337 traces a path from the leaf file to determine the root file by referencing the tracking table 513. For example, in the event that the selected file is the file 638 in FIG. 13, the priority calculating unit 337 recognizes that a parent file of the file 638 is the file 633 by referencing the tracking table 513. Next, the priority calculating unit 337 recognizes that a parent file of the file 633 is the file 631 by referencing the tracking table 513. Further, the priority calculating unit 337 recognizes that the file 631 has not parent file by referencing the tracking table 513. As described above, the priority calculating unit 337 determines the root file 631 based on the selected file 638.

Next, the priority calculating unit 337 calculates sum of priorities corresponding to the unique values of the files within the file tree where a file determined as described above is taken as the root, by the same way as with step S514. The sum calculated in step S516 as described above is r(root(x)) in Expression (6).

Next, in step S517, the priority calculating unit 337 calculates the priority of the selected file from the priority corresponding to the unique value of the selected file and the sum calculated in step S516. That is to say, the priority calculating unit 337 obtains a product by multiplying the calculated sum by the constant A in Expression (6), and calculates sum of the obtained product and the value of q(u) stored in a manner correlated with the unique value of the selected file as the priority r(x) of the selected file.

Next, the priority calculating unit 337 stores the calculated priority r(x) in, for example, the RAM 202 in a manner correlated with the selected file. Thereafter, the backup control processing returns to step S509.

Now, in step S518, the priority calculating unit 337 determines, in the same way as with step S513, priority corresponding to the unique value of the selected file (i.e., the value of q(u) stored in a manner correlated with the unique value of the selected file) to be the priority r(x) of the selected file. Step S518 is also equivalent to the third case in the right side in Expression (6).

Next, the priority calculating unit 337 stores the determined priority r(x) in, for example, the RAM 202 in a manner correlated with the selected file. Thereafter, the backup control processing returns to step S509.

Now, according to the above steps S509 to S518, the priority r(x) is calculated as to all the remaining files. Upon the priority r(x) being calculated as to all the remaining files, steps S519 to S521 are executed by the backup control unit 339.

In step S519, the backup control unit 339 determines backup capacity. For example, the backup control unit 339 may accept input from the user regarding backup capacity from the input device 205 in step S519. Alternatively, the backup control unit 339 may read the value of backup capacity set beforehand to a setting file in step S519.

Next, in step S520, the backup control unit 339 selects a file to be backed up within a range of the backup capacity in priority descending order calculated and stored by the priority calculating unit 337. Step S520 is the same as steps S6 to S7 in FIG. 1.

Finally, in step S521, the backup control unit 339 backs up the selected file to the backup storage unit 338. The backup control processing is then ended.

Note that files to be backed up are distributed to two or more terminals in many cases. Accordingly, in step S521, the backup control unit 339 may display a prompt for prompting the user to connect all the terminals which the user uses to the network 370 on the output device 206.

For example, at the time of starting the backup control processing, the power of the terminal 310 may be off. However, upon the user turning on the power of the terminal 310 according to the prompt, the terminal 330 may receive a file within the terminal 310 via the network 370, and back up the received file to the backup storage unit 338.

Also, it takes a certain amount of time to back up a file. Accordingly, snapshot technology such as VolumeShadow copy service (VSS) or the like may be employed. That is to say, the backup control unit 339 may create a snapshot in step S521, and the processing in FIG. 11 may return from step S302 to step S301 immediately after creation of a snapshot.

For example, more specifically, the backup control unit 339 may create a snapshot of the file storage unit 332 of the terminal 330, and also command the terminal 310 to create a snapshot of the file storage unit 312. According to the snapshot technology thus employed, the terminal 330 may also execute steps S201 to S216 in FIG. 11 while actually backing up many files from the file storage units 332 and 312 to the backup storage unit 338.

As described above, according to the second embodiment, in the same way as with the first embodiment, backup is made efficient. Also, in either of the first and second embodiments as well, a backup schedule and backup capacity are suitably set, thereby enabling a file having high priority to be backed up with higher frequency.

For example, let us say that a schedule that files are backed up on every Monday has been determined. In this case, further, for example, it may be determined that backup capacity on the first Monday is 50 GB, and backup capacity on other Mondays is 15 GB. Thus, backup of files will be performed roughly in accordance with the following tendencies.

Files having high priority are backed up on every Monday.
Files having middle priority are backed up on the first Monday alone.
Files having low priority are not backed up.

It goes without saying that priority may dynamically be changed day to day according to operations to be performed on the files, but roughly, the above tendencies will be seen. As described above, in either of the first and second embodiments as well, it is possible to back up a file having high priority with a high frequency.

Note that the above example is an example wherein backup frequency is divided into three levels according to the priorities of three levels of "high, middle, and low". However, a backup schedule and backup capacity are suitably set, thereby enabling backup frequency into four or more levels.

Next, a third embodiment will be described with reference to FIGS. 16 to 20. Note that, with regard to common points as with the second embodiment, description will be omitted as appropriate.

Figure 16:
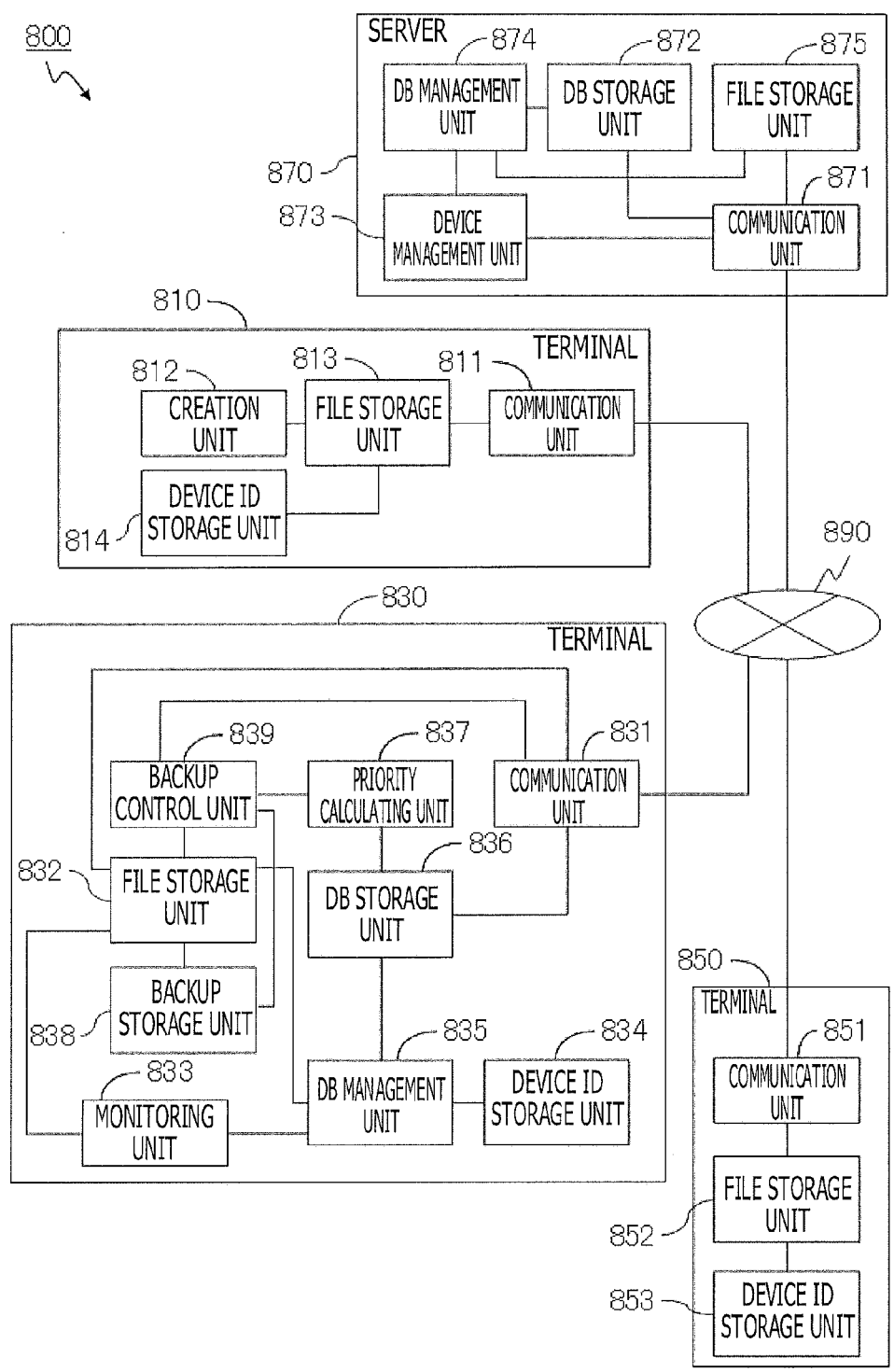
FIG. 16 is a system configuration diagram of a third embodiment.

FIG. 16 is a system configuration diagram of the third embodiment. A system 800 in FIG. 16 includes terminals 810, 830, and 850, and a server 870. The terminal 810 may be connected to a network 890 in the example in FIG. 16, but there is no problem even when a network communication function is not provided. Let us say that the terminals 830 and 850 are terminals connectable with the network 890. Also, the server 870 is also connected to the network 890. The type of the network 890 is optional.

For example, the terminal 810 may be the camera 109 in FIG. 2. The camera 109 may have, for example, a communication function according to wireless LAN, and may perform communication with the PC 106 via the wireless LAN. It goes without saying that the wireless LAN communication function of the camera 109 may be omitted. The camera 109 may directly be connected to the PC 106 by a USB cable, for example. It goes without saying that the terminal 810 may be the smart phone 102 or tablet terminal 104 in FIG. 2.

The terminal 830 is a terminal similar to the terminal 330 in FIG. 4. The terminal 830 may be the PC 106 in FIG. 2, for example.

The terminal 850 may be, for example, the smart phone 102 or tablet terminal 104 in FIG. 2. The terminal 850 may be a PC different from the terminal 830.

The sever 870 may be a computer which serve both of the management server 112 and content server 113 in FIG. 2. The network 890 may be the network 101 in FIG. 2.

Hereinafter, details of the devices within the system 800 will be described.

The terminal 810 includes a communication unit 811, a creation unit 812, a file storage unit 813, and a device ID storage unit 814. The communication unit 811 may perform communication with the terminal 830 via the network 890, or may perform communication with the terminal 830 via connection such as a USB cable connected to the terminal 830. The communication unit 811 may further perform communication with the server 870 via the network 890.

The creation unit 812 creates a file, and the created file is stored in the file storage unit 813. Also, the device ID storage unit 814 stores a device ID for identifying the terminal 810.

For example, the terminal 810 may be the camera 109. The camera 109 is also a type of the information processing apparatus 200 in FIG. 3.

For example, the communication unit 811 may be realized by the network communication apparatus 203 for wireless LAN communication, or may be realized by the serial connection I/F circuit 204 for serial connection such as a USB cable or the like. With the camera 109, the network communication apparatus 203 is omissible.

In the event that the terminal 810 is the camera 109, the creation unit 812 creates a photo image file. That is to say, the creation unit 812 may be realized by a hardware component such as a lens, a photoelectric converter, the CPU 201, and so forth. The file storage unit 813 may be realized by a recording medium 210 (more specifically, semiconductor memory card) set to the reader/writer 208 of the camera 109. The device ID storage unit 814 may be realized by the nonvolatile storage device 207 (e.g., ROM or flash memory). For example, a manufacturing serial number may be stored in the device ID storage unit 814 as a device ID.

It goes without saying that the terminal 810 may be the smart phone 102, tablet terminal 104, or PC 106.

The terminal 830 is a terminal similar to the terminal 330 in FIG. 4 as described above. The terminal 830 includes a communication unit 831, a file storage unit 832, a monitoring unit 833, a device ID storage unit 834, a DB management unit 835, a DB storage unit 836, a priority calculating unit 837, a backup storage unit 838, and a backup control unit 839. Also, in the same way as with the terminal 330, the terminal 830 may also be realized by the information processing apparatus 200.

The communication unit 831 performs communication with the terminal 810 via the network 890 or cable connection such as a USB cable or the like. Also, the communication unit 831 performs communication with the server 870 and terminal 850 via the network 890. For example, the communication unit 831 may be realized by the network communication apparatus 203. The communication unit 831 may be realized by both of the network communication apparatus 203 and serial connection I/F circuit 204.

The file storage unit 832, monitoring unit 833, and device ID storage unit 834 are the same as the file storage unit 332, monitoring unit 333, and device ID storage unit 334 of the terminal 330. Accordingly, detailed description will be omitted. The same DB as with the DB 510 in FIG. 7 is stored in the file storage unit 832.

The DB management unit 835 performs the same processing as with the DB management unit 335 of the terminal 330, and also further performs processing for estimating information regarding a file created by another terminal. The details of estimation that the DB management unit 835 performs will be described later along with FIGS. 17 to 18. The DB management unit 835 may be realized by the CPU 201 which executes a program.

The DB storage unit 836, priority calculating unit 837, backup storage unit 838, and backup control unit 839 are the same as the DB storage unit 336, priority calculating unit 337, backup storage unit 338, and backup control unit 239 of the terminal 330. Accordingly, detailed description will be omitted.

Now, the terminal 850 includes a communication unit 851, a file storage unit 852, and a device ID storage unit 853.

The communication unit 851 performs communication with the terminal 830 and server 870 via the network 890. The communication unit 851 may further perform communication with the terminal 810 via the network 890. The communication unit 851 may be realized by the network communication apparatus 203, for example.

The file storage unit 852 stores various files. The device ID storage unit 853 stores a device ID for identifying the terminal 850. The file storage unit 852 and device ID storage unit 853 may be realized by the nonvolatile storage device 207, for example.

Note that, though omitted in FIG. 16, the terminals 810, 830, and 850 each include the input device 205 and output device 206.

Incidentally, the server 870 includes a communication unit 871, a DB storage unit 872, a device management unit 873, a DB management unit 874, and a file storage unit 875.

The communication unit 871 performs communication with the terminal 830 and server 850 via the network 890. The communication unit 871 may be realized by the network communication apparatus 203, for example.

The DB storage unit 872 is the same as the DB storage unit 352 of the server 350. The DB storage unit 872 may be realized by the nonvolatile storage device 207.

The device management unit 873 is similar to the device management unit 353 of the server 350. However, the format of a device management table (not illustrated) held by the device management unit 873 differs from that of the device management table 520 in FIG. 8 held by the device management unit 353. Specifically, each entry of the device management table held by the device management unit 873 includes not only a user ID and a device ID but also a flag that indicates whether or not the device has a function to generate metadata. The device management unit 873 may be realized by the nonvolatile storage device 207 which stores a device management table, and the CPU 201 which executes processing with a device management table, for example.

The DB management unit 874 executes not only processing similar to processing that the DB management unit 354 of the server 350 performs in the second embodiment but also processing similar to processing that the monitoring unit 333 and DB management unit 335 of the terminal 330 perform.

Specifically, the server 870 according to the third embodiment accepts upload of each file from various terminals via the network 890, and stores the uploaded file in the file storage unit 875. Also, the server 870 also accepts a download request as to a file stored in the file storage unit 875.

That is to say, the server 870 according to the third embodiment serves both of the management server 112 and content server 113 in FIG. 2. The server 870 is similar to the terminal 330 according to the second embodiment in that transmission/reception of a file is performed. Therefore, the DB management unit 874 also executes processing similar to processing that the monitoring unit 333 and DB management unit 335 of the terminal 330 perform.

Note that the server 870 also further accepts other requests as to a file stored in the file storage unit 875 from various terminals via the network 890. For example, the server 870 may accept a request for performing an operation such as editing, movement, renaming, deletion, addition of comment, or the like on a file.

Details of the processing that the DB management unit 874 executes will be described later along with FIGS. 19 to 20. The DB management unit 874 may be realized by the CPU 201 which executes a program, for example. The file storage unit 875 may be realized by the nonvolatile storage device 207.

Incidentally, with regard to the above second embodiment, description has been made in detail regarding calculation of the priority of each of multiple files distributed to multiple terminals which a certain user uses (e.g., terminals 310 and 330). As described above, priority according to the second embodiment is calculated based on each operation that this user performed on each file. However, with the second embodiment, priority has no relation with other users.

However, with the third embodiment, another user's action as to a file owned by a certain user is also reflected on the priority of this file. For example, a file owned by a certain user may be uploaded to the server 870 and stored in the file storage unit 875, or may be disclosed to other one or more specific or unspecific users. Other users may perform the following actions on a file uploaded to the server 870 and disclosed.

Action to access or download a file.
Action to add additional information such as comment or a tag or the like to a file.
Action to generate a reference link to a file (e.g., track back).

Also, in order to share an evaluation or reference or the like for a file between users via social networking service (SNS), a user interface element (e.g., button) correlated with a file may be provided to a web page on the server 870. An SNS-specific function for sharing an evaluation or reference or the like for a file between users via the SNS has been assigned to such a user interface element.

For example, an action to click such a button (more specifically, e.g., a Like button, etc.) is also one of actions that other users may perform on a file owned by a certain user. That is to say, an action to call up the above function assigned to the user interface element may be performed by other users.

With the third embodiment, for example, actions by other users as exemplified above are taken into consideration in calculation of priority.

For example, in the event that the server 870 supports a comment function, a second user may add a comment to a file uploaded from a first user terminal to the server 870, over the server 870. The first user may regard a file to which many comments have been transmitted from many other users, as an important file, and may regard a file to which almost no reply has been provided from other users, as a less important file.

Also, the first user may edit a certain file, and upload the file after editing to the server 870. In the event that comments have been transmitted or download requests have been transmitted to the uploaded file from many other users, the first user may regard the original file before editing as an important file. That is to say, in this case, the first user may regard the root file of a file tree to which the uploaded file belongs as an important file.

The third embodiment is particularly effective for the first user having though as described above, for example. Hereinafter, for convenience of description, assumption is made as follows.

The terminals 810 and 830 are terminals used by a user having a user ID of "suzuki_taro".

The terminal 850 may be a terminal used by a user having a user ID of "suzuki_taro" or may be a terminal used by a user having a user ID of "sato_jiro".

Now, under assumption as describe above, description will be made regarding outline of operations of the terminals 810, 830, and 850 and server 870 according to the third embodiment, with reference to FIGS. 1 and 17.

As described above regarding FIG. 1, the information processing apparatus which executes the processing in FIG. 1 may be one of multiple terminals, or may be a computer (e.g., server 870) which performs communication with at least one or more terminals of multiple terminals via a network. With the third embodiment, the information processing apparatus which executes the processing in FIG. 1 is specifically the terminal 830.

As described above regarding steps S1 and S2 in FIG. 1, a specific procedure for obtaining history information and tracking information varies according to embodiments. With the third embodiment, the terminal 830 may obtain history information by generating history information, or may obtain tracking information by generating tracking information. Also, the terminal 830 may obtain history information by receiving history information from the server 870, or may obtain tracking information by receiving tracking information from the server 870.

Hereinafter, description will be made regarding a specific example of exchange of metadata including history information and tracking information, with reference to FIG. 17. FIG. 17 is a diagram illustrating an example of an operation sequence of the third embodiment.

In step S601, the creation unit 812 of the terminal 810 creates a file 901. The file 901 is stored in the file storage unit 813.

Thereafter, in step S602, the terminals 810 and 830 are connected via the network 890, or are directly connected by a USB cable or the like. The file 901 is transmitted from the terminal 810 to the terminal 830. Specifically, the file 901 is read out from the file storage unit 813, transmitted from the communication unit 811, received at the communication unit 831, and stored in the file storage unit 832.

Now, the monitoring unit 833 which monitors the file storage unit 832 detects reception and saving of the file 901. According to the detection, in step S603 the DB management unit 835 generates metadata 902 including history information regarding reception and saving of the file 901.

Also, the DB management unit 835 estimates from the file 901 information regarding the terminal 810 which is a transmission source of the file 901, and information regarding the creation time and date of the file 901 at the terminal 810. In the event of having obtained some sort of information by the estimation, the DB management unit 835 may include the information obtained by the estimation in the metadata 902.

For example, a file having a certain type of format includes a property. The property may include creation time and date of a file.

Accordingly, the DB management unit 835 of the terminal 830 may search for the field of creation time and date of the file 901 at the terminal 810 from the property of the file 901. In the event of having found the field of creation time and date within the property, the DB management unit 835 reads the creation time and date from the property.

Also, in the event that the file 901 is an image file, the file 901 may include Exchangeable image file format (Exif) data. The Exif data may include various fields.

For example, the creation time and date of the file 901 may be included in the Exif data of the file 901. Also, the manufacturing serial number of the terminal 810 which has created the file 901 may be included in the Exif data of the file 901.

Therefore, in the event that the file 901 includes the Exif data, the DB management unit 835 may search for the fields of creation time and date and manufacturing serial number out of the Exif data. If the fields of creation time and date and manufacturing serial number have been found within the Exif data, the DB management unit 835 reads the creation time and date and manufacturing serial number from the Exif data. The DB management unit 835 may search for other information regarding the terminal 810 such as the type (mode) of the terminal 810 or the like in addition to the manufacturing serial number (or instead of the manufacturing serial number) out of the Exif data.

For example, the DB management unit 835 may estimate information regarding the terminal 810 which is a transmission source of the file 901, and information regarding the creation time and date of the file 901 at the terminal 810 by performing the above processing. As a result of the estimation, if obtaining of some sort of information has succeeded, the DB management unit 835 may include the obtained information in the metadata 902.

Note that, as described above, the metadata 902 includes not only information obtained by the estimation regarding the terminal 810 but also history information regarding reception and saving at the terminal 830 itself. For example, the DB management unit 835 may generate history information as follows and include this in the metadata 902.

The DB management unit 835 recognizes time and date when the file 901 was saved in the file storage unit 832, based on a notification form the monitoring unit 833. Also, the DB management unit 835 issues a new file ID to the file 901, and obtains a path of a directory where the file 901 was saved, and the name of the file 901. Further, the DB management unit 835 calculates the unique value of the file 901.

Also, the DB management unit 835 determines the log type to be "reception" based on the notification from the monitoring unit 833. Note that, in the event that having obtained the manufacturing serial number of the terminal 810 as described above, the DB management unit 835 may represent the log type using a format including the manufacturing serial number that indicates the transmission source of the file 901.

The DB management unit 835 may generate new history information corresponding to one entry of a history table within the DB on the DB storage unit 836 in a manner described above. Next, the DB management unit 835 adds an entry corresponding to the file 901 to the ID table having the same format as the ID table 511 in FIG. 7 to create a new history table corresponding to the file 901. The DB management unit 835 further adds one entry (i.e., entry that indicates history information thus generated) to the created history table.

Also, in the next step S604, the terminal 830 transmits the metadata 902 to the server 870. The metadata 902 is received at the communication unit 871 of the server 870.

Now, in step S605 the device management unit 873 obtains a user ID for identifying the user of the terminal 830 from the device ID of the terminal 830 which is a transmission source of the metadata 902. Also, in accordance with the obtained user ID, the received metadata 902 is written in an appropriate DB within the DB storage unit 872.

Incidentally, the metadata 902 transmitted from the terminal 830 to the server 870 indicates that the terminal 830 has received the file 901 from the terminal 810. However, the server 870 does not receive metadata that indicates transmission serving as a pair with reception that the metadata 902 indicates (i.e., history information that indicates that the terminal 810 transmitted the file 901 to the terminal 830). This is because the terminal 810 has no function to generate metadata. Also, the server 870 recognizes that the terminal 810 does not have a function to generate metadata. This is because the terminal 810 has been registered in the device management unit 873 of the server 870 (more specifically, device management table) as a terminal which generates no metadata.

Accordingly, the DB management unit 874 of the server 870 also generates tracking information in step S605 without waiting for metadata that indicates transmission serving as a pair with reception that the metadata 902 indicates being received from the terminal 810. That is to say, the DB management unit 874 generates tracking information that correlates a parent file stored in the terminal 810, and a child file received from the terminal 810 and stored in the terminal 830.

Note that the data of the parent file and the data of the child file are mutually equal. Therefore, with description regarding FIG. 17, for convenience, both of the parent file and child file are referenced with a reference numeral of "901".

The DB management unit 874 writes the generated tracking information in the DB storage unit 872. That is to say, the DB management unit 874 adds one entry to a tracking table within the DB storage unit 872.

Next, metadata 903 including the tracking information thus generated is transmitted from the server 870 to the terminal 830 in step S606. Upon the communication unit 831 receiving the metadata 903, the DB management unit 835 stores the metadata 903 in the DB storage unit 836.

Incidentally, a file may be duplicated between the terminal 830 and the server 870. Specifically, a file may be duplicated by upload from the terminal 830 to the server 870, or a file may be duplicated by download from the server 870 to the terminal 830 or 850. Step S607 is an example of the former case.

Specifically, in step S607, an existing file 904 stored in the file storage unit 832 is transmitted from the communication unit 831. The file 904 is received at the communication unit 871 of the server 870, and saved in the file storage unit 875.

Now, in step S608 the DB management unit 874 of the server 870 generates history information in response to reception and saving of the file 904, and updates the DB in the DB storage unit 872. Though omitted from FIG. 17, the generated history information may further be transmitted from the server 870 to the terminal 830.

Figure 17:
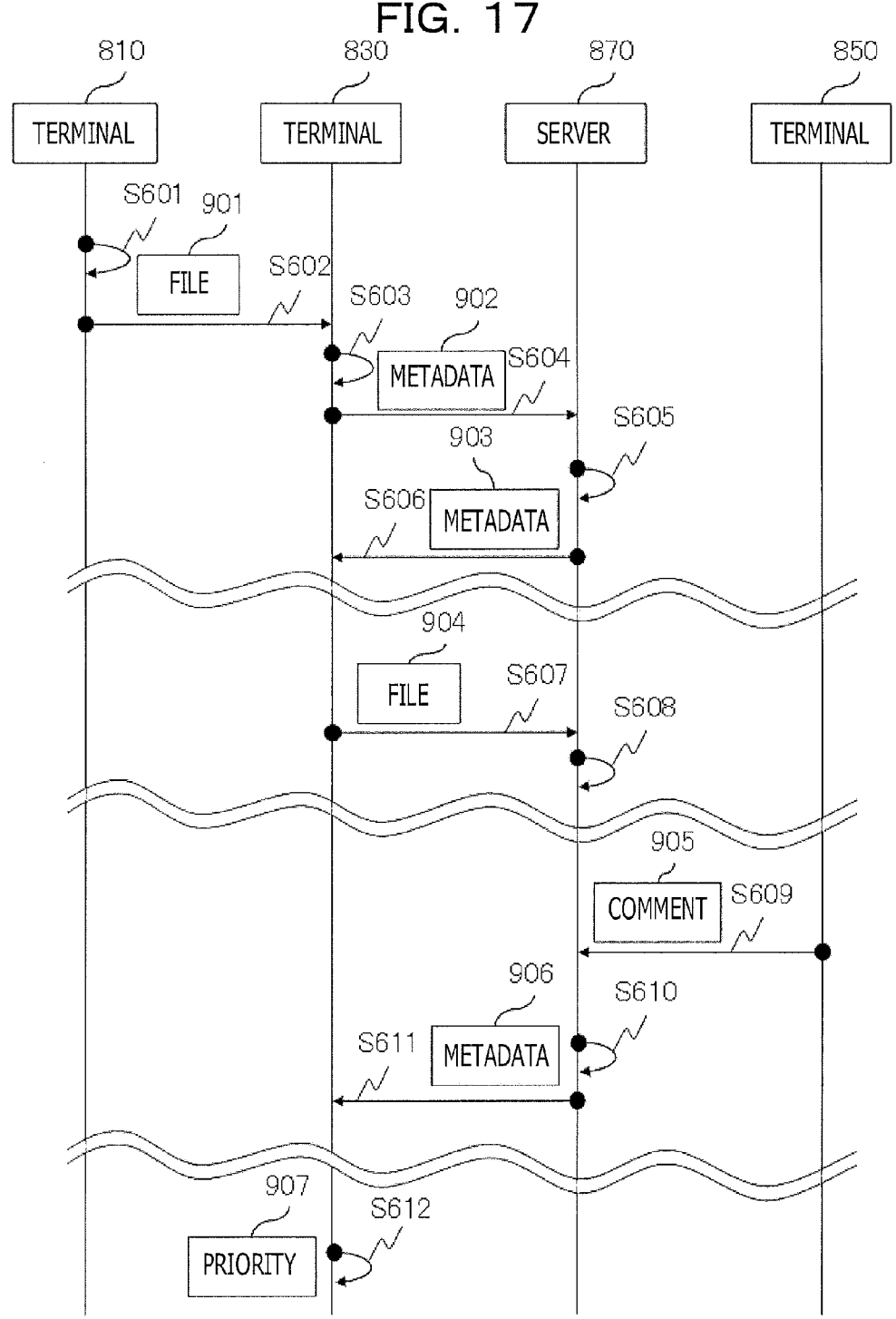
FIG. 17 is a diagram illustrating an example of an operation sequence of the third embodiment.

Also, though omitted in FIG. 17, the terminal 830 which has transmitted the file 904 further transmits metadata including history information that indicates transmission of the file 904 to the server 870. Thus, that the terminal 830 transmits metadata to the server 870 is the same as that the terminal 310 which has transmitted the file 404 in FIG. 5 transmits the metadata 406 including history information that indicates transmission of the file 404 to the server 350.

Now, the DB management unit 874 further generates tracking information regarding a duplication operation of the file 904 between the terminal 830 and the server 870 from the history information generated regarding reception at the server 870, and the history information obtained from the terminal 830 regarding transmission at the terminal 830. The DB management unit 874 adds the generated tracking information to the tracking table in the DB storage unit 872.

Though omitted in FIG. 17, the tracking information thus generated is also transmitted from the server 870 to the terminal 830.

Specifically, in step S608, the DB management unit 874 issues a file ID for identifying the file 904 at the server 870, and generates a new history table regarding the file 904 stored in the file storage unit 875. Also, the DB management unit 874 generates tracking information that correlates a parent file stored in the terminal 830, and a child file received from the terminal 830 and stored in the server 870. A new entry that indicates the tracking information thus generated is added to the tracking table within the DB storage unit 872.

Note that the data of the parent file and the data of the child file are mutually equal. Therefore, with description regarding FIG. 17, for convenience, both of the parent file and child file will be referenced with a reference numeral of "904".

Incidentally, with regard to the file 904 uploaded to the server 870 as described above, access privileges may be given to only the user himself/herself who uses the terminals 810 and 830. Also, access to the file 904 on the server 870 may be permitted for specific other one or more users. Access to the file 904 on the server 870 may be permitted for unspecific arbitrary other users in some instances.

Note that the type of access privileges may be determined as appropriate according to embodiments. For example, reading access, writing access, or both thereof may be permitted for specific or unspecific other one or more users.

Also, according to embodiments, the following actions may be permitted as long as a user has reading access privileges. Alternatively, an embodiment may be employed wherein access privileges different from reading access privileges are defined for the following actions.

Action to add additional information such as a comment or tag or the like to a file.

Action to generate a reference link to a file (e.g., track back).

Action to call up an SNS-specific function for sharing an evaluation or reference or the like for a file between users via the SNS (e.g., action to call up the function by clicking a predetermined button).

For simplification of description, with the example in FIG. 17, let us say that an action to access the file 904 on the server 870 and an action to add a comment to the file 904 are permitted for arbitrary users. Also, the terminal 850 may be a terminal owned by the user himself/herself who uses the terminals 810 and 830, or another user's terminal.

As illustrated in step S609, a comment 905 as to the file 904 uploaded to the server 870 may be transmitted from the terminal 850 to the server 870.

Now, in step 610 the DB management unit 874 of the server 870 generates metadata 906 including history information that indicates that an operation of "addition of the comment 905" has been performed on the file 904. The DB management unit 874 stores the metadata in the DB storage unit 872.

Further, in step S611, the metadata 906 is transmitted from the communication unit 871, received at the communication unit 831 of the terminal 830, and stored in the DB storage unit 836.

In the next step S612, upon a trigger event to back up a file occurring, history information regarding an operation such as addition of the comment 905 is also taken into consideration in calculation of priority 907. According to occurrence of the trigger event, the priority calculating unit 837 calculates the priority 907 regarding each file owned by the user who uses the terminal 830. Specifically, the priority 907 is calculated regarding the following files.

Files stored in the file storage unit 813 of the terminal 810.
Files stored in the file storage unit 832 of the terminal 830.
Files stored in the file storage unit 852 of the terminal 850 (restricted to a case where the terminal 850 is the aforementioned user's terminal)
Files owned by the aforementioned user of files stored in the file storage unit 875 of the server 870.

Next, the backup control unit 839 selects a file to be backed up in accordance with the priority 907, and backs up the selected file to the backup storage unit 838.

Next, description will be made regarding various types of processing to be performed in the third embodiment for realizing an operation sequence exemplified in FIG. 17, with reference to the flowchart in FIGS. 18 to 20.

Figure 18:
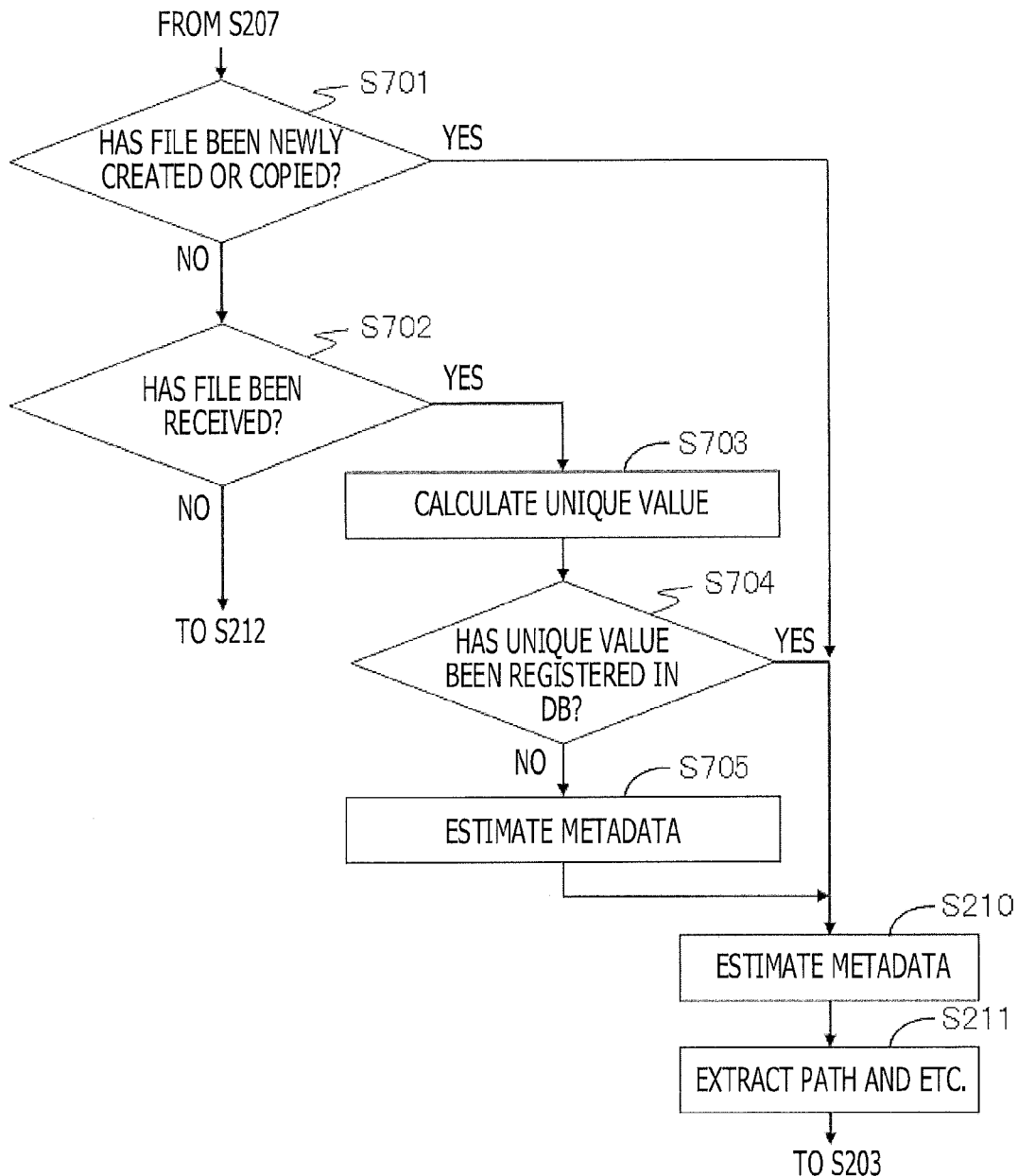
FIG. 18 is a flowchart illustrating a part of processing to be performed by a terminal in the third embodiment.

FIG. 18 is a flowchart illustrating a part of processing performed by the terminal 830 in the third embodiment. The terminal 830 executes processing similar to the processing in FIG. 11 that the terminal 330 executes. Specifically, the terminal 830 executes processing wherein a part of the processing in FIG. 11 is modified as illustrated in FIG. 18. As may be understood from comparison between FIGS. 11 and 18, of processing in steps S209 to S211 in FIG. 11, in FIG. 18 step S209 is replaced with steps S701 to S705.

Further, with the third embodiment, "transmission" in step S201 may be transmission from the terminal 830 to another terminal (e.g., terminal 810 or 850), or transmission from the terminal 830 to the server 870. According to such a modification in step S201, in step S202 in the third embodiment, information for identifying the server 870 may be extracted as information of a transmission destination.

Now, as may be understood from FIG. 11, in step S207, the DB management unit 835 performs the following determination. Specifically, the DB management unit 835 determines whether or not an event that another operation other than modification, movement, renaming, deletion, and copy has been performed on an existing file stored in the file storage unit 832 has been detected by the monitoring unit 833. In the event that such an event has been detected (i.e., in the event that the monitoring results that indicate detection of such an event have been output from the monitoring unit 833 to the DB management unit 835), step S701 in FIG. 18 is executed.

In step S701, the DB management unit 835 determines whether or not one of the following events has been detected.
Event that a file has newly been created within the terminal 830.
Event that an existing file within the file storage unit 832 has been copied.

In the event that one of the above events has been detected (i.e., in the event that the monitoring results that indicate detection of such an event have been output from the monitoring unit 833 to the DB management unit 835), the processing in FIG. 18 proceeds to step S210. Step S210 and step S211 subsequent thereto are the same as with FIG. 11. After execution of step S211, step S203 is executed.

Conversely, in the event that none of the above events has been detected, the processing in FIG. 18 proceeds to step S702. Next, in step S702, the DB management unit 835 determines whether or not an event that a file has been received via the communication unit 831, and stored in the file storage unit 832 has been detected.

In the event that such an event has been detected, the processing in FIG. 18 proceeds to step S703. Conversely, in the event that such an event has not been detected, in the same way as with FIG. 11, step S212 is executed next.

Note that "reception" detected in step S702 may be reception at the terminal 830 of a file transmitted from another terminal (e.g., terminal 810 or 850), or may be reception at the terminal 830 of a file transmitted from the server 870.

Now, in step S703, the DB management unit 835 calculates a unique value from a file received and stored in the file storage unit 832. In the next step S704, the DB management unit 835 determines whether or not the calculated unique value is registered I the DB. Specifically, the DB management unit 835 searches for a history table including an entry including the calculated unique value.

Note that the DB on the DB storage unit 836 of the terminal 830, and the DB for the user of the terminal 830 in the DB storage unit 872 of the server 870 may not completely be synchronized depending on communication environments. Accordingly, in step S704, specifically, as illustrated in FIG. 11 in steps S214, S215, S216, and S213, it is desirable to perform processing for synchronization. Thus, the DB on the DB storage unit 836 is synchronized with the DB on the server 870 and becomes the latest state. The DB management unit 835 searches for, with the DB on the DB storage unit 836 thus synchronized, a history table including an entry including the unique value calculated in step S703.

If a history table including an entry including the calculated unique value has been found, the processing in FIG. 18 proceeds to step S210. This is because, in this case, a transmission source of a file received by the terminal 830 (i.e., another terminal or server 870), metadata regarding this file has already registered in the DB. Accordingly, the DB management unit 835 does not have to newly generate such metadata, and also does not have to estimate metadata. In this case, it is enough for the DB management unit 835 to generate only metadata regarding a file newly stored in the file storage unit 832 of the terminal 830. Accordingly, the processing in FIG. 18 proceeds to step S210.

For example, though omitted in FIG. 16, the user of the terminal 830 may further use a terminal configured to generate metadata such as the terminal 310 in FIG. 4. In the event that the terminal 830 has received a file from the terminal 310, metadata generated at the terminal 310 which is a transmission source exists within the DB. Accordingly, in this case, a history table including an entry including the calculated unique value has been found in step S704.

Also, even in the event that the terminal 830 has received a file from a terminal which does not generate metadata like the terminal 810, there may be found a history table in step S704. For example, in the event that the terminal 830 has received a file which the terminal 830 had ever been received from the terminal 810, again from the terminal 810, a history table has been found.

However, conversely, in the event that a history table including an entry including the unique value calculated in step S703, the processing in FIG. 18 proceeds to step S705. In step S705, the DB management unit 835 estimates metadata regarding the received file.

Specifically, as described regarding step S903 in FIG. 17, the DB management unit 835 attempts extraction of identification information (e.g., manufacturing serial number or the like) for identifying creation time and date of the received file, or a transmission source terminal of the file from the Exif data or property. Extraction of creation time and date or identification information may succeed, or no information may be extracted depending on the file received by the terminal 830. In either case, the processing in FIG. 18 proceeds to step S210.

Note that, in the event that extraction of information has succeeded in step S705, in step S204 to be executed after steps S210 and S211, the extracted information is transmitted from the terminal 830 to the server 870.

Figure 19:
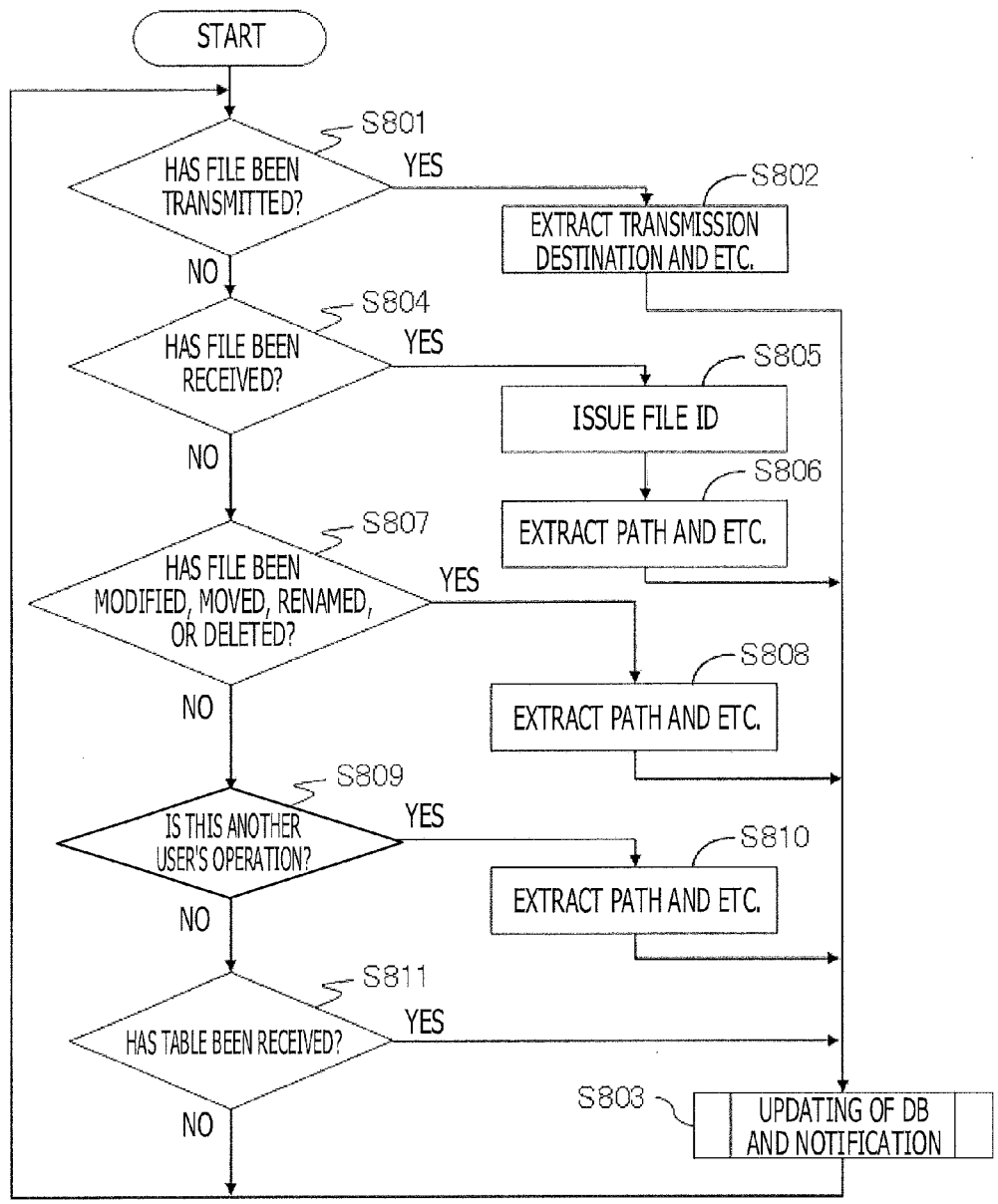
FIG. 19 is a flowchart of processing to be performed by a server in the third embodiment.

Now, FIG. 19 is a flowchart of processing to be performed by the server 870 in the third embodiment. As described above, the DB management unit 874 of the server 870 according to the third embodiment performs the following processing.

Processing similar to processing that the monitoring unit 333 and DB management unit 335 of the terminal 330 according to the second embodiment performs.

Processing similar to processing that the DB management unit 354 of the server 350 according to the second embodiment performs.

FIG. 19 specifically illustrates the former processing. FIG. 20 equivalent to step S803 in FIG. 19 specifically illustrates the latter processing.

Now, in step S801, the DB management unit 874 determines whether or not an event that a file stored in the file storage unit 875 has been transmitted from the communication unit 871 according to a download request from one of the terminals has occurred. In the event that such an event has occurred, the processing in FIG. 19 proceeds to step S802. Conversely, in the event that such an event has not been detected, the processing in FIG. 19 proceeds to step S804.

In step S802, the DB management unit 874 extracts information such as a transmission destination of the file and so forth. As described above, the DB management unit 874 according to the third embodiment also performs processing similar to that of the monitoring unit 333 according to the second embodiment. For example, the DB management unit 874 monitors reception of a download request and transmission of a file according to the download request.

Accordingly, in step S802, the DB management unit 874 obtains information, for example, such as the following as monitoring results.

Information that indicates the log type of "transmission".

Time and date when the file was transmitted.

The path of a directory in the file storage unit 875 where the transmitted file is located, and the file name of this file.

A device ID for identifying a transmission destination terminal (e.g., in the event that a file has been transmitted to the terminal 850 according to a download request from the terminal 850, the device ID of the terminal 850).

Incidentally, the value of a device ID is a value for identifying the server 870 in an entry within the ID table that represents a file stored in the file storage unit 875 of the server 870. Accordingly, the DB management unit 874 obtains the file ID of the transmitted file with reference to the ID table within the DB storage unit 872 using the device ID of the server 870 itself and the obtained path and file name as a search key.

Note that the DB management unit 874 recognizes which user the owner of each file stored on the file storage unit 875 is. For example, the owner of each file may be recorded by a file system provided by an operating system (OS) of the server 870. The DB management unit 874 may recognize the owner of each file via the file system. In step S802, the DB management unit 874 also obtains a user ID for identifying a user who is an owner of the file to determine to which user's DB's history table an entry that indicates that the file was transmitted is added.

Also, the DB management unit 874 inquires of the device management unit 873 for the user ID of the transmission destination terminal user using the device ID of the transmission destination terminal. The user himself/herself who is a file owner may download a file, or another user may download a file. Therefore, the two user IDs thus obtained may be equal or may differ.

Further, the DB management unit 874 obtains the unique value of the transmitted file. Specifically, the DB management unit 874 may calculate the unique value from the file identified by the above path and file name. Also, the DB management unit 874 may read out a unique value from the latest entry of a history table corresponding to this file.

As described above, upon information to be included in an entry to be added to the history table being obtained by the DB management unit 874, the processing in FIG. 19 proceeds to step S803. Details of step S803 will be described later along with FIG. 20. Outline thereof is that in step S803, the DB management unit 874 updates the DB as appropriate using the obtained information, and informs the updated or added entry (i.e., metadata including history information, tracking information, or both thereof) to an appropriate one or more terminals. After execution of step S803, the processing in FIG. 19 returns to step S801.

Now, in step S804, the DB management unit 874 determines whether or not an event that a file transmitted from one of the terminals was received at the communication unit 871 and stored in the file storage unit 875 has occurred. Specifically, the DB management unit 874 also monitors upload of a file from a terminal to the sever 870, and performs determination in step S804 according to the monitoring results.

In the event that the above event has occurred (i.e., in the event that a file has been uploaded), the processing in FIG. 19 proceeds to step S805. For example, upon the file 904 being uploaded from the terminal 830 in step S607 in FIG. 17, the processing in FIG. 19 proceeds to step S805. Conversely, in the event that the above event has not been detected, the processing in FIG. 19 proceeds to step S807.

In step S805, the DB management unit 874 issues a new file ID. For example, in the event that a sequence number is employed as a file ID within the server 870, the DB management unit 874 may obtain a new file ID by incrementing a counter.

Next, in step S806, the DB management unit 874 obtains the following information as monitoring results, for example.

Information that indicates the log type of "reception".

The path of a directory on the file storage unit 875 where the uploaded file was saved.

The file name in the file storage unit 875 of the uploaded file.

Time and date when the uploaded file was saved in the file storage unit 875.

The device ID of a transmission source terminal of the uploaded file.

Also, the DB management unit 874 also calculates the unique value of the uploaded file.

Further, the DB management unit 874 obtains a user ID to determine whether to update which user's DB. Specifically, the DB management unit 874 obtains the user ID of an owner of the uploaded file.

Specifically, the DB management unit 874 may obtain the user ID via the file system based on the above path and file name. Alternatively, the DB management unit 874 may use the obtained device ID to obtain the user ID from the device ID via inquiry for the device management unit 873.

As described above, upon the DB management unit 874 obtaining information to be included in an entry to be added to the ID table, and information to be included in a history table to be newly added, the processing in FIG. 19 proceeds to step S803.

Now, in step S807, the DB management unit 874 determines whether or not an event that a file stored in the file storage unit 875 has been modified, moved, renamed, or deleted has been detected has occurred. Specifically, the DB management unit 874 monitors whether or not a request for modification, movement, renaming, or deletion as to a file stored in the file storage unit 875 has been received by the communication unit 871 from one of the terminals via the network 890. The DB management unit 874 performs the determination in step S807 in accordance with monitoring results. Note that depending on access privileges set to a file, a file owned by a certain user may also be modified, moved, renamed, or deleted by another user.

In the event that an event as described above has been detected, the processing in FIG. 19 proceeds to step S808. Conversely, unless an event as described above has been detected, the processing in FIG. 10 proceeds to step S809.

In step S808, the DB management unit 874 obtains information such as a path and so forth. Specifically, this information is as follows.

For example, in the event that a certain file on the file storage unit 875 has been modified, the DB management unit 874 obtains the following information as monitoring results.
  Information that indicates the log type of "modification".
  The path of a directory where the modified file is located.
  The file name of the modified file.
  In the event that the DB management unit 874 may detect time taken for modification of the file, time and date when modification of the file was started, and time taken for modification of the file.
  In the event that the DB management unit 874 does not detect time taken for modification of the file, time and date when the modified file was saved.
  The device ID of a requestor terminal which has transmitted a request for modifying the file to the server 870.

Further, the DB management unit 874 also obtains the user ID of a user who is an owner of the modified file to determine to which user's DB history information regarding a modification operation is added. The DB management unit 874 also calculates a new unique value of the modified file. Also, the DB management unit 874 obtains from the device ID of the request source terminal the user ID of the user of this terminal via inquiry for the device management unit 873. The DB management unit 874 also obtains a file ID from the path and file name with reference to the ID table.

Also, in the event that a certain file on the file storage unit 875 has been moved from a certain directory to another directory, the DB management unit 874 obtains the following information as monitoring results.
  Information that indicates the log type of "movement".
  The path of a directory where the file was located before movement.
  The path of a directory of a destination where the file was moved.
  The file name of the moved file.
  Time and date when a movement operation was performed.
  The device ID of a requestor terminal which has transmitted a request for moving the file to the server 870.

Further, the DB management unit 874 obtains, in the same way as with the case where a file has been modified, two user IDs, and also obtains a file ID.

Also, in the event that a certain file on the file storage unit 875 has been renamed, the DB management unit 874 obtains the following information as monitoring results.
  Information that indicates the log type of "renaming".
  The file name before renaming.
  The file name after renaming.
  Time and date when a renaming operation was performed.
  The device ID of a requestor terminal which has transmitted a request for renaming the file to the server 870.

Further, the DB management unit 874 obtains, in the same way as with the case where a file has been modified, two user IDs, and also obtains a file ID. Also, the DB management unit 874 calculates the unique value of the renamed file.

Note that movement and renaming of a file may be performed at the same time due to execution of a certain type of command. In this case as well, the DB management unit 874 may obtain appropriate monitoring results.

Also, in the event that a certain file located on the file storage unit 875 has been deleted, the DB management unit 874 obtains the following information as monitoring results.
  Information that indicates the log type of "deletion".
  The path of a directory where the deleted file has been located so far.
  The file name of the deleted file.
  The device ID of a requestor terminal which has transmitted a request for deleting the file to the server 870.

Further, the DB management unit 874 obtains, in the same way as with the case where a file has been modified, two user IDs, and also obtains a file ID.

As exemplified above, the DB management unit 874 obtains appropriate information according to the type of an operation such as modification, movement, renaming, and deletion. Upon the DB management unit 874 obtaining information used for updating of the DB (e.g., information for rewriting an entry of the ID table, information for including an entry to be added to a history table, etc.), the processing in FIG. 19 proceeds to step S803.

Now, in step S809, the DB management unit 874 determines whether or not an event that another operation other than modification, movement, renaming, and deletion has been performed on an existing file stored in the file storage unit 875 has occurred. In the event that the above event has occurred, the processing in FIG. 19 proceeds to step S810. Conversely, in the event that the above event has not been detected, the processing in FIG. 19 proceeds to step S811.

More specifically, the DB management unit 874 monitors not only the above download request but also other various requests to be sent from a terminal to the server 870, and performs the determination in step S809 according to monitoring results. The types and number of operations to be detected in step S809 are optional according to embodiments. For example, the following operations may be detected in step S809.
  Operation to add additional information such as a comment or tag or the like to a file.
  Operation to generate a reference link to a file (e.g., track back).
  Operation to call up an SNS-specific function for sharing an evaluation or reference or the like for a file between users via the SNS (e.g., operation to click a predetermined button).

Now, in step S810, the DB management unit 874 obtains the following information as monitoring results, for example.
  Information that indicates the type of a performed operation.
  The path of a directory where the operated file is located.
  The file name of the operated file.
  Time and date when the operation was performed.
  The device ID of a requestor terminal which has transmitted a request for an operation to the server 870 (e.g., in the event that a comment 905 has been added by the terminal 850 as with step S609 in FIG. 17, the device ID of the terminal 850).

Further, in order to determine to which user's DB history information regarding the detected operation is added, the DB management unit 874 also obtains the user ID of a user who is an owner of the operated file. Note that an operation to be detected in step S809 is not an operation to modify the data of the file itself, and accordingly, the unique value of the file does not change. Also, the DB management unit 874 obtains, in the same way as with step S808, two user IDs and also a file ID.

Upon the DB management unit 874 obtaining information to be included in an entry to be added to a history table as described above, the processing in FIG. 19 proceeds to step S803.

Now, in step S811, the DB management unit 874 determines whether or not an event that the communication unit 871 has received a part or the entirety of a table to be added to the DB for one of the users, from one of the terminals has occurred. Upon such an event having occurred (i.e., upon the server 870 having received some sort of metadata from one of the terminals), the processing in FIG. 19 proceeds to step S803.

More specifically, the DB management unit 874 also monitors whether the communication unit 871 has received metadata. Upon the communication unit 871 having received metadata, the DB management unit 874 obtains the device ID of a transmission source terminal of the metadata. The DB management unit 874 also obtains the user ID of a user who uses the transmission source terminal of the metadata via inquiry for the device management unit 873 using the obtained device ID. The DB management unit 874 determines on which DB the received metadata is reflected by obtaining the user ID as described above. Thereafter, the processing in FIG. 19 proceeds from step S811 to step S803.

Conversely, in the event that an event that the communication unit 871 has received metadata has not been detected, the processing in FIG. 19 returns to step S801.

Figure 20:
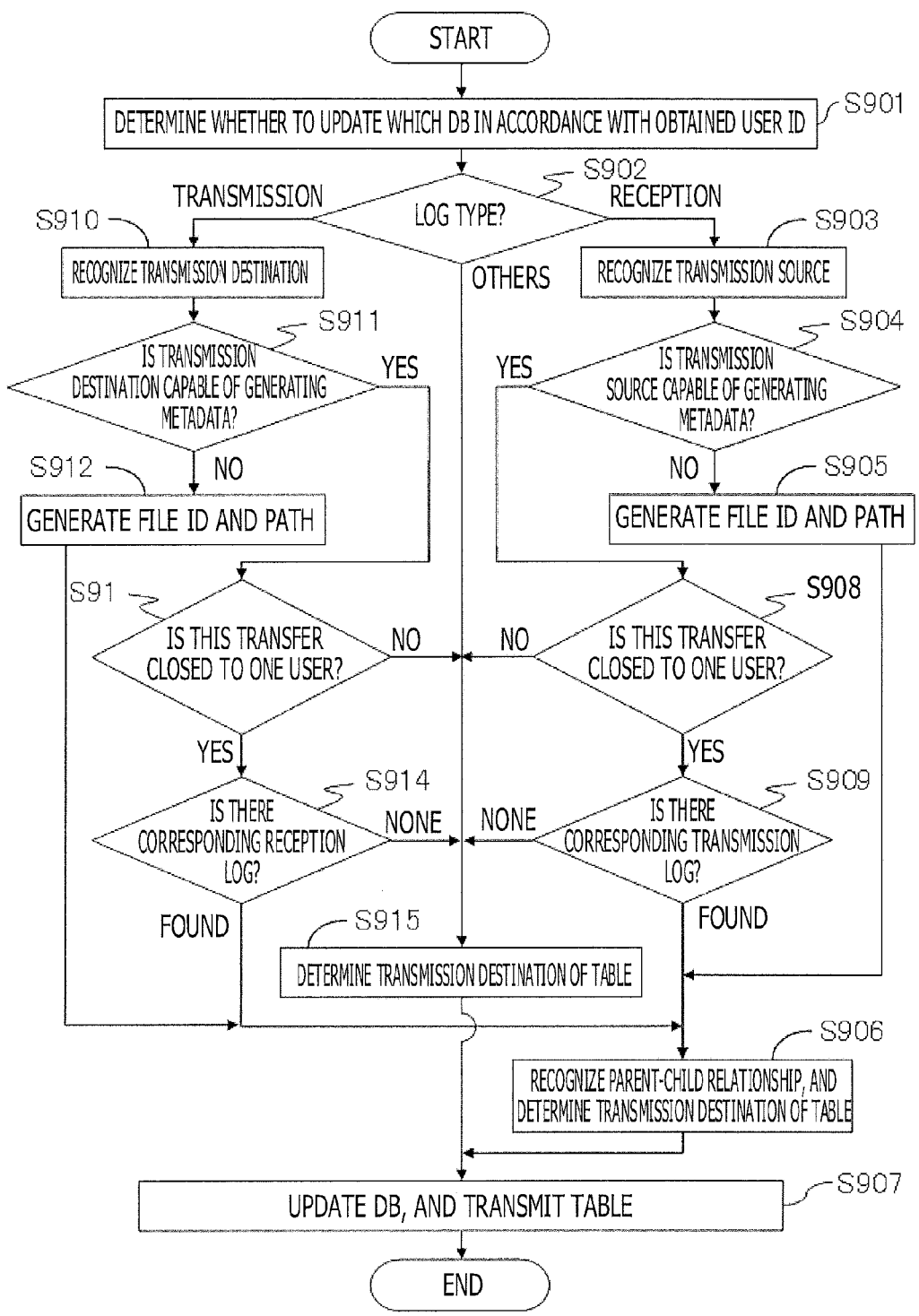
FIG. 20 is a flowchart of updating of a database and notification to be performed by a server in the third embodiment.

Now, FIG. 20 is a flowchart of updating of the DB in step S803 in FIG. 19 and notification.

In step S901, the DB management unit 874 determines which DB is to be updated in accordance with the already obtained user ID. As described above, in steps S802, S806, S808, S810, or S811 in FIG. 19, the user ID has already been obtained to determine which DB is to be updated.

For example, the DB storage unit 872 may store DBs 530-1 to 530-U for U users in the same way as with FIG. 8. A request for some sort of operation (e.g., modification, addition of a comment, etc.) as to a file owned by a user whose user ID is "suzuki_taro" may be transmitted to the server 870 from this user's own terminal or another user's terminal. In this case, the user ID of "suzuki_taro" has already been obtained. Accordingly, in this case, in step S901, the DB management unit 874 determines to update the DB 530-1 of the DBs 530-1 to 530-U.

For convenience, with the following description regarding FIG. 20, let us say that the DB management unit 874 has determined to update the DB 530-1.

Now, in the next step S902, the DB management unit 874 determines whether the log type relating to updating of the DB 530-1 is "reception" or "transmission" or other than these. In the event that the log type is "reception", the processing in FIG. 20 proceeds to step S903. In the event that the log type is "transmission", the processing in FIG. 20 proceeds to step S910. In event that the log type is neither "reception" nor "transmission", the processing in FIG. 20 proceeds to step S915. More specifically, this is performed as follows.

In the event that reception of a file has been detected in step S804 in FIG. 19, the log type is "reception". That is to say, in the event that reception at the server 870 of a file transmitted from one of the terminals has been detected, the log type is "reception".

Also, in the event that reception of metadata has been detected in step S811 in FIG. 19, and also, this metadata includes history information of the log type of "reception" as well, the log type is "reception". Specifically, in the event that transfer of a file between terminals or download of a file from the sever 870 to a terminal has been detected at the terminal on the reception side, history information has been generated at the terminal on the reception side, and the generated history information has been transmitted to the server 870 as well, the log type is "reception".

On the other hand, in the event that transmission of a file has been detected in step S801 in FIG. 19, the log type is "transmission". That is to say, in the event that transmission from the server 870 to one of the terminals has been detected, the log type is "transmission".

Also, in the event that reception of metadata has been detected in step S811 in FIG. 19, and also, this metadata includes history information of the log type of "transmission" as well, the log type is "transmission". Specifically, transfer of a file between terminals or upload of a file from a terminal to the server 870 has been detected at the terminal on the transmission side, as a result thereof, history information has been generated at the terminal on the transmission side, and the generated history information has been transmitted to the server 870 as well, the log type is "transmission".

Now, in step S903, the DB management unit 874 recognizes a transmission source of the file. Specifically, this is performed as follows.

In the event that the server 870 has received history information of the log type of "reception" from one of the terminals (e.g., terminal 830), in step S903 the DB management unit 874 extracts, in the same way as with step S405 in FIG. 12, information regarding the transmission source. Thus, the DB management unit 874 recognizes the transmission source of the file.

Also, in the event that reception of a file has been detected in step S804 in FIG. 19, the device ID of the transmission source terminal has been obtained in step S806 as describe above. Accordingly, in this case as well, the DB management unit 874 may recognize the transmission source.

Next, in step S904, the DB management unit 874 determines whether or not the transmission source recognized in step S903 may generate metadata.

For example, in the event that the transmission source is the terminal 810, the terminal 810 has no function to generate metadata. As described above, the device management table held by the device management unit 873 includes a flag that indicates whether each device has the function to generate metadata. Accordingly, in the case that the transmission source is the terminal 810, the DB management unit 874 determines that the transmission source has no function to generate metadata via inquiry for the device management unit 873.

Conversely, in the event that the transmission source is the terminal 830 for example, the DB management unit 874 determines that the transmission source has the function to generate metadata via inquiry for the device management unit 873. Also, in the event that the transmission source is the server 870 as well, the DB management unit 874 determines that the transmission source has the function to generate metadata.

In the event that determination is made that the transmission source has no function to generate metadata, the processing in FIG. 20 proceeds to step S905. Conversely, in the event that determination is made that the transmission source has the function to generate metadata, the processing in FIG. 20 proceeds to step S908.

In step S905, the DB management unit 874 generates a file ID for identifying a file at the file transmission source terminal (i.e., terminal having no function to generate metadata). The DB management unit 874 may generate a serial number as a file ID using a counter according to terminals, for example.

Also, in order to add a new entry corresponding to the file at the transmission source terminal to the ID table in subsequent step S907, the DB management unit 874 generates an appropriate path for the new entry in step S905. The path to be generated in step S905 is not a path where the file is actually located at the transmission source terminal, and is a mere expediential value. Accordingly, the DB management unit 874 may generate any kind of path.

After generation of the file ID and path, the processing in FIG. 20 proceeds to step S906. Note that a pair of the device ID that indicates the transmission source recognized in step S903, and the file ID generated in step S905 identifies a parent file in a duplication operation between devices. Specifically, information for identifying a parent file in a duplication operation of a file from a terminal which does not generate metadata (e.g., terminal 810) to another terminal (e.g., terminal 830) or server 870 is obtained in steps S903 and S905.

Now, in step S906, the DB management unit 874 recognizes parent-child relationship between files caused due to a duplication operation between terminals or between a terminal and the server 870 to generate tracking information.

For example, details of tracking information in the event that step S906 is executed following step S905 are as follows.

The parent device ID is the device ID recognized in step S903.

The parent file ID is the file ID generated in step S905.

In the event that an entry of a history table corresponding to a certain file ID has been received from a certain terminal in step S811 in FIG. 19, the child device ID is the device ID of this terminal which is the transmission source of the entry of the history table, and the child file ID is this file ID.

In the event that reception has been detected in step S804 in FIG. 19, the child device ID is the device ID of the server 870, and the child file ID is the ID issued in step S805.

Also, in step S906, the DB management unit 874 determines the transmission destination of the table. More specifically, the DB management unit 874 determines that of the terminals which the user corresponding to the DB 530-1 determined in step S901, each entry to be added or updated in later-described step S907 is transmitted to all of terminals having the function to generate metadata. The processing in FIG. 20 then proceeds to step S907.

In step S907, the DB management unit 874 updates the DB (DB selected in step S901 as an object to be updated). Specifically, in the event of having detected an operation on the server 870, the DB management unit 874 performs addition of a table, addition of an entry, and/or updating of an entry as appropriate based on information obtained in step S802, S805, S806, S808, or S810. Also, in the event that the server 870 has received metadata from one of the terminals, the DB management unit 874 performs addition of a table, addition of an entry, and/or updating of an entry as appropriate based on the received metadata. In the event of having generated a file ID in step S905 or later-described step S912, the DB management unit 874 adds an entry to the ID table. Note that in the event that step S907 is executed following step S906, the DB management unit 874 further adds the tracking information generated in step S906 to the DB.

Each entry added or updated in step S907 is transmitted from the communication unit 871 to each terminal determined to be a transmission destination in step S906, or each terminal determined to be a transmission destination in later-described step S915. After the transmission, the processing in FIG. 20 is ended.

Now, in the event that determination is made in step S904 that the file transmission source terminal has the function to generate metadata, in step S908 the DB management unit 874 determines whether or not the reception currently of interest is reception in file transfer closed to one user.

For example, the reception currently of interest may be reception at the server 870 in file transfer from the terminal 830 to the server 870. In this case, this reception is closed to one user. This is because the owner of a file to be uploaded to the server 870 is a user himself/herself who uses an upload source terminal.

Conversely, the reception currently of interest may be reception indicated with the history information obtained in step S811. In this case, the device ID of the transmission source extracted in step S903 from this history information, and the device ID of the terminal which has transmitted this history information to the server 870 may be correlated with the same user ID, or may be correlated with a different user ID.

In the event that two device IDs are correlated with the same user ID, this reception is reception in file transfer closed to one user. Conversely, in the event that two device IDs are correlated with a different user ID, this reception is not reception in file transfer closed to one user but reception in file transfer between users.

The DB management unit 874 may specifically obtain the user ID from the device ID extracted in step S903 via inquiry for the device management unit 873. The DB management unit 874 may compare the user ID thus obtained (i.e., user ID corresponding to the file transmission source) with the user ID obtained in step S811 (i.e., user ID corresponding to the file transmission destination). The DB management unit 874 may perform the determination in step S908 according to the comparison result.

When the DB management unit 874 determines that the reception currently of interest is reception in file transfer closed to one user, the processing in FIG. 20 proceeds to step S909.

Conversely, when the DB management unit 874 determines that the reception currently of interest is not reception in file transfer closed to one user, the processing in FIG. 20 proceeds to step S915. This is because, with duplication by file transfer between users, parent-child relationship is not caused between files.

Now, in step S909, the DB management unit 874 determines whether or not there is a transmission log corresponding to the reception currently of interest.

For example, the reception currently of interest may be reception at the server 870 of the file transmitted from the terminal 830 to the server 870. In this case, the transmission log corresponding to the reception currently of interest is history information generated by the terminal 830 and transmitted from the terminal 830 to the server 870, and more specifically history information with "transmission" being specified as the log type.

Conversely, the reception currently of interest may be reception indicated with the history information obtained in step S811. In this case, the transmission log corresponding to the reception currently of interest is history information generated by another terminal (or server 870) which transmitted the file to the terminal which transmitted that history information to the server 870 with "transmission" being specified as the log type.

In either case, the DB management unit 874 may determines whether or not there is a transmission log corresponding to the reception currently of interest by searching for a history table within the DB 530-1 by a method similar to step S406 in FIG. 12.

In the event that a transmission log corresponding to the reception currently of interest has been found, the processing in FIG. 20 proceeds to step S906. In this case, in step S906, the DB management unit 874 determines a parent device ID and a parent file ID based on the found transmission log, and determines a child device ID and a child file ID from the already obtained information regarding the reception currently of interest. Thus, the DB management unit 874 may generate suitable tracking information in step S906.

Conversely, in the event that a transmission log corresponding to the reception currently of interest has not been found, the processing in FIG. 20 proceeds to step S915. That is to say, in the event that a transmission log corresponding to the reception currently of interest has not been found, the server 870 does not generate tracking information this time but generates tracking information after awaiting reception of the corresponding transmission log (i.e., history information).

Now, in the event that the log type is "transmission", in step S910 the DB management unit 874 recognizes the file transmission destination. Specifically, this is performed as follows.

In the event that the server 870 has received history information of the log type of "transmission" from one of the terminals (e.g., terminal 830), in step S910 the DB management unit 874 extracts information regarding the transmission destination in the same way as with step S411 in FIG. 12. Thus, the DB management unit 874 recognizes the file transmission destination.

Also, in the event that transmission of a file has been detected in step S801 in FIG. 19, the device ID of the transmission destination terminal has already been obtained in step S802 as described above. Accordingly, in this case, the DB management unit 874 may recognize the transmission destination.

Next, in step S911, the DB management unit 874 determines whether or not the transmission destination recognized in step S910 may generate metadata. The details of the determination in step S911 are the same as with step S904 except for difference between the transmission source and transmission destination. Accordingly, detailed description in step S911 will be omitted.

Note that, in the event that determination is made that the transmission destination of a file has no function to generate metadata, the processing in FIG. 20 proceeds to step S912. Conversely, in the event that determination is made that the transmission destination of a file has the function to generate metadata, the processing in FIG. 20 proceeds to step S913.

Now, in step S912, the DB management unit 874 generates a file ID for identifying a file at the file transmission destination terminal (i.e., terminal having no function to generate metadata).

For example, in the event that a file has been transmitted from the terminal 830 to the terminal 810 via the USB cable or network 890, the terminal 830 generates history information regarding the transmission, and transmits this history information to the server 870. The server 870 then determines that the transmission destination terminal 810 does not generate metadata, and generates a file ID in step S912.

In step S912, the DB management unit 874 further generates, in order to add a new entry corresponding to the file at the transmission destination terminal to the ID table in later-described step S907, an appropriate path for an new entry. Details of step S912 are similar to step S905. After generation of the file ID and path, the processing in FIG. 20 proceeds to step S906.

Note that a pair of a device ID that indicates a transmission destination to be recognized in step S910, and a file ID to be generated in step S912 recognize a child file in a duplication operation between devices. Specifically, information for identifying a child file in a duplication operation from the server 870 or terminal 830 to a terminal which generates no metadata (e.g., terminal 850) is obtained in steps S910 and S912.

On the other hand, information for identifying a parent file in this duplication operation is included in history information that the server 870 received from the terminal 830 (i.e., history information that indicates transmission), or has already been extracted by the server 870 itself in step S802. Accordingly, in the event that step S906 is executed after step S912 as well, suitable tracking information is generated.

Now, in the event that determination is made in step S911 that the file transmission destination has the function to generate metadata, in step S913 the DB management unit 874 determines whether or not the transmission currently of interest is transmission in file transfer closed to one user.

For example, the transmission currently of interest may be transmission of a file from the server 870 to one of the terminals (i.e., transmission detected in step S801). In this case, if the two user IDs obtained in step S802 are equal, the transmission currently of interest is transmission in file transfer closed to one user. Conversely, if the two user IDs obtained in step S802 differ, the transmission currently of interest is not transmission in file transfer closed to one user. For example, in the event that the server 870 has transmitted a file in response to a download request from a user terminal different from the owner of the file, the two user IDs differ.

Also, the transmission currently of interest may be transmission indicated with the history information obtained in step S811. In this case, the device ID of the transmission destination extracted in step S910 from this history information, and the device ID of a terminal which has transmitted this history information to the server 870 may be correlated with the same user ID, or may be correlated with a different user ID.

In the event that the two device IDs are correlated with the same user ID, this transmission is transmission in file transfer closed to one user. Conversely, in the event that the two device IDs are correlated with a different user ID, this transmission is not transmission in file transfer closed to one user but transmission in file transfer between users.

The DB management unit 874 may specifically obtain a user ID from the device ID extracted in step S910 via inquiry for the device management unit 873. The DB management unit 874 may compare the user ID thus obtained (i.e., user ID corresponding to the file transmission destination) with the user ID obtained in step S811 (i.e., user ID corresponding to the file transmission source). The DB management unit 874 may perform the determination in step S913 according to the comparison result.

Upon the DB management unit 874 determining that the transmission currently of interest is transmission in file transfer closed to one user, the processing in FIG. 20 proceeds to step S914.

Conversely, upon the DB management unit 874 determining that the transmission currently of interest is not transmission in file transfer closed to one user, the processing in FIG.

20 proceeds to step S915. This is because, with duplication by file transfer between users, parent-child relationship is not caused between files.

Now, in step S914, the DB management unit 874 determines whether or not there is a reception log corresponding to the transmission currently of interest.

For example, the transmission currently of interest may be transmission of a file from the server 870 to the terminal 830. In this case, the reception log corresponding to the transmission currently of interest is history information is history information to be generated by the terminal 830 and to be transmitted from the terminal 830 to the server 870, and more specifically history information with "reception" being specified as the log type.

Conversely, in the event that the transmission currently of interest is transmission indicated with history information obtained in step S811. In this case, the reception log corresponding to the transmission currently of interest is history information generated by another terminal (or server 870) which receives a file from a terminal which transmitted that transmission history to the server 870 with "reception" being specified as the log type.

In either case, the DB management unit 874 may determine whether or not there is a reception log corresponding to the transmission currently of interest by searching for a history table within the DB 530-1 using a method similar to step S412 in FIG. 12.

In the event that the reception log corresponding to the transmission currently of interest has been found, the processing in FIG. 20 proceeds to step S906. In this case, in step S906, the DB management unit 874 determines a child ID and a child file ID based on the found reception log, and determines a parent device ID and a parent file ID from the obtained information regarding the transmission currently of interest. Thus, the DB management unit 874 may generate suitable tracking information in step S906.

Conversely, in the event that the reception log corresponding to the transmission currently of interest has not been found, the processing in FIG. 20 proceeds to step S915. Specifically, in the event that the reception log corresponding to the transmission currently of interest has not been found, the server 870 does not generate tracking information this time but generates tracking information after waiting for reception of the corresponding reception log (i.e., history information).

Now, in step S915, the DB management unit 874 determines the transmission destination of the table (specifically, an entry of the history table, the entries of the history table and ID table, or the entries of the history table, ID table, and tracking table). For example, the DB management unit 874 may select a transmission destination terminal as follows.

In the event that history information has been received from a terminal in step S811, and the log type is neither "reception" nor "transmission", the DB management unit 874 may select, of the terminals which the user of the transmission source terminal of the history information uses, all of the terminals having the function to generate metadata other than the transmission source of this history information. For example, in the event that history information that indicates an operation such as copy or modification of a file within the terminal 830 has been received, the DB management unit 874 may select all of the terminals having the function to generate metadata of other terminals which the user of the terminal 830 uses.

In the event that history information has been received from a terminal in step S811, and the log type is "reception", the DB management unit 874 may select, of the terminals which the user of the transmission source terminal of the history information uses, all of the terminals having the function to generate metadata other than the transmission source of this history information. Also, in the event that step S915 is executed after step S908 (i.e., in the event that file transfer is performed between users), the DB management unit 874 may further select all of the terminals having the function to generate metadata of the terminals which the user of the file transmission destination terminal uses.

In the event that history information has been received from a terminal in step S811, and the log type is "transmission", the DB management unit 874 may select, of the terminals which the user of the transmission source terminal of the history information uses, all of the terminals having the function to generate metadata other than the transmission source of this history information. Also, in the event that step S915 is executed after step S913 (i.e., in the event that file transfer is performed between users), the DB management unit 874 may further select all of the terminals having the function to generate metadata of the terminals which the user of the file transmission source terminal uses.

In the event that transmission of a file from the server 870 has been detected in step S801, the DB management unit 874 may select, of the terminals which the file owner uses, all of the terminals having the function to generate metadata. Also, in the event that the file owner and the user of the terminal which has downloaded the file differ, the DB management unit 874 may further select, of the terminals which the user of the terminal which has downloaded the file uses, all of the terminals having the function to generate metadata.

In the event that reception of a file at the server 870 has been detected in step S804, the DB management unit 874 may select, of the terminals which the user of the transmission source terminal of the file uses, all of the terminals having the function to generate metadata other than this transmission source terminal.

In the event that some sort of operation as to an existing file stored in the file storage unit 875 has been detected in step S807 or S809, the DB management unit 874 may select, of the terminals which the owner of this file uses, all of the terminals having the function to generate metadata. That is to say, regardless of the operation being performed based on a request from which user's terminal, the DB management unit 874 selects the transmission destination of metadata based on the file owner.

In step S915, for example, in a manner described above, one or more terminals which are transmission destinations of metadata are selected. Thereafter, the processing in FIG. 20 proceeds to step S907. Now, in step S907 the DB management unit 874 adds the metadata that the server 870 has received from a terminal to the DB, or records the metadata that the DB management unit 874 has generated based on information detected or obtained by the DB management unit 874 itself in the DB. The processing in FIG. 20 is then ended.

The third embodiment thus described so far has the same advantages as with the first and second embodiments. Further, according to the third embodiment, an operation by another user as to a file owned by a certain user may be reflected on the priority of this file.

Incidentally, the present disclosure is not restricted to the above embodiments. With the above description as well, though several modifications have been described, the above embodiments may further variably be modified, for example, from the following viewpoints. The above embodiments (including modifications) and the following various modifications may optionally be combined unless these mutually conflict.

Though data has been exemplified with a table format in FIGS. 6 to 9, other data formats such as the EXtensible Markup Language (XML) format and so forth are available. Also, one entry of the tracking table represents one edge within one file tree. That is to say, the tracking table is an example of a data format for indicating a tree structure. Depending on embodiments, instead of data in a table format like the tracking table, data in another format for representing a tree structure may be employed for indicating tracking information.

Also, unless no conflict is caused, the execution sequence of steps in the flowcharts may be replaced. Also, replaceable steps may be executed in parallel.

For example, in FIGS. 14 to 15, a sequence for selecting a file is not particularly decided. However, depending on embodiments, the priority calculating unit 337 may select the root file prior to a leaf file. Thus, the priority calculating unit 337 just has to reference the already calculated priority of the root file instead of calculation of sum in step S516.

Depending on embodiments, priority represented with other than Expression (6) may be calculated. Definitions in Expressions (1) to (5) may be changed according to embodiments as appropriate. For example, Expression (7) may be employed instead of Expression (4).

$$q(u) = \frac{p(u)}{0.5\left((n(u))^2 + \sum_{m=1}^{M} c_m^2\right)} \quad (7)$$

Expression (7) indicates the following.

The more the number n(u) of terminals having a file of the same unique value u increases, the lower copy priority q(u) is.

The more the number of files having the unique value u increases, the lower copy priority q(u) is.

When the number of files having the same unique value u is 1, q(u)=p(u) holds.

Depending on embodiments, in the event that there are two or more terminals having a file of the same value u, the priority calculating unit may decide the value of priority r(x) of all of the files having the unique value u to be a very low value (e.g., zero).

Incidentally, a duplication operation between terminals may be file transfer to be performed between terminals via a specific application, for example, such as photo management software or the like, or may be transmission/reception of an E-mail with an attached file. In some cases, a file may be duplicated between terminals via a removable medium. In either case, suitable tracking information may be generated by the monitoring unit detecting an appropriate operation (e.g., an operation in a specific application, a saving operation of an attached file from a mailer, a reading/writing operation as to a removable medium, etc.).

Note that the above third embodiment is an example in the event that a file copy operation on the server 870 is not permitted. However, it goes without saying that a file copy operation on the server 870 may be permitted. That is to say, a file on the server 870 may be duplicated on the server 870. In this case, the DB management unit 874 generates appropriate metadata according to a copy operation on the server 870, and updates the DB.

Specifically, in the event that the owner of a file stored in the file storage unit 875 has copied this file on the server 870 by himself/herself, the DB management unit 874 generates both of history information and tracking information.

However, in the event that another user has copied this file on the server 870, the DB management unit 874 generates history information but does not generate tracking information. This is because the owner of a file newly created by the copy operation differs from the original file owner. That is to say, with a duplication operation between multiple users, parent-child relationship is not caused between files. In other words, a file tree represented with tracking information is referenced to calculate priority of a file for one user, and priority for a certain user does not influence priority for another user.

Incidentally, with the second embodiment, the DB storage units 316, 336, and 352 hold the same DB, and with the third embodiment, the DB storage units 836 and 872 hold the same DB. That is to say, the second and third embodiments illustrate an example wherein the DB is configured with redundancy.

However, depending on embodiments, the DB does not have to be configured with complete redundancy. However, as described regarding the inquiry in step S214 in FIG. 10, the terminal may be offline. Accordingly, each of the terminals holds at least an entry regarding an operation to be performed on this terminal while this terminal is offline. That is to say, each terminal holds at least one entry of at least one table of the ID table, history table, and tracking table regarding an operation to be performed on this terminal during a period when this terminal does not communicate with the server.

Each terminal transmits, upon changing from an offline state to an online state, entries accumulated in the DB storage unit during the offline state, to the server. Depending on embodiments, after such transmission, the terminal may delete the transmitted entry.

Incidentally, depending on embodiments, the unique value does not have to be used. Instead, a command or the like for checking whether or not files have the same data may be employed.

Also, in the event that it is difficult to ignore collision between unique values, the backup control processing in FIGS. 14 to 15 may be deformed. Specifically, the priority calculating unit 337 or 837 may execute, according to each file tree, steps S505 to S508 for each unique value within this file tree instead of executing steps S505 to S508 for each unique value by focusing on unique values alone.

Incidentally, with the second and third embodiments, the terminals calculate priority. However, as described regarding the first embodiment, the server may calculate priority. That is to say, the information processing apparatus configured to execute the processing in FIG. 1 may be another computer (e.g., management server 112, server 350, or server 870) configured to perform communication with one or more terminals of the multiple terminals which the user uses.

A server serving as an information processing apparatus configured to calculate priority may receive, from a first terminal, history information that indicates the type of an operation to be performed on the first terminal as to one of the files stored in the first terminal of the multiple terminals. An example of reception of such history information is exemplified in step S401 in FIG. 12 or step S811 in FIG. 19.

Also, the first terminal may duplicate (i.e., copy) a file $x_1$ stored in the first terminal to a file $x_2$ within the first terminal. The server serving as an information processing apparatus configured to calculate priority may receive tracking information that correlates the files $x_1$ and $x_2$ from the first terminal. Reception of such tracking information is also exemplified in step S401 in FIG. 12 or step S811 in FIG. 19. The server may also apply the tracking information obtained by the reception to calculation of priority.

Also, there may be a case where the first terminal transmits a file $x_3$ stored in the first terminal to the second terminal, and the second terminal stores the transmitted file $x_3$ in the second terminal as a file $X_4$. For example, the first and second terminals may be terminals 310 and 330 respectively, and the file $x_3$ may be the file 404 in FIG. 5.

In this case, the server serving as an information processing apparatus configured to calculate priority may generate tracking information that correlates the files $x_3$ and $x_4$ based on notification regarding the file $x_3$ from the first terminal, and notification regarding the file $x_4$ from the second terminal. For example, in step S113, the server may generate tracking information based on the notification in step S112 in FIG. 5 and the notification in step S109. The server may apply the tracking information thus generated by itself to calculation of priority.

Also, there may be a case where the first terminal transmits a file $x_5$ stored in the first terminal to the server, and the server stores the transmitted file $x_5$ in the server as a file $X_6$. For example, the first terminal may be the terminal 830, the server may be the server 870, and the file $x_5$ may be the file 904.

In this case, the server serving as an information processing apparatus configured to calculate priority may generate tracking information that correlates the files $x_5$ and $x_6$ according to saving of the file $x_6$. Generation of such tracking information is exemplified in step S608 in FIG. 17, for example. The server may also apply the tracking information thus generated by itself to calculation of priority.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A medium that stores a control program for an information processing apparatus, the information processing apparatus being configured to back-up a file selectively among a plurality of files based on priorities which are given to each of the plurality of files, the control program causing the information processing apparatus to execute a procedure comprising:
obtaining history information on a type of an operation performed to each of the plurality of files;
obtaining tracking information associating a first file included in the plurality of files with a second file created by duplication of the first file,
raising a priority for the first file relatively among the plurality of files based on the history information of the second file; and
executing a back-up process of the first file selectively among the plurality of files based on the priority.

2. The medium according to claim 1, wherein the procedure further comprises:
calculating the priority based on whether a third file associated with a fourth file among the files is corresponding to one of the files based on the tracking information.

3. The medium according to claim 2, wherein
the calculating calculates the priority based on whether data of the third file is equal to data of the fourth file when the third is corresponding to one of the files.

4. The medium according to claim 1, wherein
the raising raises the priority of a first file among the files that is other than a plurality of second files created by duplication of the first file based on an operation performed to each of the second files.

5. The medium according to claim 4, wherein
the raising raises the priority of a third file among the second files that is other than a fourth file of which a fifth file is created by duplication based on the priority of the first file.

6. The medium according to claim 1, wherein
the raising raises each of a priority of a first file and a priority of a second file created by duplication of the first file higher when data of the first file is not equal to data of the second file than when the data of the first file is equal to the data of the second file.

7. The medium according to claim 1, wherein
the obtaining history information includes
detecting an operation performed to a file among the files that is stored on the information processing apparatus, and
generating the history information on a type of the operation detected in the detecting.

8. The medium according to claim 1, wherein the procedure further comprises:
obtaining tracking information associating a first file among the files with a second file created by duplication of the first file, and
the obtaining tracking information includes
detecting duplication performed to a third file among the files stored on the information processing apparatus, and
generating the tracking information associating the third file with a fourth file created by duplication of the third file.

9. The medium according to claim 1, wherein
the obtaining history information includes receiving the history information on the type of an operation performed to a first file among the files stored on an apparatus connected to the information processing apparatus.

10. The medium according to claim 1, wherein the procedure further comprises:
obtaining tracking information associating a first file among the files with a second file created by duplication of the first file, and
the obtaining tracking information includes receiving the tracking information associating a third file among the files stored in an apparatus connected to the information processing apparatus with a fourth file created by duplication of the third file.

11. The medium according to claim 1, wherein the procedure further comprises:
obtaining tracking information associating a first file among the files with a second file created by duplication of the first file, and
the obtaining tracking information includes
receiving a first notice and a second notice, the first notice transmitted from a first apparatus when a third file is transmitted from the first apparatus to the second apparatus, the second notice transmitted from a second apparatus when a fourth file created by duplication of the third file is stored on the second apparatus, and
generating the tracking information based on the first notice and the second notice, the tracking information associating the third file with the fourth file .

12. The medium according to claim 1, wherein the procedure further comprises:

obtaining tracking information associating a first file among the files with a second file created by duplication of the first file, and the obtaining tracking information includes receiving a third file stored on an apparatus connected to the information processing apparatus, and generating the tracking information associating the third file with a fourth file stored in the information processing apparatus upon receiving the third file, the fourth file being created by duplication of the third file.

13. A control method for an information processing apparatus, the information processing apparatus being configured to back-up a file selectively among a plurality of files based on priorities which are given to each of the plurality of files, the method comprising:

obtaining history information on a type of an operation performed to each of the plurality of files;

obtaining tracking information associating a first file included in the plurality of files with a second file created by duplication of the first file, raising a priority for the first file relatively among the plurality of files based on the history information of the second file; and executing a back-up process of the first file selectively among the plurality of files based on the priority.

14. An information processing apparatus configured to back-up a file selectively among a plurality of files based on priorities which are given to each of the plurality of files, the information processing apparatus comprising:

a processor configured to obtain history information on a type of an operation performed to each of the plurality of files;

obtain tracking information associating a first file included in the plurality of files with a second file created by duplication of the first file, raise a priority for the first file relatively among the plurality of files based on the history information of the second file; and execute a back-up process of the first file selectively among the plurality of files based on the priority.

\* \* \* \* \*